(12) United States Patent
Handique et al.

(10) Patent No.: US 7,004,184 B2
(45) Date of Patent: Feb. 28, 2006

(54) COMPOSITIONS AND METHODS FOR LIQUID METERING IN MICROCHANNELS

(75) Inventors: Kalyan Handique, Ann Arbor, MI (US); Mark A. Burns, Ann Arbor, MI (US)

(73) Assignee: The Reagents of The University of Michigan, Ann Arbor, MI (US)

( * ) Notice: Subject to any disclaimer, the term of this patent is extended or adjusted under 35 U.S.C. 154(b) by 741 days.

(21) Appl. No.: 09/911,055

(22) Filed: Jul. 23, 2001

(65) Prior Publication Data

US 2003/0070677 A1    Apr. 17, 2003

Related U.S. Application Data

(60) Provisional application No. 60/220,320, filed on Jul. 24, 2000.

(51) Int. Cl.
*F15D 1/14* (2006.01)

(52) U.S. Cl. ........................................... 137/1

(58) Field of Classification Search ................ 137/1–4, 137/7, 13–14, 803, 806, 807, 833–840, 82–84; 436/180; 422/68.1, 99, 100, 81, 82; 435/287.3; 222/1
See application file for complete search history.

(56) References Cited

U.S. PATENT DOCUMENTS

| 2002/0142471 | A1* | 10/2002 | Handique et al. | 436/53 |
| 2002/0168671 | A1* | 11/2002 | Burns et al. | 435/6 |
| 2002/0172969 | A1* | 11/2002 | Burns et al. | 435/6 |
| 2004/0115830 | A1* | 6/2004 | Touzov | 436/180 |

* cited by examiner

*Primary Examiner*—Evan Pert
(74) *Attorney, Agent, or Firm*—Medlen & Carroll, LLP

(57) ABSTRACT

The movement and mixing of microdroplets through microchannels is described employing microscale devices, comprising microdroplet transport channels, reaction regions, electrophoresis modules, and radiation detectors. Microdroplets are metered into defined volumes and are subsequently incorporated into a variety of biological assays. Electronic components are fabricated on the same substrate material, allowing sensors and controlling circuitry to be incorporated in the same device.

14 Claims, 38 Drawing Sheets

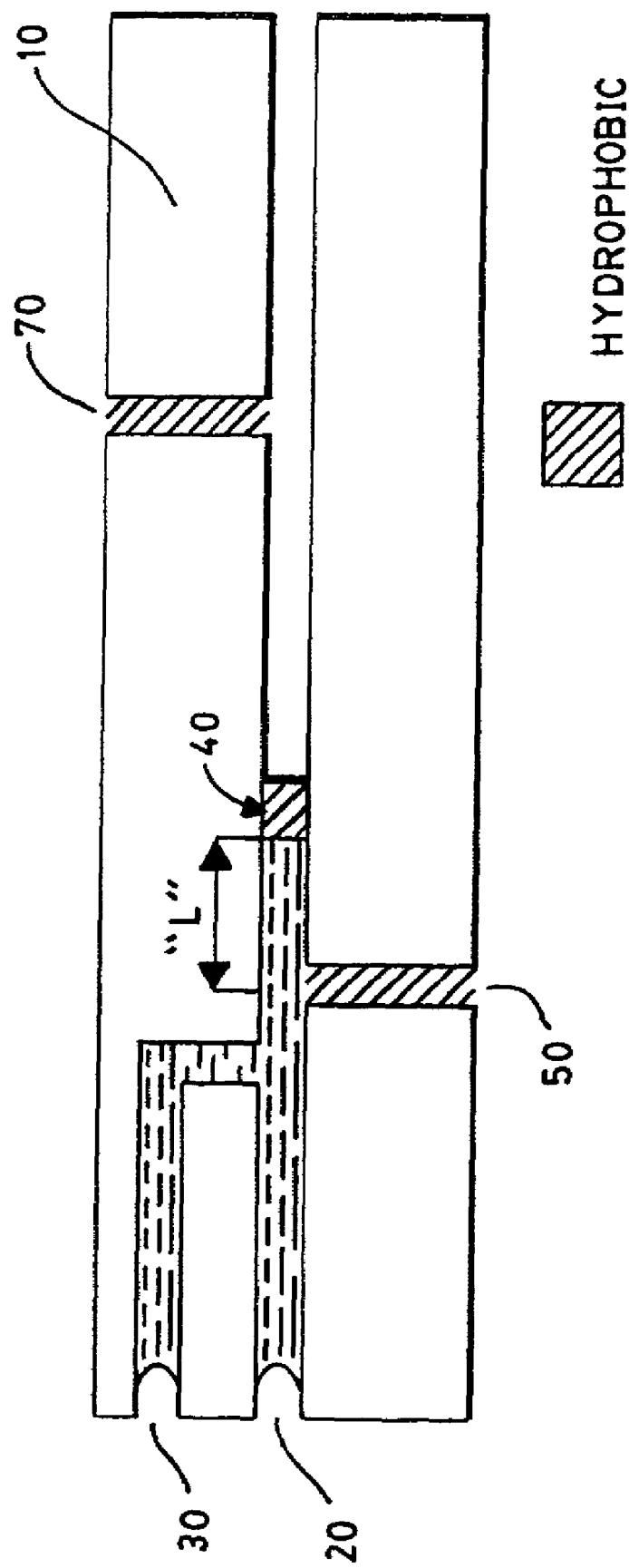

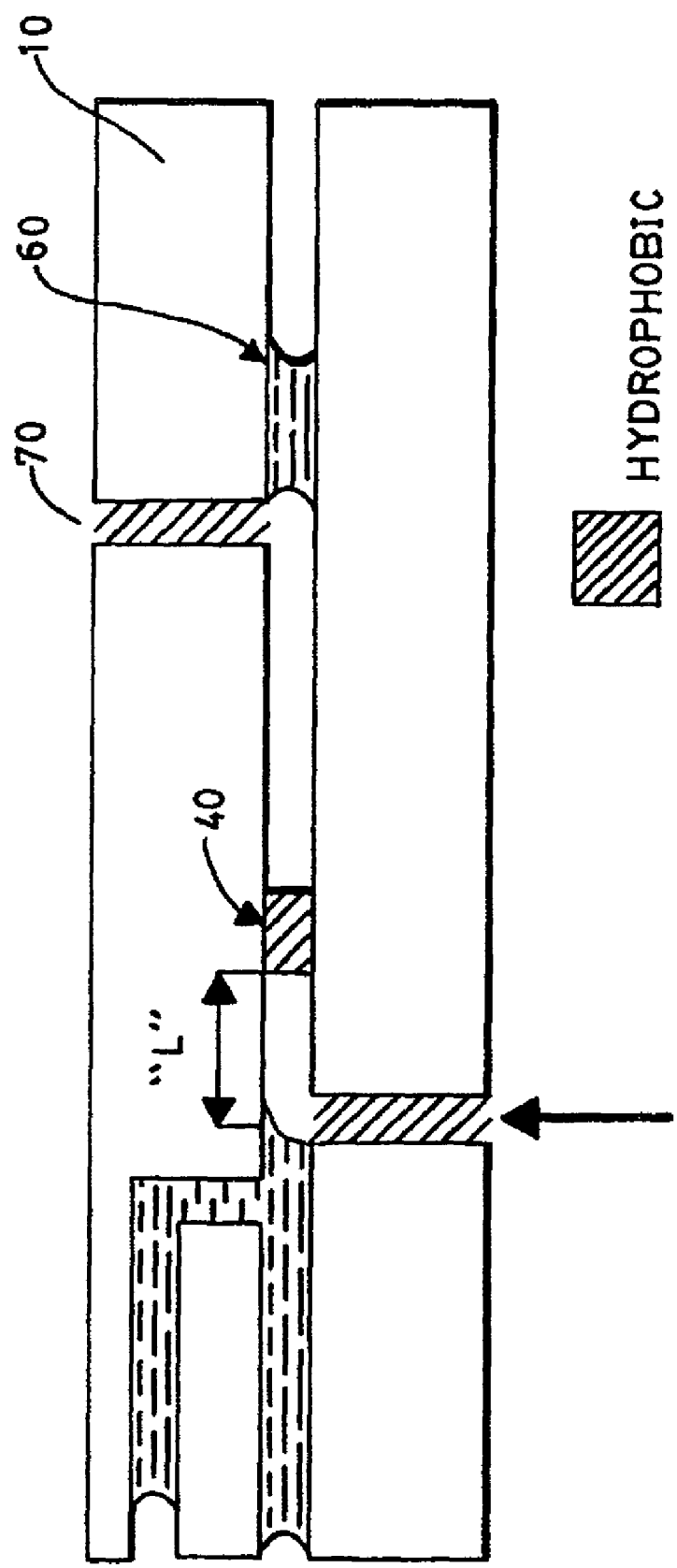

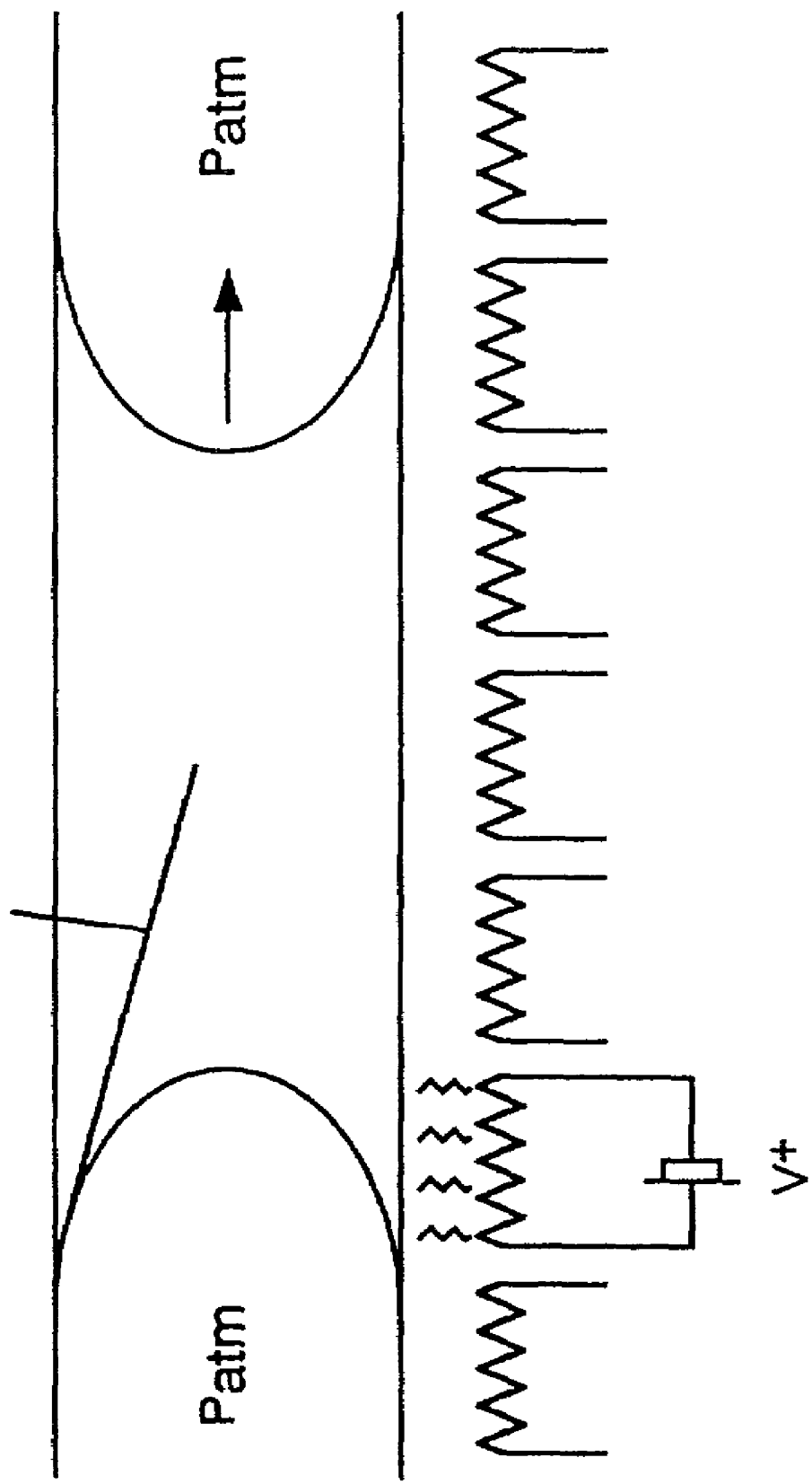

SiO₂   Al   SiOx   SixNy

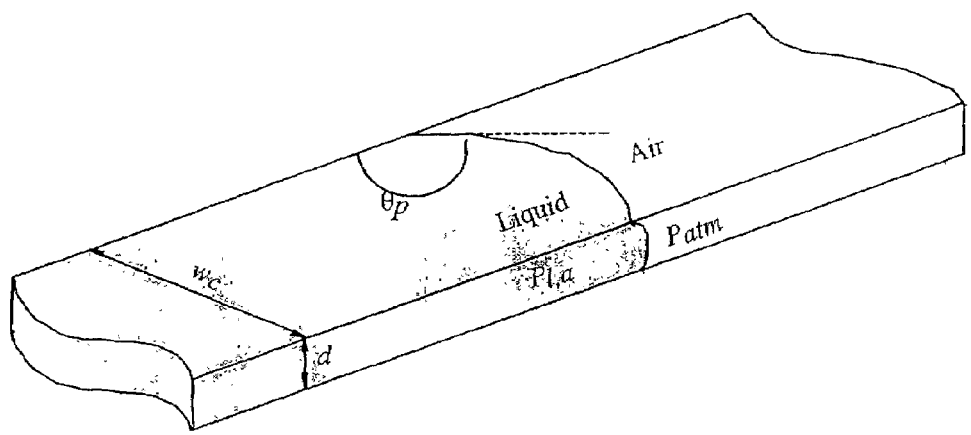
(a)
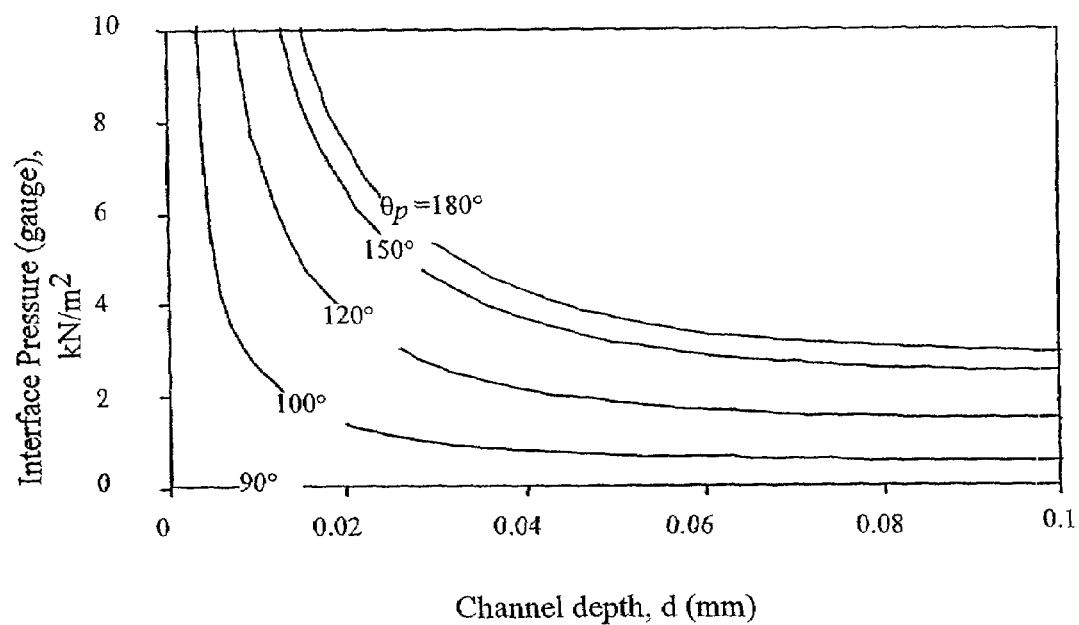
(b)
FIG. 14

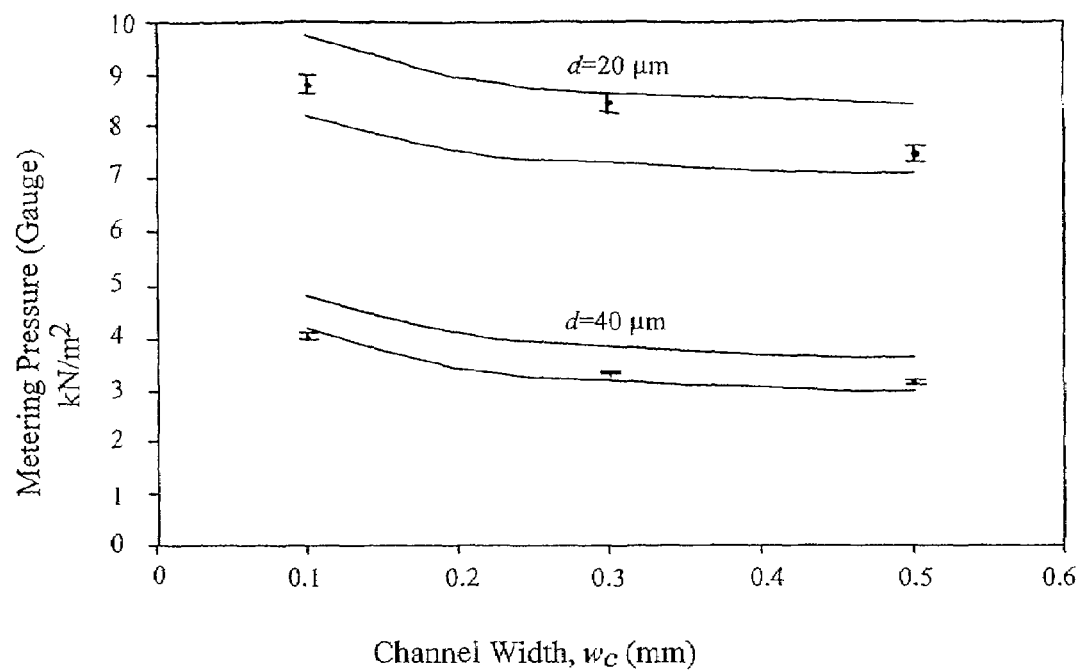
(a)
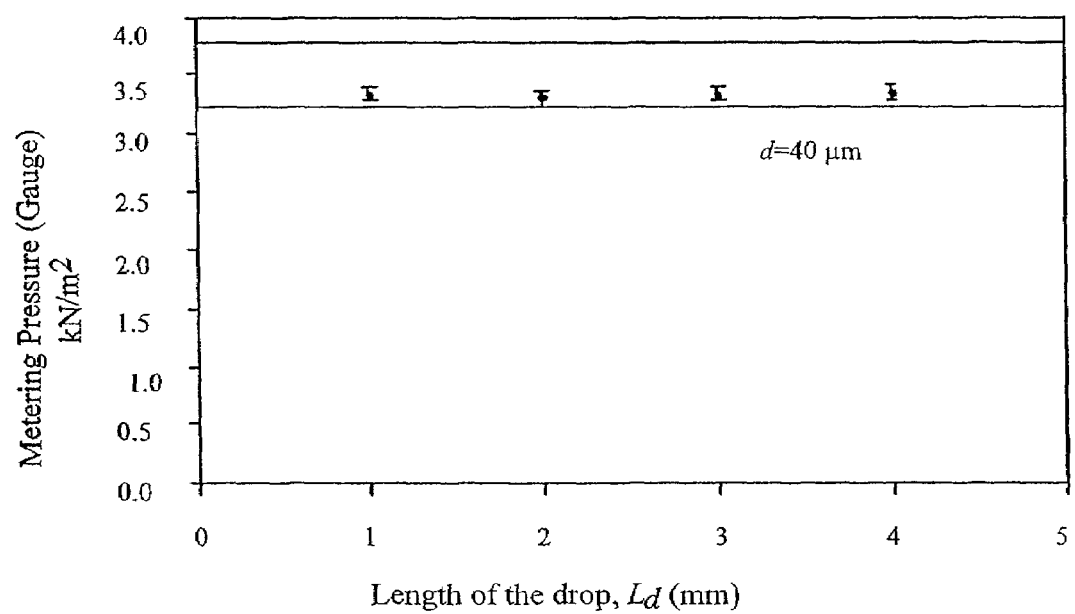
(b)
FIG. 18

PCR RESULTS WITH STANDARD REAGENT AMOUNTS

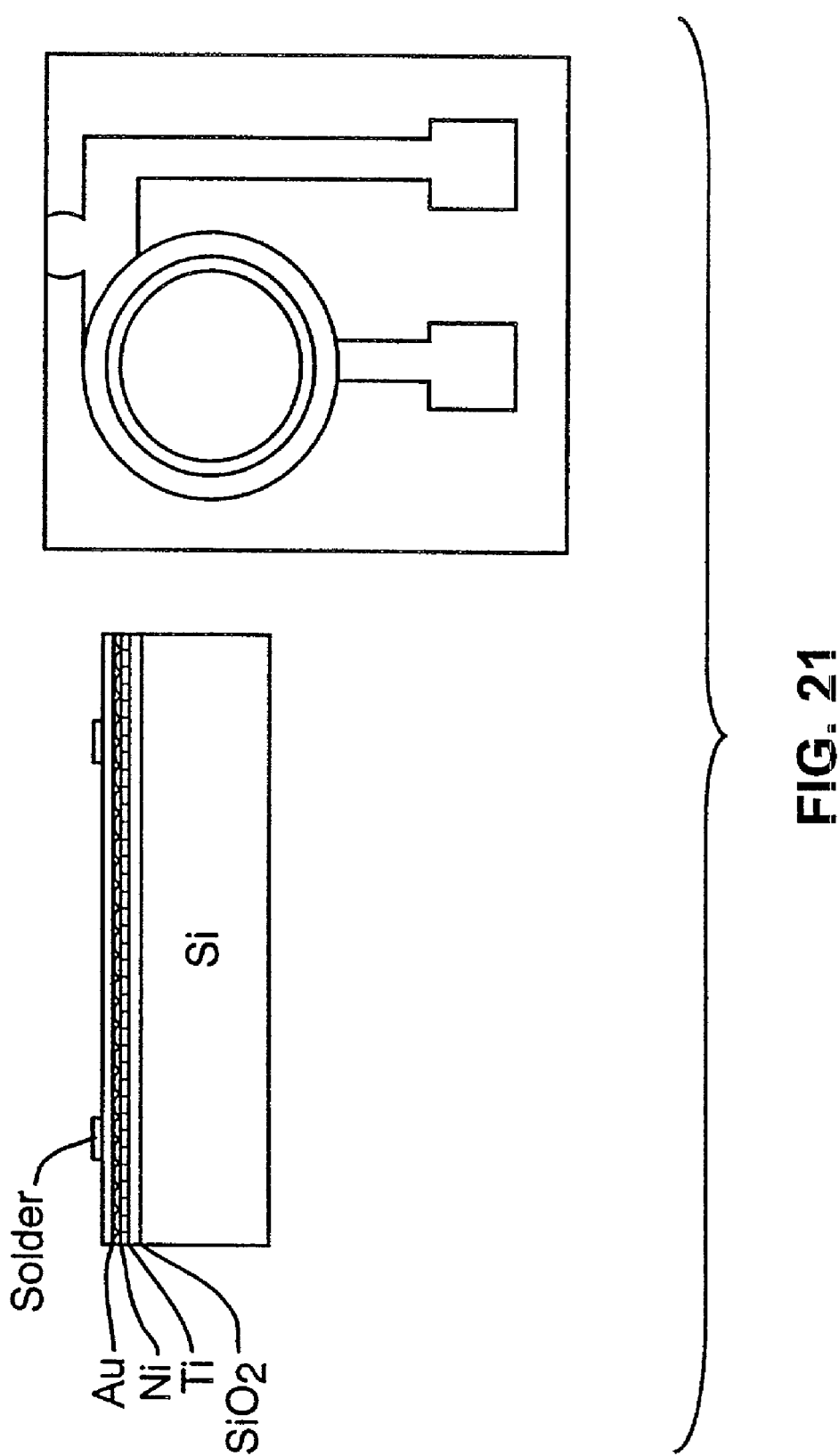

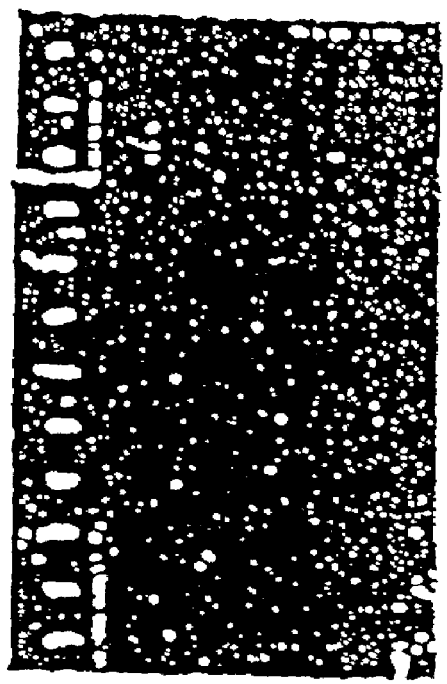
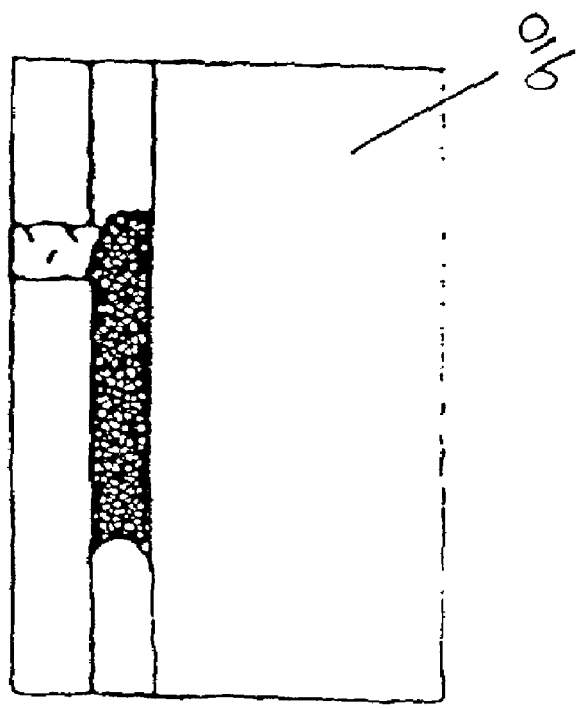
FIGURE 26D

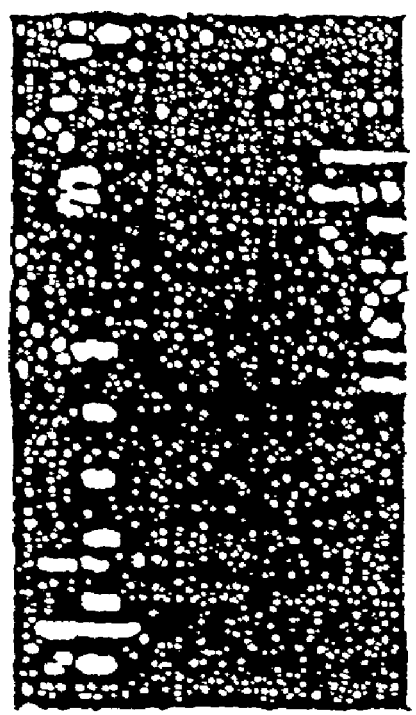
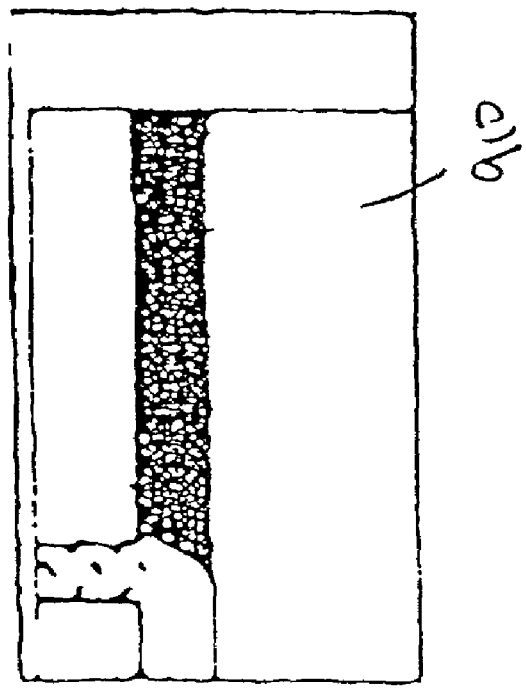
FIGURE 26E

COMPOSITIONS AND METHODS FOR LIQUID METERING IN MICROCHANNELS

This application claims the benefit of Provisional Application No. 60/220,320, filed Jul. 24, 2000.

This invention was made with government support awarded by the National Institutes of Health (grant numbers NIH-R01-HG01044 and NIH-R01-HG01406). The government has certain rights in the invention.

FIELD OF THE INVENTION

The present invention relates to movement of microdroplets through microchannels, and more particularly, compositions, devices and methods to control microdroplet size and movement.

BACKGROUND

The complexity and power of biological reactions has increased dramatically over the last thirty years. The initial observations of the "hybridization" process, i.e., the ability of two polymers of nucleic acid containing complementary sequences to find each other and anneal through base pairing interaction, by Marmur and Lane, *Proc. Nat. Acad. Sci., U.S.A.* 46, 453 (1960) and Doty et al., *Proc. Nat. Acad. Sci., U.S.A.* 46, 461 (1960), have been followed by the refinement of this process into an essential tool of modem biology.

Initial hybridization studies, such as those performed by Hayashi et al., *Proc. Nat. Acad. Sci., U.S.A.* 50, 664 (1963), were formed in solution. Further development led to the immobilization of the target DNA or RNA on solid supports. With the discovery of specific restriction endonucleases by Smith and Wilcox, *J.Mol.Biol.* 51, 379 (1970), it became possible to isolate discrete fragments of DNA. Utilization of immobilization techniques, such as those described by Southern, *J.Mol.Biol.* 98, 503 (1975), in combination with restriction enzymes, has allowed for the identification by hybridization of singly copy genes among a mass of fractionated, genomic DNA.

In 1977, two methods for DNA sequencing were reported. These were the chemical degradation method of Maxam and Gilbert, *Proc. Nat. Acad. Sci. U.S.A.* 74:560 (1977) and the enzymatic method of Sanger et al., *Proc. Nat. Acad Sci. U.S.A.* 74:5463 (1977). Both methods generate populations of radiolabeled oligonucleotides which begin at a fixed point and terminate randomly at a fixed residue or type of residue. These populations are resolved on polyacrylamide gels which allow the discrimination between oligonucleotides that differ in length by as little as one nucleotide.

The Maxam and Gilbert method utilizes a fragment of DNA radiolabeled at one end which is partially cleaved in five separate chemical reactions, each of which is specific for a particular base or type of base. The products of these chemical reactions are five populations of labelled molecules that extend from the labeled end to the site of chemical cleavage. This method has remained relatively unchanged since its initial development. This method works best for DNA sequences that lie less than 250 nucleotides from the labeled end.

In contrast, the Sanger method is capable of sequencing greater than 500 nucleotides in a single set of reactions. The Sanger method is an enzymatic reaction that utilizes chain-terminating dideoxynucleotides (ddNTPs). ddNTPs are chain-terminating because they lack a 3'-hydroxyl residue which prevents formation of a phosphodiester bond with the succeeding deoxyribonucleotide (dNTP). A small amount of one ddNTP is included with the four conventional dNTPs in a polymerization reaction. Polymerization or DNA synthesis is catalyzed by a DNA polymerase. There is competition between extension of the chain by incorporation of the conventional dNTPs and termination of the chain by incorporation of a ddNTP. A short oligonucleotide or primer is annealed to a template containing the DNA to be sequenced. The original protocols required single-stranded DNA templates. The use of double-stranded templates was reported later. The primer provides a 3' hydroxyl group which allows the polymerization of a chain of DNA when a polymerase enzyme and dNTPs are provided.

The original version of the Sanger method utilized the Klenow fragment of *E. coli* DNA polymerase. This enzyme has the polymerization and 3' to 5' exonuclease activity of the unmodified polymerase but lacks 5' to 3' exonuclease activity. The Klenow fragment has several limitations when used for enzymatic sequencing. One limitations is the low processivity of the enzyme, which generates a high background of fragments that terminate by the random dissociation of the enzyme from the template rather than by the desired termination due to incorporation of a ddNTP. The low processivity also means that the enzyme cannot be used to sequence nucleotides that appear more than ~250 nucleotides from the 5' end of the primer. A second limitation is that Klenow cannot efficiently utilize templates which have homopolymer tracts or regions of high secondary structure. The problems caused by secondary structure in the template can be minimized by running the polymerization reaction at 55° C.

Improvements to the original Sanger method include the use of polymerases other than the Klenow fragment. Reverse transcriptase has been used to sequence templates that have homopolymeric tracts. Reverse transcriptase is somewhat better than the Klenow enzyme at utilizing templates containing homopolymer tracts.

The use of a modified T7 DNA polymerase (Sequenase™) was the most significant improvement to the Sanger method. See Sambrook, J. et al. Molecular Cloning, A Laboratory Manual, 2d Ed. Cold Spring Harbor Laboratory Press, New York, 13.7–13.9 and Hunkapiller, M. W. (1991) *Curr. Op. Gen. Devl.* 1:88–92. Sequenase™ is a chemically-modified T7 DNA polymerase has reduced 3' to 5' exonuclease activity. Tabor et al, *Proc. Natl. Acad. Sci. U.S.A.* 84:4767 (1987). Sequenase™ version 2.0 is a genetically engineered form of the T7 polymerase which completely lacks 3' to 5' exonuclease activity. Sequenase™ has a very high processivity and high rate of polymerization. It can efficiently incorporate nucleotide analogs such as dITP and 7-deaza-dGTP which are used to resolve regions of compression in sequencing gels. In regions of DNA containing a high G+C content, Hoogsteen bond formation can occur which leads to compressions in the DNA. These compressions result in aberrant migration patterns of oligonucleotide strands on sequencing gels. Because these base analogs pair weakly with conventional nucleotides, intrastrand secondary structures are alleviated. In contrast, Klenow does not incorporate these analogs as efficiently. The main limitation to the amount of DNA sequence that can be obtained from a single set of chain-termination reactions using Sequenase™ is the resolving power of polyacrylamide gels, not the properties of the enzyme.

The use of Taq DNA polymerase is a more recent addition to the improvements of the Sanger method. Innis et al., *Proc. Natl. Acad. Sci. U.S.A.* 85:9436 (1988). Taq polymerase is a thermostable enzyme which works efficiently at 70–75° C. The ability to catalyze DNA synthesis at elevated temperature makes Taq polymerase useful for sequencing templates which have extensive secondary structures at 37° C. (the standard temperature used for Klenow and Sequenase™ reactions). Taq polymerase, like Sequenase™, has a high degree of processivity and like Sequenase 2.0, it lacks 3' to 5' nuclease activity.

Methods were also developed for examining single base changes without direct sequencing. These methods allow for the "scanning" of DNA fragments for the presence of mutations or other sequence variation. For example, if a mutation of interest happens to fall within a restriction recognition sequence, a change in the pattern of digestion can be used as a diagnostic tool (e.g., restriction fragment length polymorphism [RFLP] analysis).

With the development of these complex and powerful biological techniques, an ambitious project has been undertaken. This project, called the Human Genome Project (HGP), involves the complete characterization of the archetypal human genome sequence which comprises $3 \times 10^9$ DNA nucleotide base pairs. An implicit goal of the project is the recognition that all humans are greater than 99% identical at the DNA sequence level. The differences between people, however, provide the information most relevant to individual health care, including potential estimates of the risk of disease or the response to a specific medical treatment. Upon completion of the HGP, a continuing effort of the human genetics research community will be the examination of differences within populations and of individual variants from the defined archetype. While the 15-year effort of the HGP represents a defined quantity of DNA data acquisition, the future demand for DNA information is tied to individual genetic variation and is, therefore, unlimited.

Current DNA genotyping technologies are adequate for the detailed analysis of samples that range in number from hundreds to thousands per year. Genotyping projects on the order of millions of assays, however, are beyond the capabilities of today's laboratories because of the current inefficiencies in (i) liquid handling of reagent and DNA template solutions, (ii) measurement of solution volumes, (iii) mixing of reagent and template, (iv) controlled thermal reaction of the mixed solutions, (v) sample loading onto an electrophoresis gel, and (vi) DNA product detection on size-separating gels. What is needed is methodology for the metering of defined fluid volumes that allows for the high-throughput processing of biological reactions without these existing inefficiencies.

SUMMARY OF THE INVENTION

The present invention relates to movement of microdroplets through microchannels, and more particularly, compositions, devices and methods to control microdroplet size and movement. The present invention involves microfabrication of microscale devices and reactions in microscale devices, and in particular, movement of biological samples in microdroplets through microchannels to, for example, initiate biological reactions.

The present invention contemplates microscale devices, comprising microdroplet transport channels having hydrophilic and hydrophobic regions, reaction chambers, gas-intake pathways and vents, electrophoresis modules, and detectors, including but not limited to radiation detectors. In some embodiments, the devices further comprise air chambers to internally generate air pressure to split and move microdroplets (i.e. "on-chip" pressure generation).

In a preferred embodiment, these elements are microfabricated from silicon and glass substrates. The various components are linked (i.e., in liquid communication) using flow-directing means, including but not limited to, a flow directing means comprising a surface-tension-gradient mechanism in which discrete droplets are differentially heated and propelled through etched channels. Electronic components are fabricated on the same substrate material, allowing sensors and controlling circuitry to be incorporated in the same device. Since all of the components are made using conventional photolithographic techniques, multi-component devices can be readily assembled into complex, integrated systems.

It is not intended that the present invention be limited by the nature of the reactions carried out in the microscale device. Reactions include, but are not limited to, chemical and biological reactions. Biological reactions include, but are not limited to sequencing, restriction enzyme digests, RFLP, nucleic acid amplification, and gel electrophoresis. It is also not intended that the invention be limited by the particular purpose for carrying out the biological reactions. In one medical diagnostic application, it may be desirable to differentiate between a heterozygotic and homozygotic target and, in the latter case, specifying which homozygote is present. Where a given genetic locus might code for allele A or allele a, the assay allows for the differentiation of an AA from an Aa from an aa pair of alleles. In another medical diagnostic application, it may be desirable to simply detect the presence or absence of specific allelic variants of pathogens in a clinical sample. For example, different species or subspecies of bacteria may have different susceptibilities to antibiotics; rapid identification of the specific species or subspecies present aids diagnosis and allows initiation of appropriate treatment.

The present invention contemplates a method for moving microdroplets, comprising: (a) providing a liquid microdroplet disposed within a microdroplet transport channel etched in silicon, said channel in liquid communication with a reaction region via said transport channel and separated from a microdroplet flow-directing means by a liquid barrier; and (b) conveying said microdroplet in said transport channel to said reaction region via said microdroplet flow-directing means. It is intended that the present invention be limited by the particular nature of the microdroplet flow-directing means. In one embodiment, it comprises a series of aluminum heating elements arrayed along said transport channel and the microdroplets are conveyed by differential heating of the microdroplet by the heating elements.

It has been found empirically that the methods and devices of the present invention can be used with success when, prior to the conveying described above the transport channel (or channels) is treated with a hydrophilicity-enhancing compound. It is not intended that the invention be limited by exactly when the treatment takes place. Indeed, there is some flexibility because of the long-life characteristics of some enhancing compounds.

It has also been found empirically that the methods and devices of the present invention can be used with success when regions of the microchannel are treated with hydrophobic reagents to create hydrophobic regions. By using defined, hydrophobic regions at definite locations in microchannels and using a pressure source, one can split off precise nanoliter volume liquid drops (i.e. microdroplets) and control the motion of those drops though the microchannels.

In one embodiment employing such hydrophobic regions (or "hydrophobic patches"), the present invention contemplates a method for moving microdroplets, comprising: (a) providing microdroplet transport channel (or a device comprising a microdroplet transport channel), said channel i) having one or more hydrophobic regions and ii) in communication with a gas source; (b) introducing liquid into said channel under conditions such that said liquid stops at one of said hydrophobic regions so as to define i) a source of liquid microdroplets disposed within said channel and ii) a liquid-abutting hydrophobic region; and (c) separating a discrete amount of liquid from said source of liquid microdroplets using gas from said gas source under conditions such that a microdroplet of defined size i) comes in contact with, and ii) moves over, said liquid-abutting hydrophobic region.

In one embodiment, said gas from said gas source enters said channel from a gas-intake pathway in communication with said microdroplet transport channel and exits said channel from a gas vent that is also in communication with said microdroplet transport channel. It is preferred, in this embodiment, that the introduction of liquid into the channel (as set forth in part b of the above-described method) is such that i) the liquid passes over the gas-intake pathway and ii) the desired size of the microdroplet is defined by the distance between the gas-intake pathway and the liquid-abutting hydrophobic region. In this embodiment, introduction of the gas (as set forth in part c of the above-described method) forces the microdroplet to i) pass over the liquid-abutting hydrophobic region and ii) pass by (but not enter) the gas vent.

In another embodiment employing such hydrophobic regions (or "hydrophobic patches"), the present invention contemplates a method for moving microdroplets, comprising: (a) providing a device comprising a microdroplet transport channel etched in silicon, said channel i) having one or more hydrophobic regions and ii) in communication with a gas source; (b) introducing liquid into said channel under conditions such that said liquid stops at one of said hydrophobic regions so as to define i) a source of liquid microdroplets disposed within said channel and ii) a liquid abutting hydrophobic region; and (c) separating a discrete amount of liquid from said source of liquid microdroplets using gas from said gas source under conditions such that a microdroplet of defined size i) comes in contact with, and ii) moves over, said liquid-abutting hydrophobic region.

In another embodiment the present device contemplates a device comprising a microdroplet transport channel etched in substrate, said channel comprising one or more hydrophobic regions, and a gas port in fluidic communication with said channel, wherein said substrate is selected from the group consisting of silicon, quartz, glass, and plastic.

In another embodiment of the present device is designed such that a gas port inserts into the microdroplet transport channel at an angle in the range of 5 to 170 degrees. In a preferred embodiment, the angle of insertion of said gas port is approximately 90 degrees.

In another embodiment employing such hydrophobic regions (or "hydrophobic patches"), the present invention contemplates a method for metering microdroplets, comprising: (a) providing a device comprising a microdroplet channel (e.g. etched in silicon), said channel i) having one or more hydrophobic regions and ii) in fluidic communication with a gas port; (b) introducing liquid into said microdroplet channel under conditions such that said liquid is confined by one of said hydrophobic regions (i.e. a first terminus of the liquid abuts the hydrophobic region); (c) introducing a volume of gas from said gas port into said fluid filled microdroplet channel under conditions such that said gas divides the liquid in said microdroplet channel so as to create a second terminus for said fluid and a fixed volume of liquid defined by the second terminus (i.e. the interface of said dividing gas or bubble) and said first terminus (i.e. the fluid edge confined by said hydrophobic region).

In another embodiment, the present invention contemplates the conduction of the volume of liquid defined by said first and second termini beyond said hydrophobic patch such that, in one example, said volume conducted beyond said hydrophobic patch is directed into a circuit comprising a means for biological reactions.

In another embodiment, the present invention contemplates a method comprising the steps of, (a) providing a device comprising a microdroplet channel, wherein, i) said channel has one or more hydrophobic regions; and ii) said channel is in fluidic communication with a gas port; and (b) introducing liquid into said channel, wherein said liquid comprises a first volume under conditions such that said liquid is confined by at least one of said hydrophobic regions so as to create a first terminus; and (c) introducing a volume of gas from said gas port into said fluid filled microdroplet channel under conditions such that said gas divides the liquid in said microdroplet channel so as to create a second terminus, said first an second termini defining a second volume wherein, in one example, said second volume is less than said first volume.

In one embodiment, the present invention is designed such that the gas port is positioned at a desired pre-measured length from the hydrophobic patch (which confines the first terminus of the liquid introduced into said channel) such that when a bubble is introduced into said liquid filled channel (via said gas port), a reproducible desired volume of liquid is created.

In one embodiment, the present invention is designed such when a liquid termini is confined by a hydrophobic patch the subsequent (or concurrent) introduction of gas (via said gas port) will not advance said liquid termini confined by said hydrophobic patch beyond the margin of the hydrophobic patch disposed with said microdroplet channel.

In one embodiment, the present invention contemplates a metered volume of liquid wherein said metered volume of liquid disposed within a microdroplet channel is defined by the fluid edge confined by said hydrophobic region and the interface of said dividing gas volume and the fluid edge proximal to the gas port through which said gas is introduced into said microdroplet channel.

In one embodiment, the present invention contemplates that the liquid introduced into the microdroplet channel defines a first volume whereas the liquid defined by said first and second termini defines a second volume less that said first volume.

In one embodiment, the present invention contemplates a method, comprising the steps of: (a) providing a device comprising i) a microdroplet transport channel, said channel having one or more hydrophobic regions; and a ii) gas port in fluidic communication with said channel; and (b) introducing a first volume liquid into said channel so as to create a liquid-containing channel and under conditions such that said first volume of liquid is confined by at least one of said hydrophobic regions so as to create a first terminus; and (c) introducing a volume of gas through said gas port into said liquid-containing channel under conditions such that said gas divides the liquid in said channel so as to create a second terminus, said first and second termini defining a second volume of liquid. The present invention further contemplates an embodiment comprising the step d) moving said second volume of liquid.

In one embodiment, the present invention contemplates the movement of said second volume into a reaction chamber.

The present invention also contemplates an embodiment wherein said second volume of liquid is in a range between approximately one picoliter and one milliliter.

In one embodiment, the present invention contemplates a method, comprising the steps of: (a) providing a device comprising i) an etched microdroplet transport channel, said microdroplet transport channel having one or more hydrophobic regions; and ii) an etched gas transport channel in fluidic communication with said microdroplet transport channel, said gas transport channel intersecting said microdroplet channel so as to form a junction; and (b) introducing a first volume liquid into said microdroplet channel so as to create a liquid-containing channel and under conditions such that said first volume of liquid is confined by at least one of said hydrophobic regions so as to create a first terminus; and (c) introducing a volume of gas through said gas transport channel under conditions such that said gas enters said fluid-containing channel at said junction so as to divide the liquid in said channel and create a second terminus, said first and second termini defining a second volume of liquid.

In one embodiment of the present invention, said second volume is less than said first volume.

In one embodiment, the present invention contemplates a method, comprising the steps of: a method, comprising the steps of: (a) providing a device comprising i) a microdroplet transport channel, said channel having one or more hydrophobic regions; and ii) a plurality of gas ports in fluidic communication with said channel; and (b) introducing a first volume liquid into said channel so as to create a liquid-containing channel and under conditions such that said first volume of liquid is confined by at least one of said hydrophobic regions so as to create a first terminus; and (c) introducing a volume of gas through one of said gas ports into said liquid-containing channel under conditions such that said gas divides the liquid in said channel so as to create a second terminus, said first and second termini defining a second volume of liquid.

The present invention also contemplates an embodiment wherein the distances within said microdroplet transport channel between a given hydrophobic region and said plurality of gas ports define a range of predetermined liquid volumes.

In one embodiment of the present invention, the conditions under which a gas divides the liquid in a microdroplet transport channel, so as to create a second terminus, comprises a metering pressure.

Again, it has been found empirically that there is a need for a liquid barrier between the liquid in the channels and the electronics of the silicon chip. A preferred barrier comprises a first silicon oxide layer, a silicon nitride layer, and a second silicon oxide layer.

The present invention further contemplates a method for merging microdroplets comprising: (a) providing first and second liquid microdroplets, a liquid microdroplet delivering means, and a device, said device comprising: i) a housing comprised of silicon, ii) first and second microdroplet transport channels etched in said silicon and connecting to form a third transport channel containing a reaction region, iii) a microdroplet receiving means in liquid communication with said reaction region via said transport channels, and iv) microdroplet flow-directing means arrayed along said first, second and third transport channels; (b) delivering said first liquid microdroplet via said microdroplet delivering means to said first transport channel; (c) delivering said second liquid microdroplet via said microdroplet delivering means to said second transport channel; and (d) conveying said microdroplets in said transport channels to said reaction region in said third transport channel via said microdroplet flow-directing means, thereby merging said first and second microdroplets to create a merged microdroplet.

In one embodiment, said first microdroplet comprises nucleic acid and said second microdroplet comprises a nuclease capable of acting on said nucleic acid. In this embodiment, it is desirable to enhance the mixing within the merged microdroplet. This can be achieved a number of ways. In one embodiment for mixing, after the conveying of step (d), the flow direction is reversed. It is not intended that the present invention be limited by the nature or number of reversals. If the flow direction of said merged microdroplet is reversed even a single time, this process increases the mixing of the reactants.

The present invention contemplates a variety of silicon-based, microdroplet transport channel-containing devices. In one embodiment, the device comprises: i) a housing comprised of silicon, ii) a microdroplet transport channel etched in said silicon, iii) a microdroplet receiving means in liquid communication with a reaction region via said transport channels, and iv) a liquid barrier disposed between said transport channels and a microdroplet flow-directing means. In one embodiment, the device is assembled in two parts. First, the channels are etched in any number of configurations. Secondly, this piece is bonded with a silicon-based chip containing the electronics. This allows for both customization (in the first piece) and standardization (in the second piece).

The present invention also contemplates devices and methods for the sealing of channels with meltable material. In one embodiment, the device comprises a meltable material disposed within a substrate and associated with a heating element.

In one embodiment, the present invention contemplates a method comprising: a) providing a device having a meltable material disposed within a substrate and associated with a heating element; and b) heating said meltable material with said heating element such that said meltable material at least partially liquifies and such that said substrate is not damaged. The method may further comprise c) allowing said liquified meltable material to cool. While the present invention is not limited by the size of the channel, in one embodiment said substrate further comprises a microdroplet channel disposed in said substrate, said meltable material is disposed within said microdroplet channel.

In another embodiment, the present invention contemplates a method for restricting fluid flow in a channel comprising a) providing a device comprising: i) a meltable material disposed within a substrate, said meltable material associated with a heating element; and ii) a diaphragm positioned such that, when extended, it touches said meltable material; b) extending said diaphragm such that it touches said meltable material; and c) heating said meltable material with said heating element such that said meltable material at least partially liquifies and such that said substrate is not damaged. In one embodiment the method further comprises d) allowing said meltable material to cool. While the present invention is not limited by the size of the channel, in one embodiment, the substrate further comprises a microdroplet channel disposed in said substrate, said meltable material disposed within said microdroplet channel.

The present invention also contemplates a method for restricting fluid flow in a channel, comprising: a) providing: i) a main channel connected to a side channel and disposed within a substrate, ii) meltable material disposed within said side channel and associated with a heating element, and iii) a movement means connected to said side channel such that application of said movement means induces said meltable material to flow from said side channel into said main channel; b) heating said meltable material such that said meltable material at least partially liquifies; and c) applying said movement means such that said liquified meltable material flows from said side channel into said main channel. While the present invention is not limited by the movement means, in one embodiment the movement means is forced air. In one embodiment the method further comprises d) allowing said meltable material to cool. While the present invention is not limited by the size of the channel, in one embodiment, the main channel and the side channel are microdroplet channels.

While the present invention is not limited by the nature of the substrate, in one embodiment the substrate comprises silicon or glass. Likewise, the present invention is not limited by the composition of the meltable material. In one embodiment, the meltable material comprises solder. In a preferred embodiment, the solder comprises 40:60 Sn:Pb. In other embodiments, the meltable material is selected from a group consisting of plastic, polymer and wax. Likewise, the present invention is not limited by the placement of the meltable material in the substrate. In another embodiment, the meltable material is placed adjacent to a channel, while in another embodiment it is placed near the junction of more than one channel.

DEFINITIONS

The following definitions are provided for the terms used herein:

"Biological reactions" means reactions involving biomolecules such as enzymes (e.g., polymerases, nucleases, etc.) and nucleic acids (both RNA and DNA). Biological samples are those containing biomolecules, such proteins, lipids, nucleic acids. The sample may be from a microorganism (e.g., bacterial culture) or from an animal, including humans (e.g. blood, urine, etc.). Alternatively, the sample may have been subject to purification (e.g. extraction) or other treatment. Biological reactions require some degree of biocompatability with the device. That is to say, the reactions ideally should not be substantially inhibited by the characteristics or nature of the device components.

"Chemical reactions" means reactions involving chemical reactants, such as inorganic compounds.

"Channels" are pathways (whether straight, curved, single, multiple, in a network, etc.) through a medium (e.g., silicon) that allow for movement of liquids and gasses. Channels thus can connect other components, i.e., keep components "in communication" and more particularly, "in fluidic communication" and still more particularly, "in liquid communication." Such components include, but are not limited to, gas-intake channels and gas vents.

"Microdroplet transport channels" are channels configured (in microns) so as to accommodate "microdroplets." While it is not intended that the present invention be limited by precise dimensions of the channels or precise volumes for microdroplets, illustrative ranges for channels and microdroplets are as follows: the channels can be between 0.5 and 50 $\mu$m in depth (preferably between 5 and 20 $\mu$m) and between 20 and 1000 $\mu$m in width (preferably 500 $\mu$m), and the volume of the microdroplets can range (calculated from their lengths) between approximately 0.01 and 100 nanoliters (more typically between ten and fifty).

"Conveying" means "causing to be moved through" as in the case where a microdroplet is conveyed through a transport channel to a particular point, such as a reaction region. Conveying can be accomplished via flow-directing means.

"Flow-directing means" is any means by which movement of liquid (e.g. a microdroplet) in a particular direction is achieved. A variety of flow-directing means are contemplated, including but not limited to pumps such as a "bubble pump" described below. A preferred directing means employs a surface-tension-gradient mechanism in which discrete droplets are differentially heated and propelled through etched channels. For continuous flow of liquids, pumps (both external and internal) are contemplated.

A "bubble pump" is one embodiment of a flow-directing means, liquid is introduced into a channel, said channel comprising one or more electrodes positioned such that they will be in contact with a liquid sample placed in said channel. Two electrodes can be employed and a potential can be applied between the two electrodes. At both ends of the electrodes, hydrolysis takes place and a bubble is generated. The gas bubble continues to grow as the electrodes continue pumping electrical charges to the fluid. The expanded bubble creates a pressure differential between the two sides of the liquid drop which eventually is large enough to push the liquid forward and move it through the polymer channel.

When coupled with the capillary valve, a bubble pump can actuate a certain quantity of fluidic samples along the channel. The capillary valve is essentially a narrow section of a channel. In operation, the fluidic sample is first injected in the inlet reservoir. As soon as the fluid is loaded, it moves in the channel by capillary force. The fluid then passes the narrow section of the channel but stops at the edge where the channel widens again. After the fluidic sample is loaded, a potential is applied between two electrodes. At both ends of the electrodes, hydrolysis occurs and bubble is generated. The bubble keeps on growing as the electrodes continue pumping electrical charges to the fluid. The expanding bubble then creates a pressure differential between the two sides of the liquid drop, which eventually large enough to push the liquid forward.

The combination of bubble pump and capillary valve does not require any moving parts and is easy to fabricate. In addition, the device produces a well-controlled fluid motion, which depends on the bubble pressure. The bubble pressure is controlled by the amount of charges pumped by the electrodes. Furthermore, the power consumption of the device is minimal.

"Hydrophilicity-enhancing compounds" are those compounds or preparations that enhance the hydrophilicity of a component, such as the hydrophilicity of a transport channel. The definition is functional, rather than structural. For example, Rain-X™ anti-fog is a commercially available reagent containing glycols and siloxanes in ethyl alcohol. However, the fact that it renders a glass or silicon surface more hydrophilic is more important than the reagent's particular formula.

"Hydrophobic reagents" are used to make "hydrophobic coatings" in channels. It is not intended that the present invention be limited to particular hydrophobic reagents. In one embodiment, the present invention contemplates hydrophobic polymer molecules that can be grafted chmically to the silicon oxide surface. Such polymer molecules include, but are not limited to, polydimethylsiloxane. In another embodiment, the present invention contemplates the use of silanes to make hydrophobic coatings, including but not limited to halogenated silanes and alkylsilanes. In this regard, it is not intended that the present invention be limited to particular silanes; the selection of the silane is only limited in a functional sense, i.e. that it render the surface hydrophobic.

In one embodiment, n-octadecyltrichlorosilane (OTS) is used as a hydrophobic reagent. In another embodiment, octadecyldimethylchlorosilane is employed. In yet another embodiment, the present invention contemplates 1H,1H,2H,2H-perfluorodecyltricholorosilane (FDTS, $C_{10}H_4F_{17}SiCl_3$) as a hydrophobic reagent. In still other embodiments, fluoroalkyl-, aminoalkyl-, phenyl-, vinyl-, bis silyl ethane- and 3-methacryloxypropyltrimethoxysilane (MAOP) are contemplated as hydrophobic reagents. Such reagents (or mixtures thereof) are useful for making hydrophobic coatings, and more preferably, useful for making regions of a channel hydrophobic (as distinct from coating the entire channel).

It is not intended that the present invention be limited to particular dimensions for the hydrophobic regions of the present invention. While a variety of dimensions are possible, it is generally preferred that the regions have a width of between approximately 10 and 1000 µm (or greater if desired), and more preferably between approximately 100 and 500 µm.

A surface (such as a channel surface) is "hydrophobic" when it displays advancing contact angles for water greater than approximately seventy degrees. In one embodiment, the treated channel surfaces of the present invention display advancing contact angles for water between approximately ninety (90) and approximately one hundred and thirty (130) degrees. In another embodiment, the treated microchannels have regions displaying advancing contact angles for water greater than approximately one hundred and thirty (130) degrees.

A "liquid-abutting hydrophobic region" is a hydrophobic region within a channel which has caused liquid (e.g. aqueous liquid) to stop or be blocked from further movement down the channel, said stopping or blocking being due to the hydrophobicity of the region, said stopped or blocked liquid positioned immediately adjacent to said hydrophobic region.

"Initiating a reaction" means causing a reaction to take place. Reactions can be initiated by any means (e.g., heat, wavelengths of light, addition of a catalyst, etc.)

"Liquid barrier" or "moisture barrier" is any structure or treatment process on existing structures that prevents short circuits and/or damage to electronic elements (e.g., prevents the destruction of the aluminum heating elements). In one embodiment of the present invention, the liquid barrier comprises a first silicon oxide layer, a silicon nitride layer, and a second silicon oxide layer.

"Merging" is distinct from "mixing." When a first and second microdroplet is merged to create a merged microdroplet, the liquid may or may not be mixed. Moreover, the degree of mixing in a merged microdroplet can be enhanced by a variety of techniques contemplated by the present invention, including by not limited to reversing the flow direction of the merged microdroplet.

"Nucleic Acid Amplification" involves increasing the concentration of nucleic acid, and in particular, the concentration of a particular piece of nucleic acid. A preferred technique is known as the "polymerase chain reaction." Mullis et al., U.S. Pat. Nos. 4,683,195 and 4,683,202, hereby incorporated by reference, describe a method for increasing the concentration of a segment of target sequence in a mixture of genomic DNA without cloning or purification. This process for amplifying the target sequence consists of introducing a molar excess of two oligonucleotide primers to the DNA mixture containing the desired target sequence. The two primers are complementary to their respective strands of the double-stranded sequence. The mixture is denatured and then allowed to hybridize. Following hybridization, the primers are extended with polymerase so as to form complementary strands. The steps of denaturation, hybridization, and polymerase extension can be repeated as often as needed to obtain are relatively high concentration of a segment of the desired target sequence. The length of the segment of the desired target sequence is determined by the relative positions of the primers with respect to each other, and therefore, this length is a controllable parameter. By virtue of the repeating aspect of the process, the method is referred to by the inventors as the "Polymerase Chain Reaction" (hereinafter PCR). Because the desired segment of the target sequence become the dominant sequences (in terms of concentration) in the mixture, they are said to be "PCR-amplified."

"Substrate" as used herein refers to a material capable of containing channels and microdroplet transport channels. Examples include, but are not limited to, silicon and glass.

"Meltable material" as used herein refers to a material that is at least semi-solid (and preferably completely solid) at ambient temperature, will liquify when heated to temperatures above ambient temperature, and will at least partially resolidify when cooled. Preferably, meltable material at least partially liquifies at a temperature such that the substrate is undamaged. That is to say, at the temperature the meltable material liquifies, the substrate and other metals in the substrate does not liquify (readily tested as set forth in Example 6) and does not change its properties. By "changing properties" it is meant that the substrate or metal maintains it structural integrity, does not change its conductivity and does not liquify. Thus, the characteristic of being meltable is not necessarily associated with a particular melting point. Examples include, but are not limited to, solder, wax, polymer and plastic.

"Solder" as used herein refers to a metal or alloy that is a meltable material. Preferably, the solder is a lower temperature solder, such as set forth in U.S. Pat. No. 4,967,950, herein incorporated by reference. "Lower temperature solder" means a eutectic alloy. While the present invention is not limited to a specific solder, one preferred solder composition for the paste is a 63:37 eutectic alloy of tin:lead. Another compatible solder is a 90% metal composition having a 63:35:2 eutectic alloy of tin:lead:silver. Other desired solder compositions such as eutectic Pb:Sn, Pb:In, Pb:In:Sn etc.

"Heating element" as used herein refers to an element that is capable of at least partially liquify a meltable material. A meltable material is "associated with" a heating element when it is in proximity to the heating element such that the heating element can at least partially melt the meltable material. The proximity necessary will depend on the melting characteristics of the meltable material as well as the heating capacity of the heating element. The heating element may or may not be encompassed within the same substrate as the meltable material.

"Diaphragm" as used herein refers to an element capable of being manipulated such that it can at least partially block the passage of fluid in a channel in one position (extended) and permit the flow of fluid in a channel in another position. An "actuating force" is a force that is capable of extending a diaphragm. A "valve seat" is an element designed to accept a portion of the diaphragm when extended. A "movement means" is a means capable of moving liquified meltable material (e.g., force air, magnetic field, etc.).

A "source of liquid microdroplets" is a liquid source from which microdroplets can be made. Such sources include, but are not limited to, continuous streams of liquid as well as static sources (such as liquid in a reservoir). In a preferred embodiment, the source of liquid microdroplets comprises liquid in a microchannel from which microdroplets of a discrete size are split off.

"Metering", as used herein, refers to the process of sequestering a defined volume of liquid. Metering can be achieved by stopping or trapping fluid (so as to create a first terminus) in a pathway such as a channel, wherein the channel dimensions are known (e.g. diameter, etc) and by creating a second terminus (e.g. by introducing gas in the manner described herein) so as to define a measurable or premeasured length of fluid in the channel.

As used herein, "gas port" refers to an aperture along a microdroplet transport channel through which, in one embodiment, a gas may be introduced into a liquid filled microdroplet transport channel under condition such that the liquid in said channel is divided.

As used herein, "gas transport channel", refers to a conduit for the transport of gas that is in fluidic communication with a microdroplet transport channel.

As used herein, "confined", refers to the retention of a liquid by a hydrophobic region such that an edge of said liquid contacting said hydrophobic is retained within the boundaries defining said hydrophobic region.

As used herein, "intersect[ing]", refers to the convergence of two or more fluid paths.

As used herein, "junction", refers to the point at which two or more fluid paths intersect.

As used herein, "metering pressure", refers to the minimum gas pressure (which in one example is measured at a gas port) required to divide liquid, disposed within a microdroplet transport channel, into a first volume and a second volume.

As used herein, "predetermined liquid volumes", refer to desired volumes of liquid that may be reproducibly metered by the division of some fraction of a liquid filled transport channel by a volume of gas under a metering pressure.

As used herein the word "gas" includes (but is not limited to) air, nitrogen, oxygen, helium, neon, and argon.

As used herein the following symbols define terms incorporated in equations recited herein:

d=channel depth.
g=acceleration due to gravity.
h=height of the excess liquid at the inlet.
$L_d$=length of the discrete drop.
$P_{atm}$=atmospheric pressure.
$P_{l,a}$=liquid pressure at the advancing liquid front.
$P_{l,i}$=liquid pressure at the inlet.
$P_m$=threshold metering pressure.
$P_s$=air pressure required to split a discrete drop in a microchannel.
$R_b$=base radius of the excess liquid at inlet.
$R_c$=mean radius of curvature of a liquid surface.
$R_{c,r}$=mean radius of curvature of the receding interface of a discrete drop.
$R_{c,r\parallel}$=principal radius of curvature of the receding interface of a discrete drop in the plane of the microchannel.
$R_{c,r\perp}$=principal radius of curvature of the receding interface of a discrete drop in a plane orthogonal to the plane of the microchannel.

$R_{c,a}$=mean radius of curvature of the advancing front of the discrete drop.
$R_h$=radius of inlet hole.
$R_v$=radius of the sphericular liquid segment at the inlet.
V=volume of the excess liquid at the inlet hole.
$w_b$=instantaneous width of a growing bubble at the splitter junction.
$w_c$=main channel width.
$w_s$=splitter channel width.
$\theta_p$=contact angle of the liquid at the hydrophobic patch.
$\theta_t$=contact angle of the liquid on top of the device.
O=surface tension of the liquid.
φ=density of the liquid.

DESCRIPTION OF THE DRAWINGS

FIG. 3 shows a schematic of one embodiment of a device to split a nonoliter-volume liquid sample and move it using gas from a gas source.

FIG. 5 is a schematic showing the principle of thermally-induced liquid microdroplet motion in a closed channel.

FIG. 14 presents a theoretical estimation of the liquid pressure at the hydrophobic patch in a microchannel.

FIG. 18 present experimental metering pressures measured in different microchannel devices, varying in channel depth and width.

FIG. 21 is one embodiment of a test device for the present invention.

FIG. 23 is a photograph showing water droplets separated by lines of hydrophobic and hydrophilic regions patterned according to the methods of the present invention.

DESCRIPTION OF THE INVENTION

Figure 1:
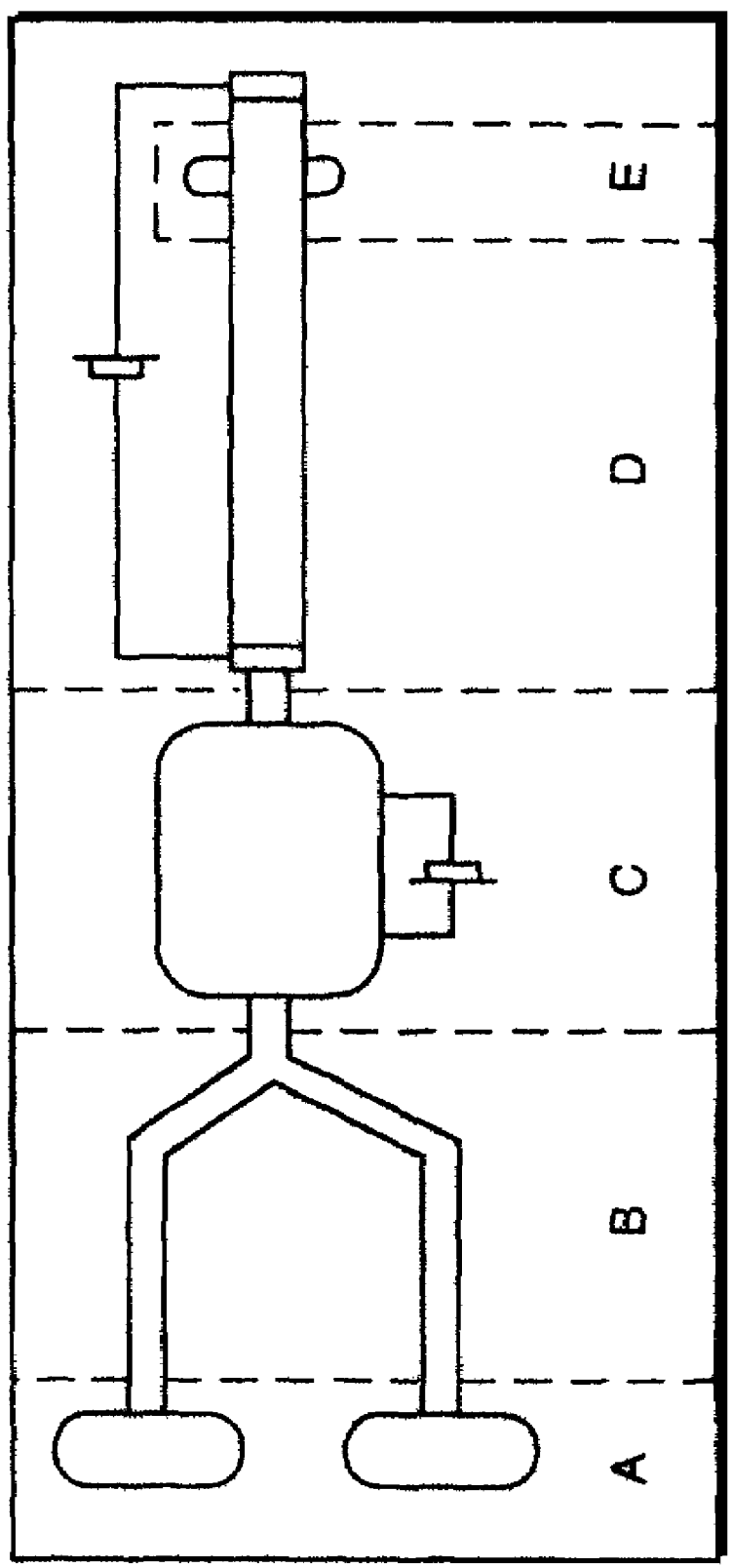
FIG. 1 is a schematic of an integrated analysis system of the present invention.

The present invention relates to microfabrication and biological reactions in microfabricated devices, and in particular, movement and mixing of biological samples in microdroplets through microchannels. The description of the invention involves I) the design of microscale devices (comprising microdroplet transport channels, reaction chambers, electrophoresis ports, and radiation detectors) using silicon and glass substrates, II) the creation (or definition) of microdroplets having a discrete size, III) movement of discrete microdroplets using a surface-tension-gradient mechanism in which discrete microdroplets are differentially heated and propelled through etched channels, IV) flow control with sealed valves, and V) mixing of biological samples for reactions.

I. Design of MicroScale Devices

Although there are many formats, materials, and size scales for constructing integrated fluidic systems, the present invention contemplates silicon microfabricated devices as a cost-effective solution. Silicon is the material used for the construction of computing microprocessors and its fabrication technologies have developed at an unprecedented pace over the past 30 years. While this technology was initially applied to making microelectronic devices, the same techniques are currently being used for micromechanical systems.

Continuous flow liquid transport has been described using a microfluidic device developed with silicon. See J. Pfahler et al., Sensors and Actuators, A21–A23 (1990), pp. 431–434. Pumps have also been described, using external forces to create flow, based on micromachining of silicon. See H. T. G. Van Lintel et al., Sensors and Actuators 15:153–167 (1988). By contrast, the present invention employs discrete droplet transport in silicon (i.e., in contrast to continuous flow) using internal forces (i.e., in contrast to the use of external forces created by pumps).

As a mechanical building material, silicon has well-known fabrication characteristics. The economic attraction of silicon devices is that their associated micromachining technologies are, essentially, photographic reproduction techniques. In these processes, transparent templates or masks containing opaque designs are used to photodefine objects on the surface of the silicon substrate. The patterns on the templates are generated with computer-aided design programs and can delineate structures with line-widths of less than one micron. Once a template is generated, it can be used almost indefinitely to produce identical replicate structures. Consequently, even extremely complex micromachines can be reproduced in mass quantities and at low incremental unit cost provided that all of the components are compatible with the silicon micromachining process. While other substrates, such as glass or quartz, can use photolithographic methods to construct microfabricated analysis devices, only silicon gives the added advantage of allowing a large variety of electronic components to be fabricated within the same structure.

In one embodiment, the present invention contemplates silicon micromachined components in an integrated analysis system, including the elements identified schematically in FIG. 1. In this proposed format, sample and reagent are injected into the device through entry ports (A) and they are transported as discrete droplets through channels (B) to a reaction chamber, such as a thermally controlled reactor where mixing and reactions (e.g., restriction enzyme digestion or nucleic acid amplification) occur (C). The biochemical products are then moved by the same method to an electrophoresis module (D) where migration data is collected by a detector (E) and transmitted to a recording instrument (not shown). Importantly, the fluidic and electronic components are designed to be fully compatible in function and construction with the biological reactions and reagents.

In silicon micromachining, a simple technique to form closed channels involves etching an open trough on the surface of a substrate and then bonding a second, unetched substrate over the open channel. There are a wide variety of isotropic and anisotropic etch reagents, either liquid or gaseous, that can produce channels with well-defined side walls and uniform etch depths. Since the paths of the channels are defined by the photo-process mask, the complexity of channel patterns on the device is virtually unlimited. Controlled etching can also produce sample entry holes that pass completely through the substrate, resulting in entry ports on the outside surface of the device connected to channel structures.

Figure 2:
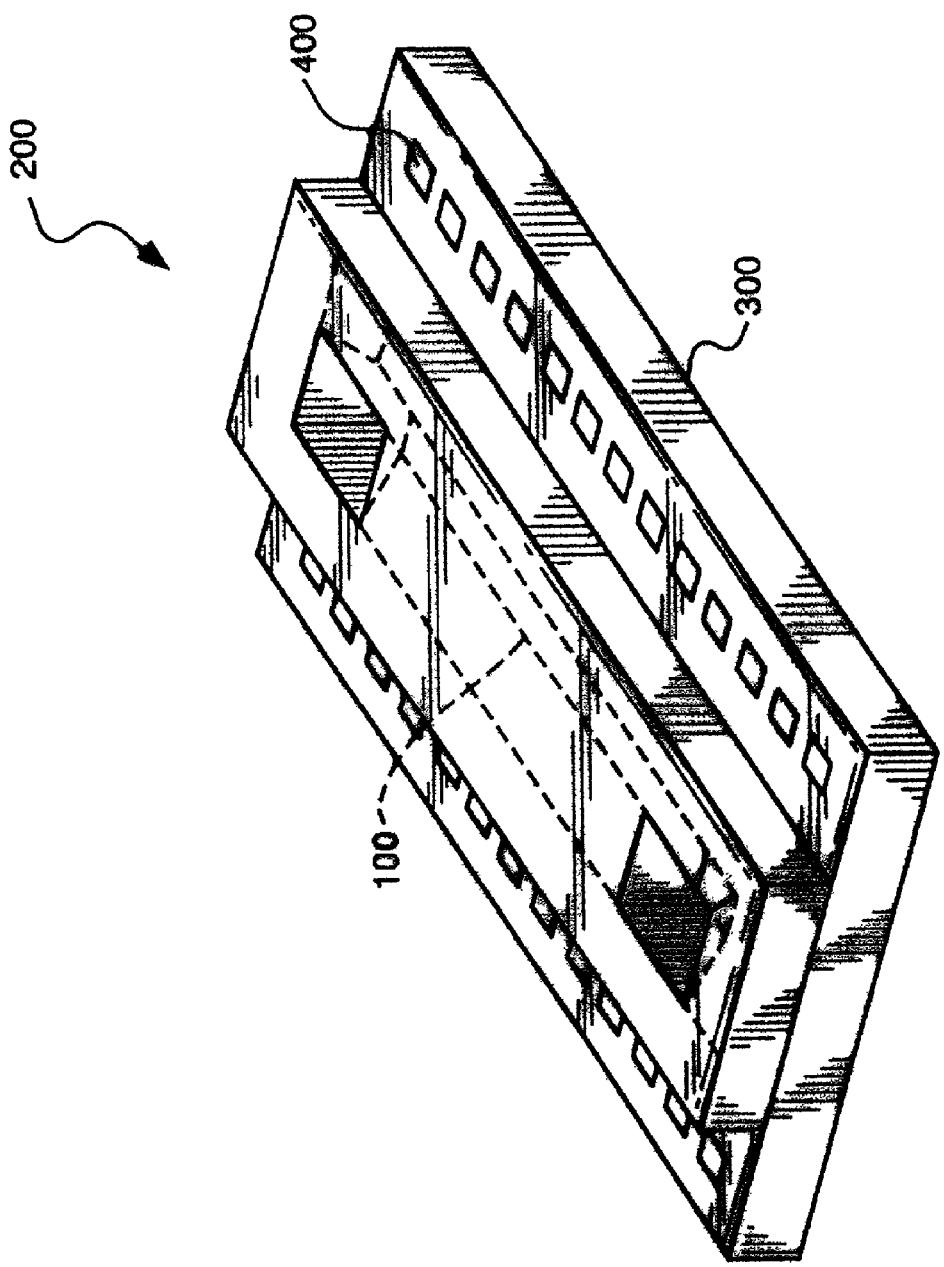
FIG. 2 shows a two-part approach to construction of a silicon device of the present invention.

FIG. 2 shows a two-part approach to construction. Microchannels (100) are made in the silicon substrate (200) and the structure is bonded to a glass substrate (300). The two-part channel construction technique requires alignment and bonding processes but is amenable to a variety of substrates and channel profiles. In other words, for manufacturing purposes, the two-part approach allows for customizing one piece (i.e., the silicon with channels and reaction formats) and bonding with a standardized (non-customized) second piece, e.g., containing standard electrical pads (400).

II. The Creation of MicroDroplets

The present invention contemplates methods, compositions and devices for the creation of microdroplets of discrete (i.e. controlled and predetermined) size. The present invention contemplates the use of selective hydrophobic coatings to develop a liquid-sample injection and motion system that does not require the use of valves. In one embodiment, the present invention contemplates a method of lift-off to pattern hydrophobic and hydrophilic regions on glass, quartz and silicon substrates, involving i) the deposition of a hydrophobic reagent (such as a self-assembled monolayer film of OTS) on a silicon oxide surface patterned by a metal layer and ii) subsequent removal of the metal to give hydrophobic patterns. Other substrates such as plastics can also be used after depositing a think film of silicon oxide or spin-on-glass.

Previous work in patterning hydrophobic surfaces have been done by photocleaving of such monolayer films. The photocleaving procedure uses Deep-UV exposure to make the molecules of the monolayer hydrophilic. By contrast, the present invention contemplates a method which eliminates the use of high-power UV source; rather the preferred method of the present invention uses simple microfabrication procedures.

Following the proper hydrophobic patterning of the surface (e.g. the surface of a microdroplet transport channel), the present invention contemplates the placement of a patterned etched glass cap over the pattern on a flat surface. The hydrophobic/hydrophilic channels thus formed can then be used to move precise nanoliter-volume liquid samples.

FIG. 3 shows a schematic of one embodiment of a device (10) to split a nonoliter-volume liquid sample and move it using external air, said device having a plurality of hydrophobic regions. Looking at FIG. 3A, liquid (shown as solid black) placed at the inlet (20) is drawn in by surface forces and stops in the channel at the liquid-abutting hydrophobic region (40), with overflow handled by an overflow channel and overflow outlet (30). In the embodiment shown in FIG. 3A, the front of the liquid moves by (but does not enter) a gas-intake pathway (50) that is in fluidic communication with the channel; the liquid-abutting hydrophobic region (40) causes the liquid to move to a definite location. Gas from a gas source (e.g. air from an external air source and/or pump) can then be injected (FIG. 3B, lower arrow) to split a microdroplet of length "L". The volume of the microdroplet split-off (60) is pre-determined and depends on the length "L" and the channel cross-section. To prevent the the pressure of the gas (e.g. air) from acting towards the inlet side, the inlet (20) and overflow ports (30) can be blocked or may be loaded with excess water to increase the resistance to flow.

The patterned surfaces can also be used to control the motion of the drop. By placing a hydrophobic gas vent (70) further down the channel, one can stop the liquid microdroplet (60) after moving beyond the vent (70). As the drop (60) passes the vent (70), the air will go out through the vent (70) and will not push the drop further.

One can start moving the drop (60) again by blocking the vent (70). By using a combination of hydrophobic air pressure lines (not shown), hydrophobic vents and strategic opening and/or closing of vents, one can move the liquid drop back and forth for mixing or move it to precise locations in a channel network to perform operations such as heating, reaction and/or separations.

Figure 4A:
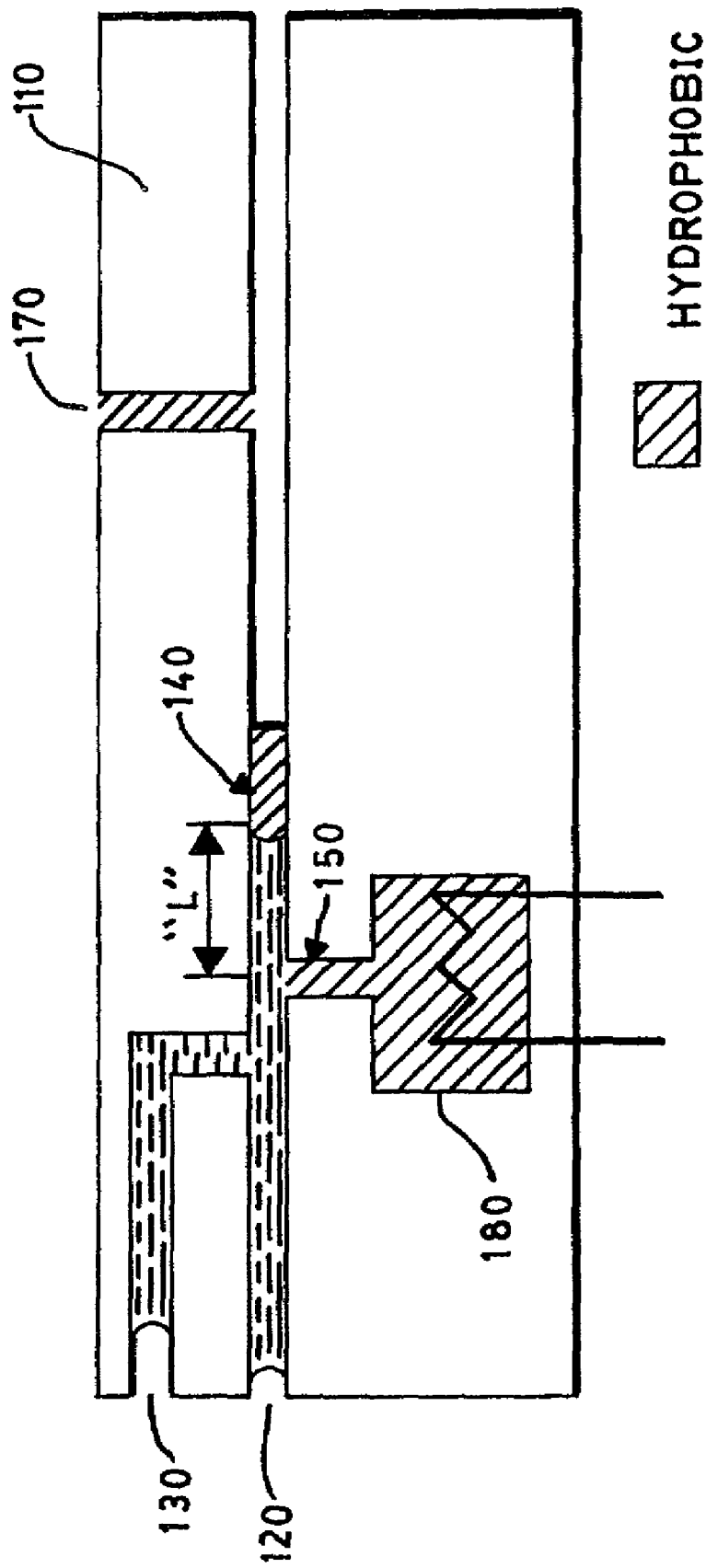
FIG. 4 shows a schematic of one embodiment of a device of the present invention to split, move and stop microdroplets using internal gas pressure generation.
Figure 4B:
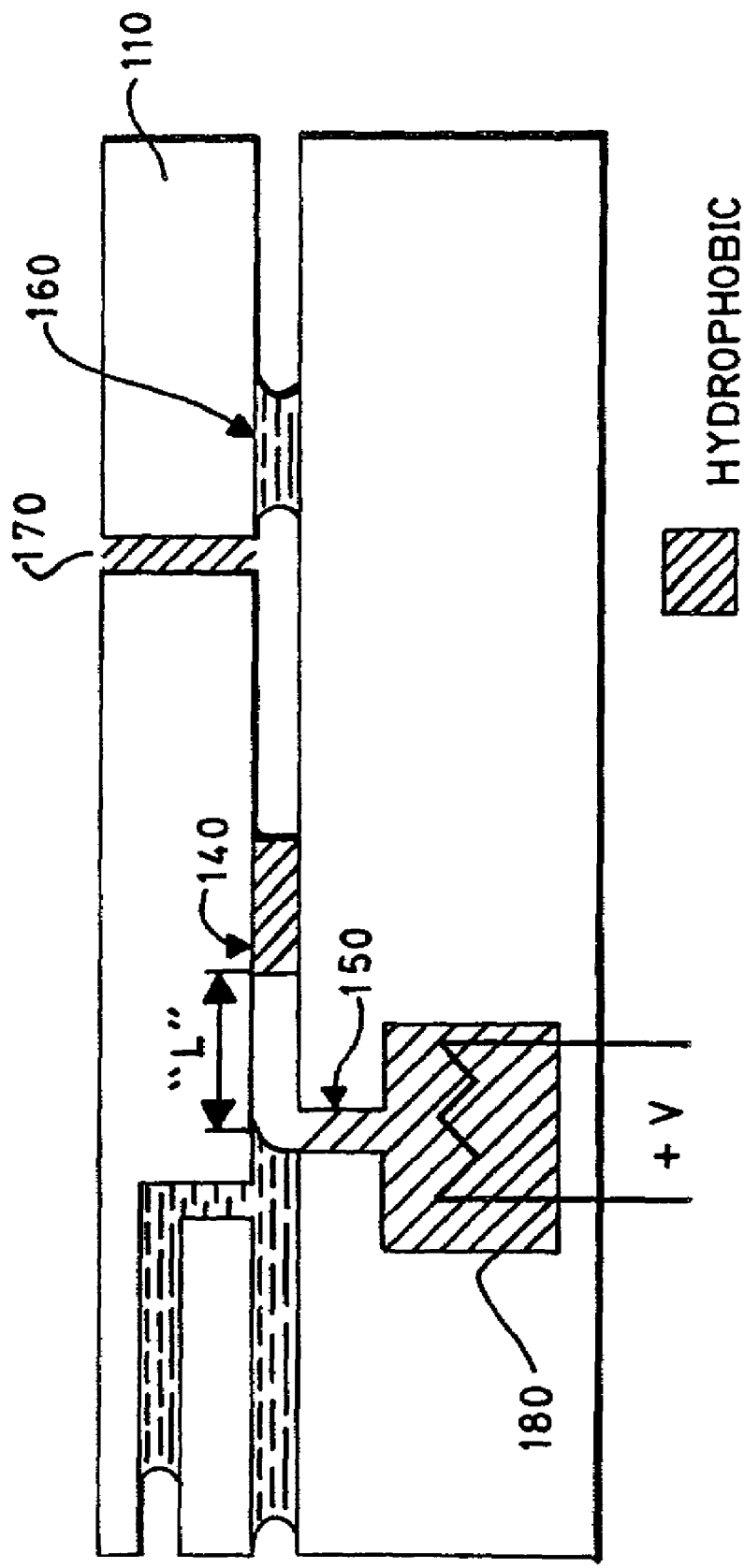

In addition to using external air, one can also use internally generated air pressure to split and move drops. FIG. 4 shows a schematic of one embodiment of a device (110) of the present invention to split (e.g. define), move and stop microdroplets using internal gas (e.g. air) pressure generation, said device having a plurality of hydrophobic regions. Looking at FIG. 4A, liquid (shown as solid black) placed at the inlet (120) is drawn in by surface forces and stops in the channel at the liquid-abutting hydrophobic region (140), with overflow handled by an overflow channel and overflow outlet (130). In the embodiment shown in FIG. 4A, the front of the liquid moves by (but does not enter) a gas-intake pathway (150) that is in fluidic communication with the channel. By heating air trapped inside chambers (180) that are in fluidic communication with the microdroplet transport channel via the gas-intake pathway (150), an increased pressure can be generated. The magnitude of the pressure increase inside a chamber of volume V is related to the increase in temperature and can be estimated by the Ideal Gas relation:

Increasing the temperature of the gas (e.g. air) will cause the pressure inside the chamber to rise until the pressure is high enough to split off a drop (160) and move it beyond the liquid-abutting hydrophobic region (140). In order to avoid the problem of the expanded air heating up the liquid, the chamber may be placed at a distance from the transport channel. Moreover, having the heaters suspended inside the air chamber or placing them on a thin insulation membrane will not only avoid cross-talk, but will involve a minimal power consumption.

The compositions and methods are suitable for devices having a variety of designs and dimensions, including, but not limited to, devices with chamber volumes from 0.24 $mm^1$ to 0.8 $mm^3$ for channel dimensions of 40 $\mu$m by 500 $\mu$m. Drop splitting and motion is seen with 1–3 seconds using voltages between 4.5 volts to 7.5 volts (the resistance of the heaters varied between 9.5 ohms to 11 ohms). The size of the drop split is between approximately 25 and approximately 50 nanoliters, depending on the value "L" used for the channel design. Keeping the heaters actuated keeps the microdroplet moving almost to the end of the channel (a distance of around 12.5 mm); the time taken depends on the voltage applied to the heater and the volume of the chamber. Initiation of drop motion is seen sooner for the operation of devices with smaller chambers. While an understanding of precise mechanisms is not needed for the successful practice of the present invention, it is believed that with smaller chamber, the volume is smaller and higher values of pressure are achieved more quickly. The maximum temperatures reached near the heater are approximately 70° C. measured by the RTD.

III. Movement of Discrete MicroDroplets

The present invention describes the controlled movement of liquid samples in discrete droplets in silicon. Discrete droplet transport involves a system using enclosed channels or tubes to transport the liquid to the desired locations (FIG. 1, B). Within the channels, discrete liquid reagent microdroplets can be injected, measured, and moved between the biochemical analysis components. Discrete droplet movement has three advantages. First, each sample droplet is separated from all others so that the risk of contamination is reduced. Second, in a uniform channel, the volume of each sample can be determined by merely measuring the droplet length. Third, the motion of these droplets can be accomplished with simple heating (i.e., using internal forces and no moving parts). Movement is performed using thermal gradients to change the interfacial tension at the front or back of the droplets and, thus, generate pressure differences across the droplet (FIG. 5). For example, a droplet in a hydrophilic channel can be propelled forward by heating the back interface. The local increase in temperature reduces the surface tension on the back surface of the droplet and, therefore, decreases the interfacial pressure difference. The decreased pressure difference corresponds to an increase in the local internal pressure on that end of the droplet ($P_1$ increases). The two droplet interfaces are no longer in equilibrium, with $P_1$ greater than $P_2$, and the pressure difference propels the droplet forward.

That is to say, forward motion can be maintained by continuing to heat the droplet at the rear surface with successive heaters along the channel, while heating the front surface can be used to reverse the motion of the droplet. Applying a voltage to the wire beneath the channel generates heat under the edge of the droplet. Heating the left interface increases the internal pressure on that end of the droplet and forces the entire droplet to the right. The pressure on the interior of the droplet can be calculated knowing the atmospheric pressure, $P_{atm}$, the surface tension, $\sigma$, and the dimensions of the channel. For a circular cross-section, the interior pressure, $P_I$, is given by $P_I = P_{atm} - (4\sigma \cos\theta)/d$ where d is the diameter of the channel and $\theta$ is the contact angle. Since $\sigma$ is a function of temperature ($\sigma = \sigma_0(1-bT)$ where $\sigma_0$ and b are positive constants and T is the temperature), increasing the temperature on the left end of the droplet decreases the surface tension and, therefore, increases the internal pressure on that end. The pressure difference between the two ends then pushes the droplet towards the direction of lower pressure (i.e., towards the right). The aqueous droplet shown is in a hydrophilic channel ($0 < \theta < 90$); for a hydrophobic channel ($90 < \theta < 180$), heating the right edge would make the droplet move to the right.

Contact angle hysteresis (the contact angle on the advancing edge of the droplet is larger than the contact angle on the retreating edge) requires a minimum temperature difference before movement will occur. The velocity of the droplet after motion begins can be approximated using the equation $v = AEPd^2/32\mu L$ where AEP is the pressure difference, $\mu$ is the viscosity of the solution, and L is the length of the droplet. The present invention contemplates temperature differences of greater than thirty (30) degrees Centigrade to create movement. Experiments using temperature sensors arrayed along the entire channel indicate that a differential of approximately 40° C. across the droplet is sufficient to provide motion. In these experiments, the channel cross-section was 20 $\mu$m×500 $\mu$m, and the volume of each of these droplets can be calculated from their lengths and is approximately 100 nanoliters for a 1 cm long droplet.

IV. Flow Control with Sealed Valves

The present invention contemplates the use of sealed valves to control fluid flow. While the present invention is not limited to a particular sealing method, in one embodiment, an actuating force pushes a diaphragm against a valve seat to restrict fluid flow and the diaphragm is then sealed to the valve seat. In such an embodiment, the solder pads are associated with a heating element that can melt the solder. This liquified solder flows over areas of the valve seat and diaphragm to cover contamination, cracks and crooks between the diaphragm and valve seat. With the actuating force still holding the diaphragm and valve-seat together, the heating element is turned off to allow the solder to cool and re-solidify. Upon solidification, the actuating force can be released and the valve is sealed. To open the valve again, the solder can be liquified without applying an actuation force.

In a preferred embodiment, the valve is designed such that solder pads are placed on the diaphragm or valve seat. While the present invention is not limited to a precise method of placing these solder pads, it is specifically contemplated that they can be electroplated.

V. Mixing Biological Samples in Reactions

Figure 6A:
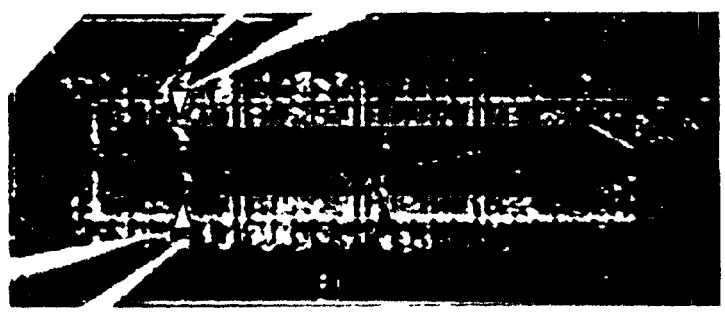
FIG. 6A shows a selected frame of a videotape wherein two microdroplets are at their starting locations in the branches of the Y-channel.
Figure 6B:
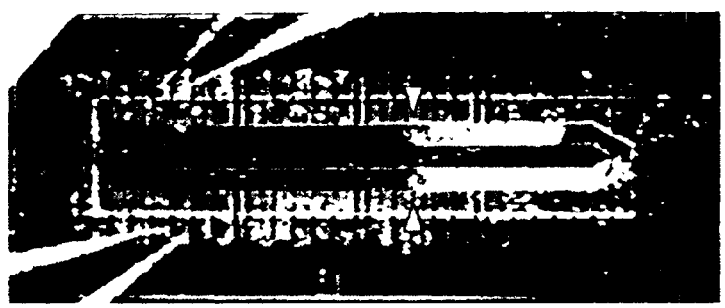
FIG. 6B shows movement by heating the left interface of both microdroplets.
Figure 6C:
FIG. 6C shows the microdroplets at the intersection.

Droplet motion (described generally above) is contemplated as one step in a pathway. The other steps typically involve sample mixing and a controlled reaction. For example, the integral heaters arrayed along the entire surface of the channel used for droplet motion also allow for a region of a channel to be used as a thermal reaction chamber. For sample mixing prior to the reaction, a Y-channel device is contemplated (FIG. 6A). In such a device, a first droplet containing a first sample (e.g., nucleic acid) is moved along one channel of the Y-channel device, and a second droplet containing a second sample (e.g., a restriction digest enzyme in digestion buffer) is moved along the other channel of the Y-channel device (FIGS. 6B and 6C)

Following sample merging (FIG. 6D), there is the concern that the combined samples have not been properly mixed. That is to say, if two similar microdroplets enter the single channel in laminar flow at the same flow rate, they will form an axially uniform droplet but will not be mixed width-wise. Width-mixing can be accomplished in a number of ways.

First, there is simple diffusion, although, for large DNA molecules, the characteristic time for this mixing could be on the order of several hours or more. Circulation patterns generated inside the droplets during movement and heating significantly reduce this time. In this regard, the present invention contemplates maintaining the mixture as a heated mixture (e.g., maintaining the temperature at 65° C. for 10 minutes) using the integral heaters and temperature sensors.

Second, the present invention contemplates mixing by reversing the flow direction of the mixture over a relatively short distance in the channel. While a variety of reverse flow approaches are possible, one or two direction changes over a distance comprising approximately two droplet lengths has been found to be adequate.

Finally, there is the mixing approach wherein the mixture is moved against or over physical obstacles. For example, the mixture can be either "crashed" back against merge point of the Y-channel or simply moved over deliberate imperfections in the channel (i.e., "roller coaster" mixing).

Successful mixing, of course, can be confirmed by characterization of the product(s) from the reaction. Where product is detected, mixing has been at least partially successful. The present invention contemplates, in one embodiment, using electrophoresis to confirm product formation.

VI. Nanoliter Liquid Metering

The first step involved, prior to manipulating and controlling discrete drops inside a microchannel network, is the injection and metering of nanoliter-sized discrete drops. As such, it is crucial for the success of a variety of miniaturized chemical analysis systems. The ability to meter nanoliter-sized drops not only minimizes the usage of samples and reagents, but also reduces the total size of the complete analytical system. Precision in on-chip metering is also necessary in order to quantify the subsequent sample preparation (e.g., mixing, reaction) steps as well as to compare between experiments performed in different devices.

Figure 11:
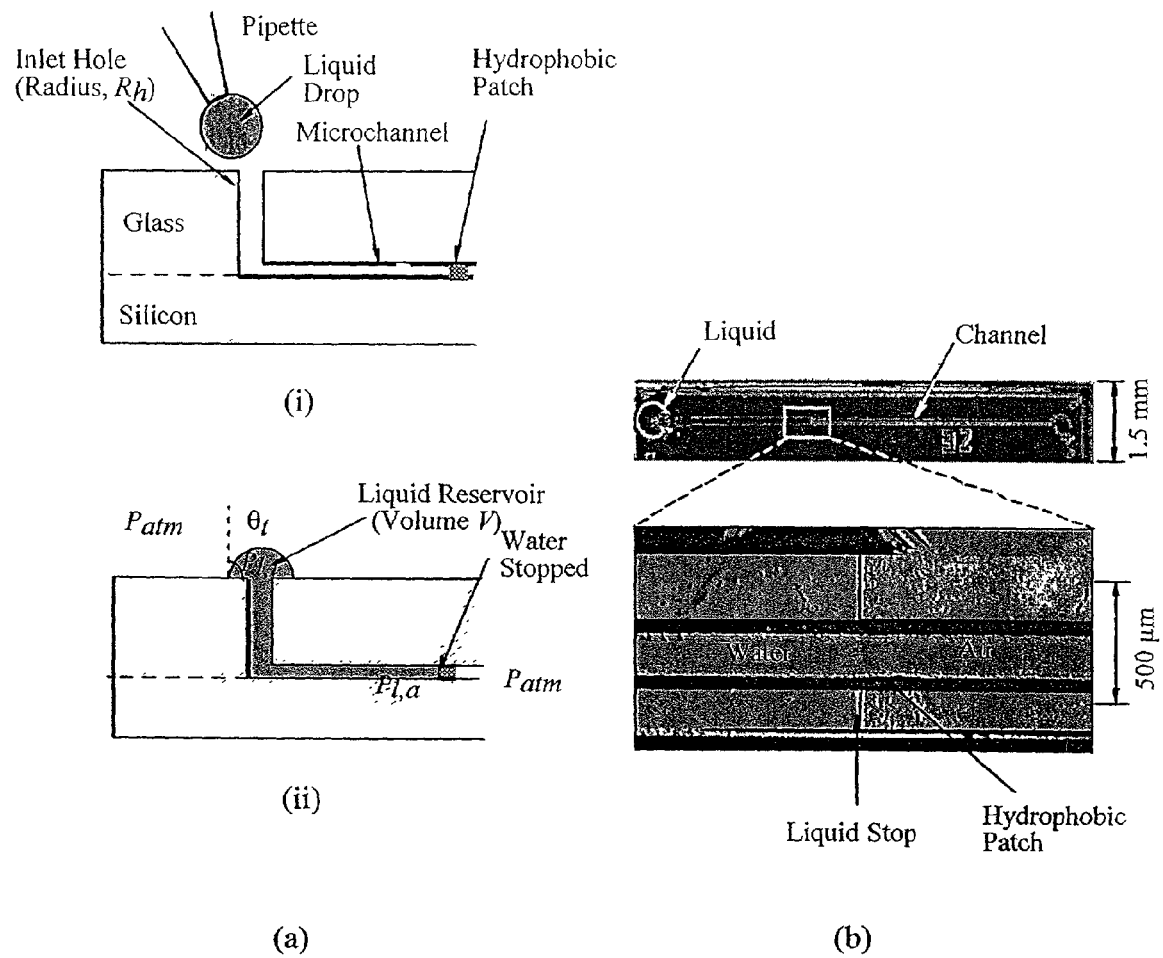
FIG. 11 illustrates stopping liquid at a hydrophobic patch inside a microchannel.

FIG. 11 presents a liquid drop (~$\mu$l) placed at the inlet hole using a pipette (i). The liquid is drawn inside the microchannel by capillary forces and is stopped at the hydrophobic patch (ii). (c) Photograph of a microchannel (100 $\mu$m×20 $\mu$m) device showing liquid being stopped at the hydrophobic patch (200 µm wide). The ability of a hydrophobic patch to stop liquid inside a microchannel (FIG. 11) can be ascertained by studying the net pressure acting on the liquid inside the microchannel after the advancing liquid front has reached the hydrophobic patch (FIG. 1a(ii)). A positive pressure difference is required for additional liquid to flow from the inlet hole over the hydrophobic patch. In order for the hydrophobic patch to stop the flow of liquid from the reservoir, the pressure difference, ignoring gravity effects, must be equal to or less than zero:

$$\Delta P = P_{l,i} - P_{l,a} \leq 0 \quad (1)$$

In the above expression, $P_{l,i}$ is the pressure in the liquid reservoir and $P_{l,a}$ is the pressure in the liquid side when the advancing liquid front reaches the hydrophobic patch. These pressures must be calculated in order to design a device that will successfully control the fluid position. Note that the height of liquid in the inlet hole is of the order of a millimeter and pressure due to liquid height is negligible ($\phi gh \sim 1000$ kg/m$^3 \times 9.8$ m/s$^2 \times 1$ mm $\sim 10$ N/m$^2$ only).

The internal liquid pressures are not equal to atmospheric pressure due to surface tension forces but the pressures can be calculated knowing the radius of curvature of the liquid-air interfaces ($R_c$) and the surface tension of the liquid (o).

Figure 13:
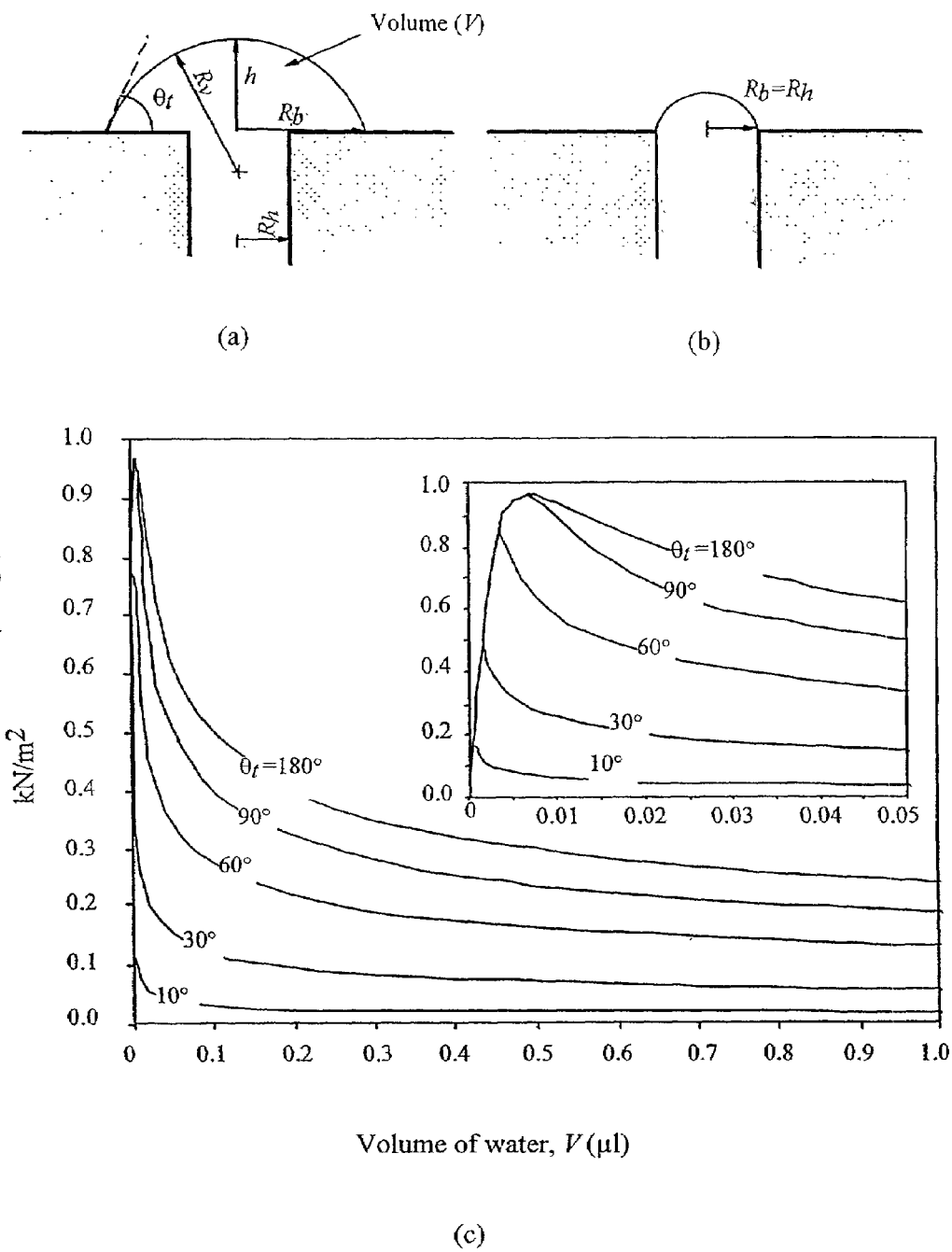
FIG. 13 presents theoretical estimation of the inlet liquid pressure from the curvature of the liquid drop.

As illustrated by FIG. 13a, a liquid drop placed at the inlet assumes a section of a sphere (radius $R_v$) with base radius $R_b$ and height h. The liquid-air interface experiences a contact angle of $\theta_t$. As show in FIG. 13b, once $R_b = R_h$, the interface gets pinned at the periphery of the hole and the base radius remains constants. As illustrated by FIG. 13b, the pressure difference across the liquid-air interface at the inlet is estimated using Laplace's equation for water (σ=72 mN/m) for different drop volumes. The pressure inside the excess liquid drop ($P_{l,i}$) at the inlet hole (FIG. 13a) is higher than atmospheric pressure. The difference in pressure can be calculated using Laplace's equation and is given by the following relationship. Adamson, A. W., *Physical Chemistry of Surfaces*, 5th ed., Wiley, N.Y., 1990, 395–399:

$$(2) \quad P_{l,i} - P_{atm} = \frac{2\sigma}{R_c}. \quad (2)$$

The mean radius of curvature of a given volume of liquid (V) can be calculated knowing the shape of the drop. Surface tension works to minimize the surface area and create a spherical segment whereas gravity tends to flatten the drop. For drop volumes of the order of 1 µl, the surface tension forces are more than an order of magnitude higher than gravity forces. The liquid drop therefore assumes the shape of a spherical segment (Radius, $R_v$). The two principal radii of curvatures of the liquid surface are both equal to the radius of the sphericular segment, $R_v$, and therefore the mean radius of curvature is given by:

$$R_c = R_v \quad (3)$$

The radius of the liquid drop ($R_v$) can be calculated from the volume of the liquid drop (V) and the contact angle $\theta_t$ experienced by the liquid on the top of the device (FIG. 13a). $R_v$ is given as:

$$(4) \quad R_v = \left[ \frac{6V}{\pi(1 - \cos\theta_t)^2(4 - \cos\theta_t - 3\cos^2\theta_t)} \right]^{\frac{1}{3}} \quad (4)$$

Note that Equation (4) holds for any value of contact angle $\theta_t$, but only if the liquid extends past the inlet hole (i.e., $R_b > R_h$). Once $R_b = R_h$ (FIG. 13b), $R_v$ can be calculated from the hole radius ($R_h$) and liquid height h as:

$$(5) \quad R_v = \frac{R_h^2 + h^2}{2h}. \quad (5)$$

The liquid height can be calculated from the following expression involving liquid volume and the hole radius:

$$(6) \quad h^3 + 3R_h^2 h - \frac{6V}{\pi} = 0 \quad (6)$$

Using Equations (2) through (6), the pressure difference across the liquid-air interface at the inlet hole can be calculated and plotted as a function of drop volumes (V) for different top contact angles and a constant hole radius (FIG. 13c). The increase in interfacial pressure with a decrease in the volume of liquid is due to the decrease in $R_c$ as a function of volume. However, once $R_b = R_h$, further decreasing V results in an increase in $R_c$, and therefore, a decrease in pressure. The rise in interfacial pressure for $R_b > R_h$ is very prominent for drop volumes less than 0.05 µl (see insert in FIG. 13c). Note that as the contact angle increases from 0° to 180°, the radius of curvature decreases and, therefore, the liquid pressure increases.

The interface pressure of the liquid front advancing into the capillary ($P_{l,a}$) can also be determined. FIG. 14a demonstrates the liquid-air interface inside the rectangular capillary is a bent cylinder which maintains a constant contact angle of $\theta_p$ at all the walls. FIG. 14b presents the pressure difference across the liquid-air interface is calculated using Laplace's equation for water (σ=72 mN/m) for different slit-type microchannels, varying in the depth. The interface pressure of the liquid front advancing into the capillary ($P_{l,a}$) can also be determined. The curved surface is such that a constant contact angle $\theta_p$ is maintained at the wall of the channel (FIG. 14a). For a rectangular capillary, we have the following relation for the mean radius of curvature. Kim, E.; Whitesides, G. M. *J. Phys. Chem. B*, 1997, 101, 855:

$$(7) \quad R_c = \left[ \cos\theta_p \left( \frac{1}{w_c} + \frac{1}{d} \right) \right]^{-1}. \quad (7)$$

In the above expression, $w_c$ is the width and d is the depth of the microchannel. Using Equation (7) and a relationship similar to Equation (2), the interfacial pressure difference can be calculated for different channel cross-sections and contact angles. The liquid pressure is given by the following relationship:

$$(8) \quad P_{l,a} = P_{atm} - 2\sigma\cos\theta_p \left( \frac{1}{w_c} + \frac{1}{d} \right). \quad (8)$$

The microchannels used in this study have depths of 20–60 µm and widths of 100–500 µm. At these dimensions, the interface pressure is strongly dependent on the channel depth, as shown in FIG. 14b, and increases with decreasing channel depths. Moreover, the pressure increases with an increase in the contact angle.

As stated earlier, $P_{l,i}-P_{l,a} \leq 0$ in order to stop the liquid sample at the hydrophobic patch:

$$(9) \quad \left[\frac{\pi(1-\cos\theta_t)^2(4-\cos\theta_t-3\cos^2\theta_t)}{6V}\right]^{\frac{1}{3}} + \frac{\cos\theta_p}{d} \leq 0 \quad (9)$$

Note that the above expression is obtained using equations (1)–(4) and (8) and holds for the base radius of the liquid volume being larger than the inlet hole radius ($R_b > R_h$) and ($d \ll w_c$). From Equation (9), we can see the channel depth must be sized for the liquid volume placed at the inlet and for the hydrophobic contact angle of the patch and the top surface of the device.

Figure 15:
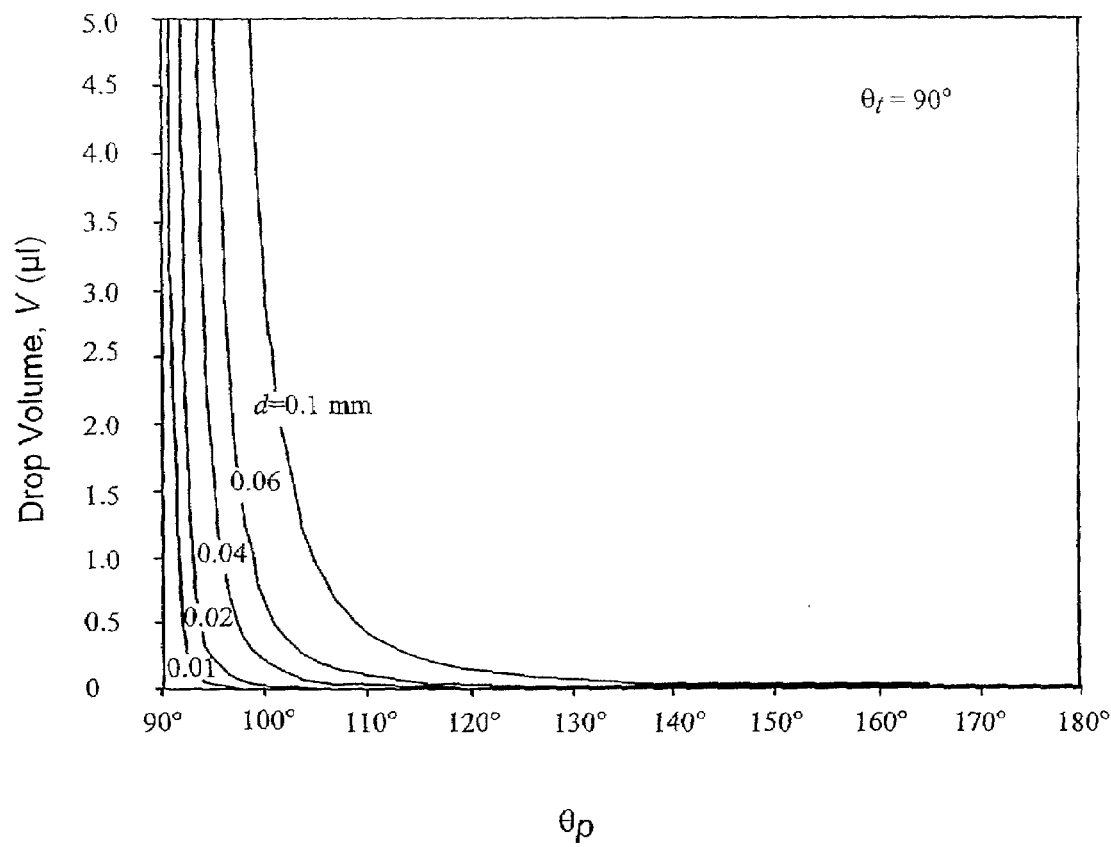
FIG. 15 defines liquid stopping criterion at the hydrophobic patch.

FIG. 15 presents plots where the inlet pressure is balanced by the pressure at the hydrophobic patch. In order for liquid to be stopped at the patch (contact angle $\theta_p$), the liquid volume should be higher than that on the plot for a given channel depth. FIG. 15 also plots lines of $P_{l,i}-P_{l,a}=0$ for different channel depths and a top contact angle ($\theta_t$) of 90°. For a given patch contact angle ($\theta_p$), there exists a threshold drop volume which lies on the ($P_{l,i}-P_{l,a}=0$) lines for different channel depths. The liquid volume should be higher than the threshold amount for the hydrophobic patch to stop liquid. Mechanical pipetters, used routinely in laboratories can pipette drops as small as a microliter with an accuracy of half a microliter. For such drop volumes (few $\mu l$), a contact angle of 100° is high enough to stop liquid in microchannels with depths below 60 $\mu m$, as observed in experiments (FIG. 11) and predicted by theory (FIG. 15).

Figure 16:
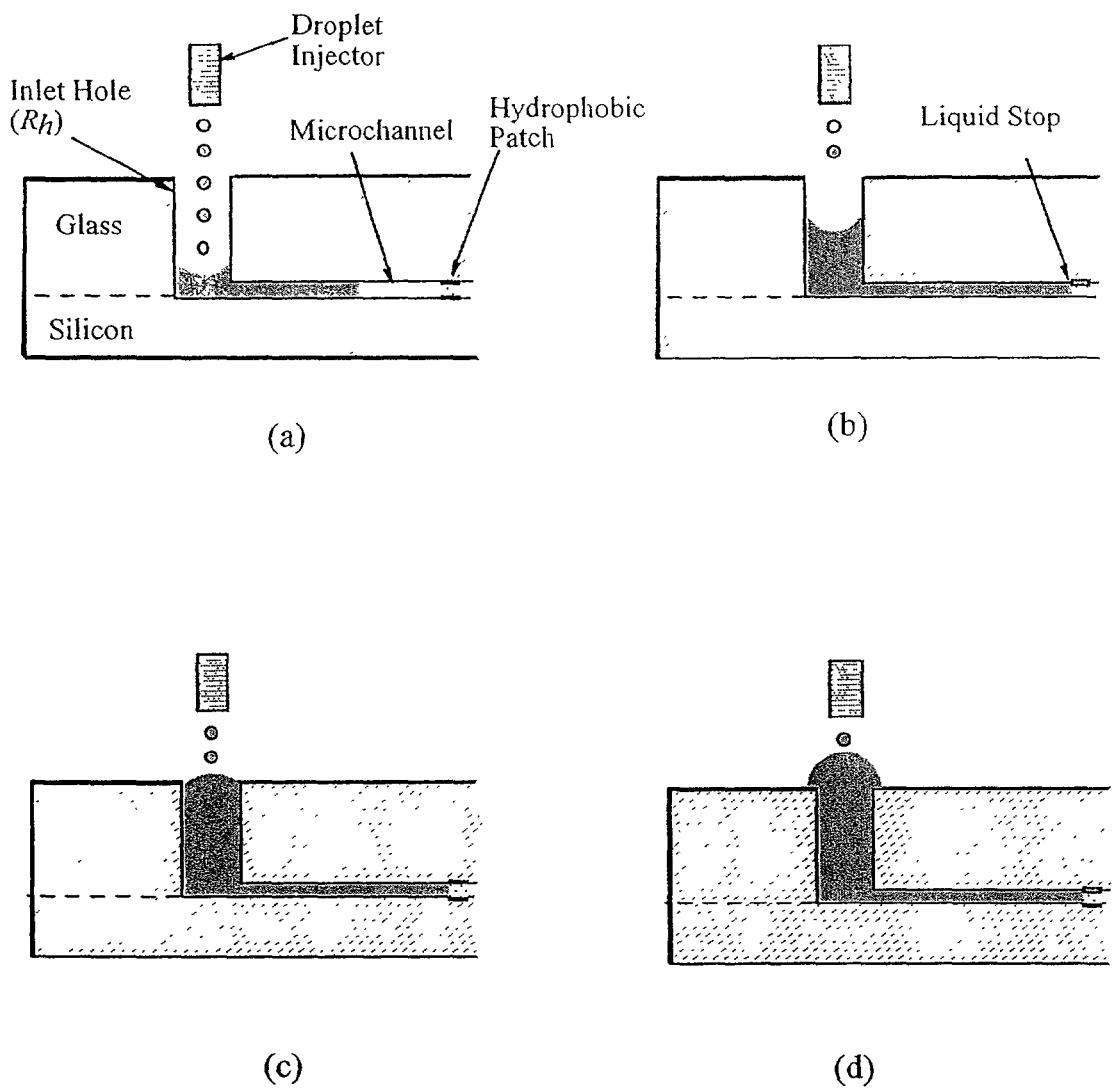
FIG. 16 illustrates liquid introduction by piezoelectric droplet dispensing.

In the above discussions, we have described liquid being introduced into microchannels by placing excess liquid on the microchannel device. An alternative way of introducing liquid is presented in FIG. 16 wherein liquid starts filling in the microchannel up to the hydrophobic patch and then rises in the inlet hole (16b–c) until it overflows out of the inlet hole (16d). Another method is to inject minute droplets in succession into the microchannel (FIG. 16a) using piezoelectric or other aerosol-type dispensers. The droplet dispensing may be stopped either (a) when the inlet hole begins to fill (FIG. 16b), (b) when the inlet hole is full (FIG. 16c), or after excess liquid has spilled out of the inlet hole (FIG. 16d).

The first two ways of filling of the microchannel (FIG. 16b and c) will always ensure that the liquid preferentially moves into the smaller channel due to capillary action and stop at the hydrophobic patch ($\theta_p > 90°$). However, once the liquid overflows out of the inlet hole (FIG. 16d), the liquid pressure at the inlet may become more than atmospheric and will oppose the liquid pressure at the hydrophobic patch. The liquid pressure at the inlet depends on the inlet hole radius (see Equations (2), (3) and (5)) and therefore the inlet hole may be designed to ensure liquid is stopped at the hydrophobic patch for all three ways of microchannel filling (FIG. 16b–d).

As discussed earlier, the ability of a hydrophobic patch to stop liquid at a hydrophobic patch can be determined by studying the net pressure acting on the liquid (Equation (1)). The liquid pressure at the inlet can be evaluated using Equations (2), (3), (5) and (6), the maximum value of which is obtained when ($h=R_h$):

$$(10) \quad (P_{li})_{max} = P_{atm} + \frac{2\sigma}{R_h} \quad (10)$$

The liquid pressure at the hydrophobic patch can be evaluated as before, using Equation (8).

In order to satisfy the condition $P_{l,i}-P_{l,a} \leq 0$ for liquid to stop at the patch, we have the following relationship:

$$(11) \quad \frac{1}{R_h} + \frac{\cos\theta_p}{d} \leq 0 \quad (11)$$

Note that we have assumed the channel depth to be small compared to the channel width (i.e. $d \ll w_c$) while deriving the inequality given in (11). Therefore, the inlet hole may be sized in order to stop liquid in a channel for the hydrophobic contact angle of the patch. The inlet hole has to be made larger than the threshold hole radius ($=d/\cos\theta_p$) in order to stop liquid at the patch. Note as the hydrophobic contact angle increases, the threshold hole radius decreases. Increasing the channel depth also increases the threshold radius.

A. Liquid Splitting Using Air Pressure

Figure 17:
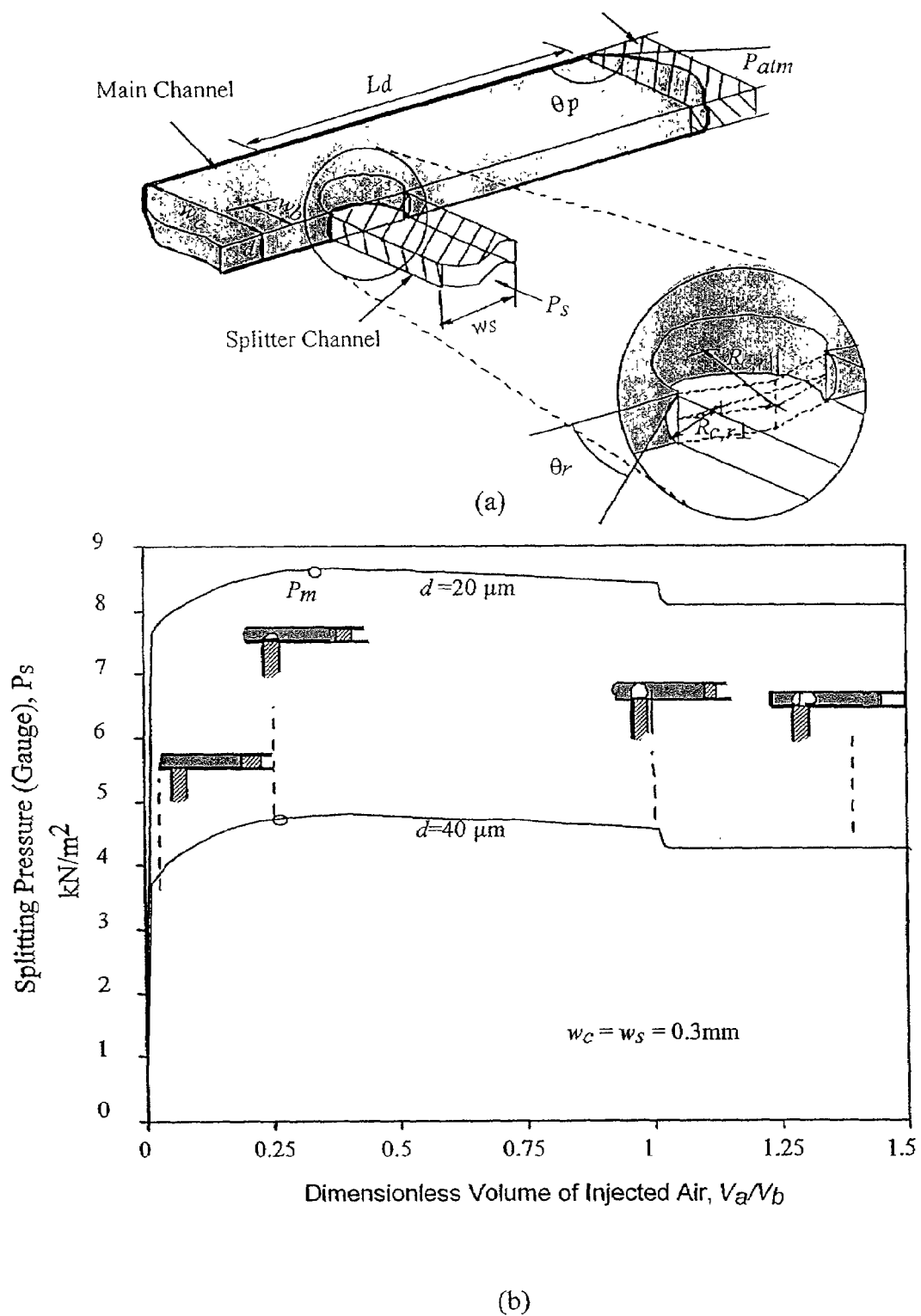
FIG. 17 presents a theoretical estimation of liquid splitting pressures.

The splitting of liquid in the microchannel is caused by the air pressure induced-growth of an air bubble at the splitting junction As demonstrated by FIG. 17a, the liquid interfacial pressures of the splitting liquid drop can be estimated knowing the instantaneous shape of the liquid-splitting air bubble and the advancing liquid front. FIG. 17b shows that the splitting pressure may be determined from the interface pressures and plotted as a function of air volume injected. The x-axis is made dimensionless by dividing the volume of injected air by the volume of a bubble at the point of liquid splitting. The surface tension ($\sigma=72$ mN/m) and contact angle values ($\theta_r=30°$ and $\theta_p=100°$) correspond to that of water. The pressure requirements for metering, $P_s$, can be estimated by studying the shape of the air-liquid interface of the growing bubble and the advancing front of the liquid. The pressure difference is given by:

$$(12) \quad P_s - P_{atm} = 2\sigma\left[\frac{1}{R_{c,r}} - \frac{1}{R_{c,a}}\right], \quad (12)$$

where $R_{c,r}$ and $R_{c,a}$ are the radius of curvature of the receding and the advancing liquid interfaces respectively.

The mean radius of curvature of receding liquid interface, $R_{c,r}$ will vary as the air bubble grows and can be estimated from the principal radius of curvatures as:

$$(13) \quad R_{c,r} = 2\left[\frac{1}{R_{c,r\parallel}} + \frac{1}{R_{c,r\perp}}\right]^{-1}. \quad (13)$$

In the above expression, $R_{c,r\parallel}$ and $R_{c,r\perp}$ are the principal radii of curvature in the plane of the microchannel device and its orthogonal plane, respectively. As air is injected into the splitter channel, the liquid interface at the hydrophobic splitting channel changes from a flat surface ($R_{c,r\parallel}=R_{c,r\perp}=\infty$) to a cylindrical shape:

$$\left(R_{c,r\|} = \infty \text{ and } R_{c,r\perp} = \frac{d}{2\cos\theta_r}\right).$$

Further air introduction will cause the interface to curve in the plane of the channel as well:

$$\left(R_{c,r\|} = \frac{w_b^2 + \frac{w_s^2}{4}}{2w_b}, R_{c,r\perp} = \frac{d}{2\cos\theta_r}\right).$$

The radius $R_{c,r\|}$ will vary as the bubble (width, $w_b$) grows. After the discrete drop is split ($w_b=w_c$), the receding interface shape will assume the shape of a bent cylinder with a contact angle $\theta_r$ maintained at all the walls:

$$\left(=>R_{c,r\|} = \frac{w_c}{2\cos\theta_r} \text{ and } R_{c,r\perp} = \frac{d}{2\cos\theta_r}\right).$$

Note that the above mechanism of bubble growth is assumed based on the experimental observation that a threshold pressure is required before any bubble curvature is observed in the plane of the channel.

Figure 12:
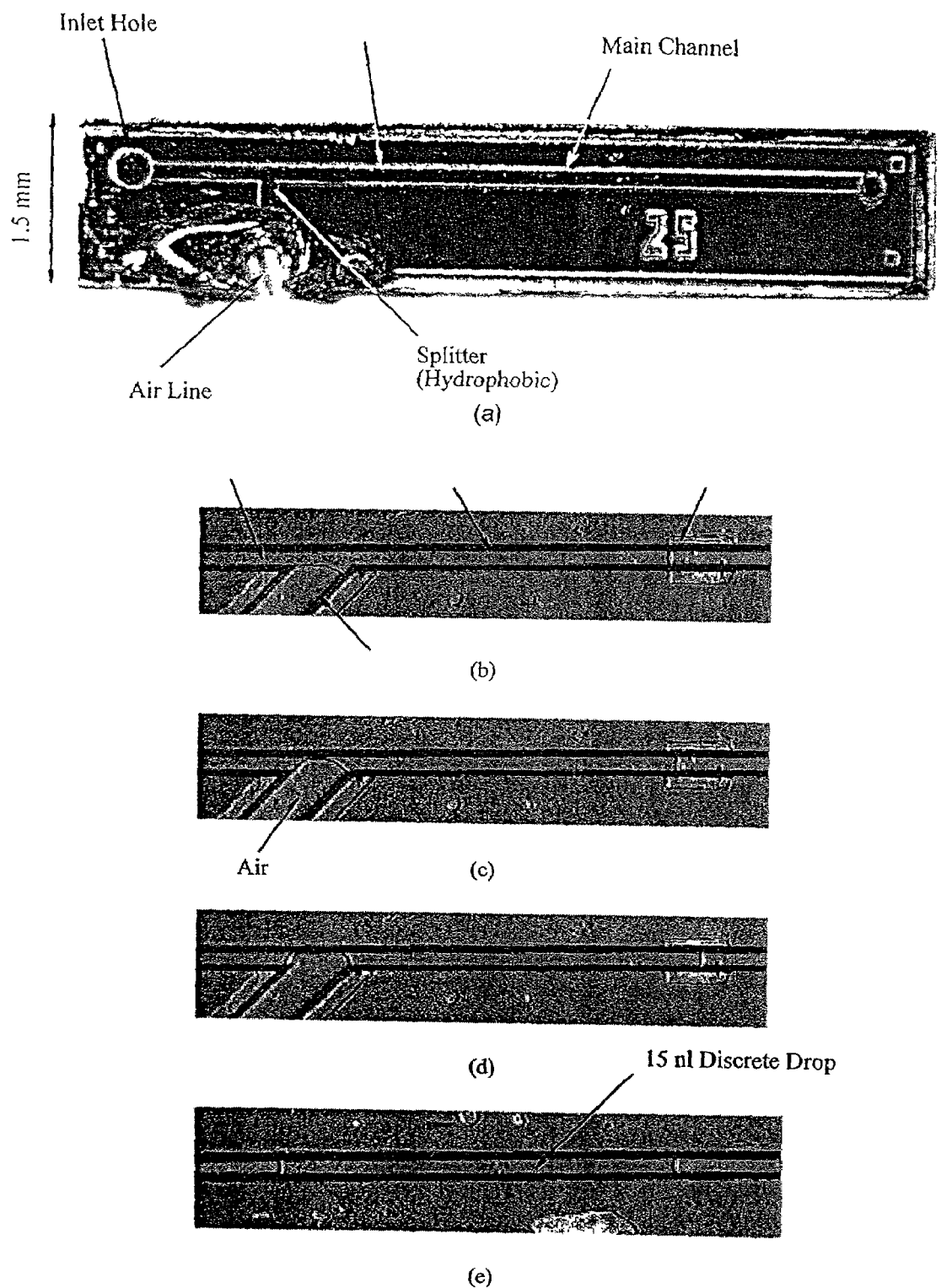
FIG. 12 presents photographs of a nanoliter liquid metering device.

FIG. 12 presents, in addition to a liquid-stopping hydrophobic patch in the microchannel, a hydrophobic splitter channel, which is pressurized to split a liquid drop. A sequence of close-up photographs (12(b)–(e)) show liquid being stopped at the hydrophobic patch and metering of a discrete drop due to application of air pressure at the splitter junction. The volume of the metered drop is determined by the product of L, the distance between the hydrophobic patch and the splitter junction and A, the cross-sectional area of the channel. Therefore, the bubble surface must be bending in the plane perpendicular to the channel before it bends in the plane of the microchannel (FIG. 12c).

The mean radius of curvature of the advancing liquid front, $R_{c,a}$ remains constant during the splitting process and is given by Equations (2) and (7). Note that the advancing liquid is in the hydrophobic part of the channel ($\theta_p>90°$) and therefore $R_{c,a}$ is negative.

The pressure required to split a drop can therefore be estimated from the channel dimensions ($w_c$, $w_s$ and d), hydrophilic and hydrophobic contact angles and the surface tension of the liquid. We have calculated this pressure as a function of volume of air injected, as shown in FIG. 17b, for two different channel depths. As can be seen from the figure, each of the pressure profile has a maximum pressure, termed the metering pressure ($P_m$). $P_m$ is given by the following relationship:

$$(14) \quad P_m - P_{atm} = 2\sigma\left[\frac{1}{w_s} + \frac{\cos\theta_r}{d} - \cos\theta_p\left(\frac{1}{w_c} + \frac{1}{d}\right)\right]. \tag{14}$$

Please note that $P_s=P_m$ when the width of the bubble equals half the splitter width ($w_b=w_s/2$). In order to successfully meter a drop, a pressure greater than the metering pressure must be applied. The metering pressure is strongly dependent on the reciprocal of the channel depth, ranging from 2.5 kN/m² for a 100 µm deep channel to 150 kN/m² (>1 atmosphere) for a one micrometer deep channel.

As presented in FIG. 18a, the error bar in metering pressure for each microchannel device represents different experiments performed in the same microchannel device. The theoretical estimates are plotted as two solid lines because the exact value of channel depth (after assembly) and the incipient contact angles are not known. An error of ±1 µm is used for the channel depth and an error of ±5° is used for the contact angles. As shown in FIG. 18b the metering pressure is independent of the drop length, as seen in microchannel devices where the length of the drop is varied from 1 to 4 mm.

Experiments performed to measure metering pressures ($P_m$) show a strong dependence on the channel depth (FIG. 18a), as predicted by the theory. Experimental metering pressures varied from 3.5 kN/m² for a 40 µm deep channel to 9 kN/m² for a 20 µm deep channel. Increasing the channel width increases the radius of curvatures of the liquid interfaces and thereby, reduces the metering pressure. The length of the drop (1–5 mm) has no effect on the pressure drop (FIG. 18b).

The measured metering pressures may be compared with the theoretical predictions described earlier. In order to predict metering pressures in a microchannel (known $w_c$, d and $w_s$), precise values of the liquid contact angles ($\theta_r$ and $\theta_p$) are required. Liquid contact angle values can vary from the static contact angle by 5–10° during incipient motion, as in metering. Due to inherent difficulty in measuring the actual contact angle values, we have used the static contact angle values measured earlier ($\theta_r=30°$ and $\theta_p=100°$) with an error of 5° to calculate the theoretical bounds of metering pressures in different microchannels (FIG. 18). The measured metering pressures lie within the bounds of the theoretical limits.

In addition to changing the channel height, the metering pressures can also be tailored by varying the dimension of the splitting channel ($w_s$). In the above discussions, the splitter width was maintained comparable to the main channel dimension. Decreasing the width of the splitter channel will make the initial size of the air bubble smaller, thereby increasing the pressure required to form a bubble. On the other hand, increasing the splitter width wider than the main channel will flatten the splitting pressure profile.

Figure 19:
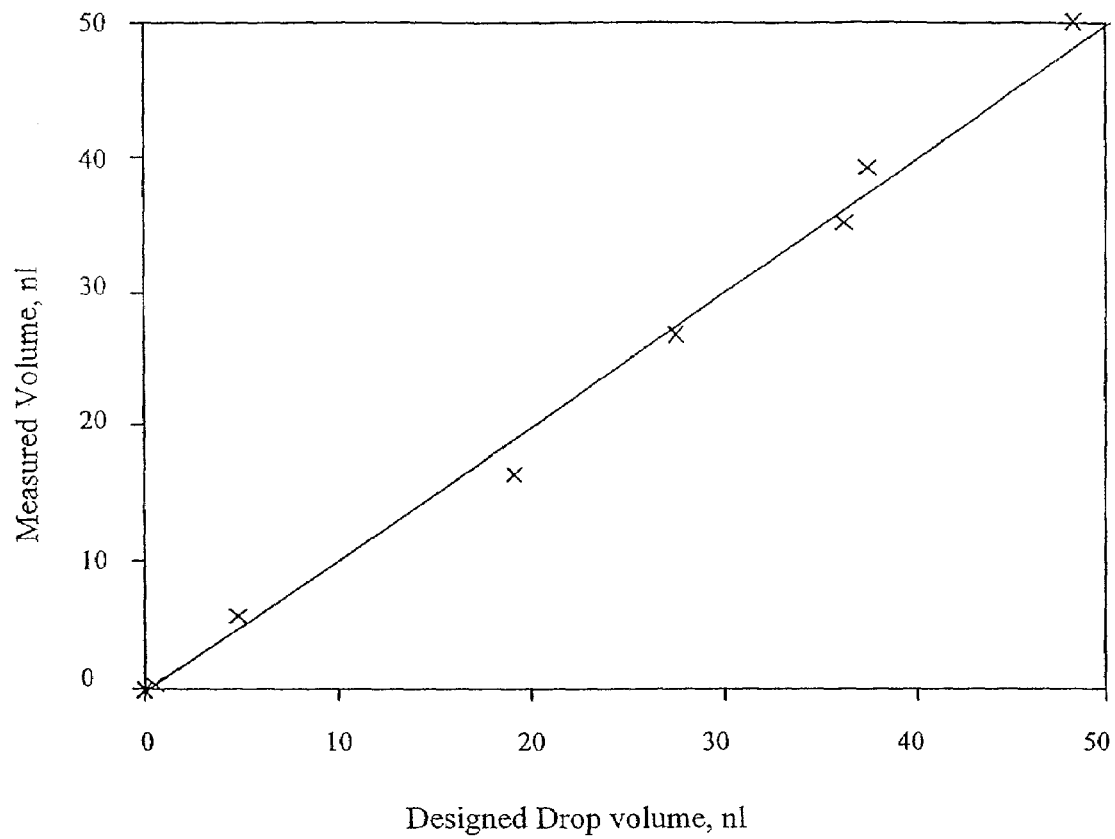
FIG. 19 presents measured drop volume plotted as a function of nominal drop volume in different channel designs.

The volume of the metered drop is determined by the product of $L_d$, the distance between the center of the splitter junction to the edge of the hydrophobic patch, and the cross-sectional area of the channel. The dependence of the drop volume on geometry of the metering device allows metering of pre-determined size drops with high accuracy. This has been verified experimentally by metering drops in different channels to split volumes ranging from 0.1 to 120 nanoliters with high accuracy (FIG. 19). The cross-section of the channels varied from 0.001 mm² to 0.025 mm², the drop length varied from 0.5 to 5 mm.

The absolute error in the volume of the metered drop can be estimated and will be on the order of the size of an air bubble pinned to the splitter channel and touching the opposite wall. The relative error in metering will therefore depend on the size of the splitting junction and the length of the drop. The error in metering decreases with a decrease in the splitter junction and increase in the drop length. Therefore highly accurate drop volumes can be metered by narrowing the splitter junction for a given drop length.

Description of Preferred Embodiments

The description of the preferred embodiments involves: I) microfabrication techniques for manufacture of silicon-based devices; II) channel treatment for optimum flow and reproducibility; III) channel treatment for fabricating hydrophobic regions, and IV) component design (particularly the electrophoresis module and the radiation detectors).

I. Microfabrication of Silicon-Based Devices

As noted previously, silicon has well-known fabrication characteristics and associated photographic reproduction techniques. The principal modern method for fabricating semiconductor integrated circuits is the so-called planar process. The planar process relies on the unique characteristics of silicon and comprises a complex sequence of manufacturing steps involving deposition, oxidation, photolithography, diffusion and/or ion implantation, and metallization, to fabricate a "layered" integrated circuit device in a silicon substrate. See e.g., W. Miller, U.S. Pat. No. 5,091,328, hereby incorporated by reference.

For example, oxidation of a crystalline silicon substrate results in the formation of a layer of silicon dioxide on the substrate surface. Photolithography can then be used to selectively pattern and etch the silicon dioxide layer to expose a portion of the underlying substrate. These openings in the silicon dioxide layer allow for the introduction ("doping") of ions ("dopant") into defined areas of the underlying silicon. The silicon dioxide acts as a mask; that is, doping only occurs where there are openings. Careful control of the doping process and of the type of dopant allows for the creation of localized areas of different electrical resistivity in the silicon. The particular placement of acceptor ion-doped (positive free hole, "p") regions and donor ion-doped (negative free electron, "n") regions in large part defines the interrelated design of the transistors, resistors, capacitors and other circuit elements on the silicon wafer. Electrical interconnection and contact to the various p or n regions that make up the integrated circuit is made by a deposition of a thin film of conductive material, usually aluminum or polysilicon, thereby finalizing the design of the integrated circuit.

Of course, the particular fabrication process and sequence used will depend on the desired characteristics of the device. Today, one can choose from among a wide variety of devices and circuits to implement a desired digital or analog logic feature.

In a preferred embodiment, channels were prepared on 500 $\mu$m thick glass wafers (Dow Corning 7740) using standard aqueous-based etch procedures. The initial glass surface was cleaned and received two layers of electron beam evaporated metal (20 mn chromium followed by 50 mn gold). Photoresist Microposit 1813 (Shipley Co.) was applied 4000 rpm, 30 seconds; patterned using glass mask 1 and developed. The metal layers were etched in chromium etchant (Cr-14, Cyantek Inc.) and gold etchant (Gold Etchant TFA, Transene Co.) until the pattern was clearly visible on the glass surface. The accessible glass was then etched in a solution of hydrofluoric acid and water (1:1, v/v). Etch rates were estimated using test wafers, with the final etch typically giving channel depths of 20 to 30 $\mu$m. For each wafer, the depth of the finished channel was determined using a surface profilometer. The final stripping (PRS-2000, J. T. Baker) removed both the remaining photoresist material and the overlying metal.

In one embodiment, channels etched on glass in the above-described manner, were bonded to the heater-element wafer in a two-part construction approach using optical adhesive (SK-9 Lens Bond, Sumers Laboratories, Fort Washington, Pa.). The bond was cured under an ultraviolet light source (365 =nm) for 12 to 24 hours.

Figure 7A:
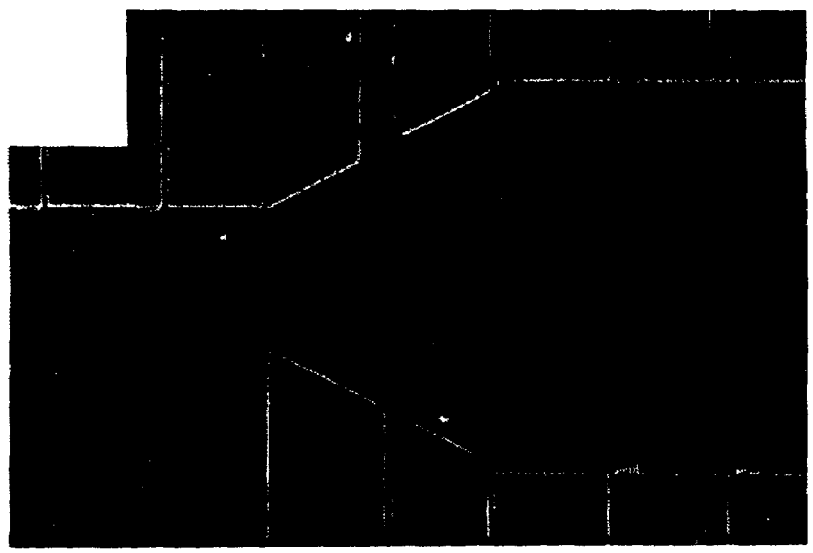
FIG. 7A is a photomicrograph of inlay-process heater elements on the surface of a silicon wafer.
Figure 7B:
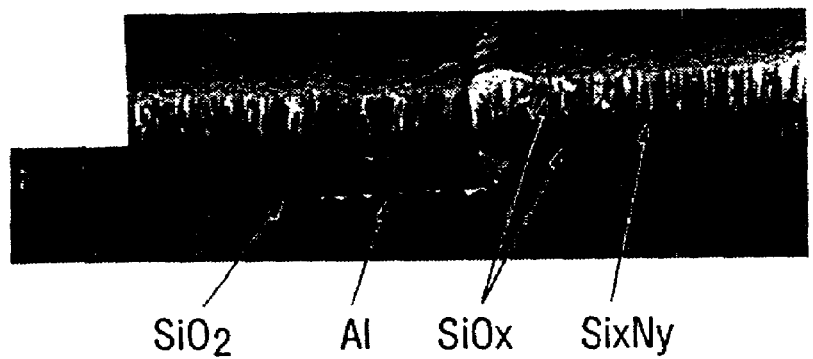
FIG. 7B is a scanning electron micrograph (SEM) of an inlay-process heater wire in cross section (the arrows indicate the deposited aluminum, silicon dioxide, and silicon nitride layers).

Initial device design by the present inventors involved single layers of silicon. However, experience showed these to be inadequate to prevent short circuiting due to (necessary) liquid microdroplets within the channels (see experiments described below). The preferred design involves a triple layer of oxides. Such a preferred device capable of moving and mixing nanoliter droplets was constructed by bonding a planar silicon substrate to channels etched in a glass cover. A series of metal heaters was inlaid on the silicon substrate as two parallel lanes merging into a single lane (a "Y"-shape) (FIG. 7A). The heating elements were formed by first coating the wafer with a 1.0 $\mu$m layer of thermal silicon dioxide Next, 0.35 $\mu$m deep, 5 $\mu$m wide grooves were reactive-ion etched (RIE) into the silicon dioxide following the pattern set in an overlying photoresist. Aluminum was deposited (0.35 $\mu$m) across the entire wafer using electron beam evaporation and the metal layer was "lifted-off" from all surfaces having intact photoresist using a stripping solution. The metal inlay process gives a relatively planar surface and provides a uniform base for deposition of a solution-impermeable barrier layer. The barrier layer is made by a sequence of three plasma-enhanced chemical vapor depositions (PECVD): 1.0 $\mu$m silicon oxide ($SiO_x$), 0.25 $\mu$m silicon nitride ($Si_xN_y$), and 1.0 $\mu$m silicon oxide ($SiO_x$) (FIG. 7B). Some heating elements were also used as resistive temperature sensors.

Heater elements were fabricated as follows. Silicon wafer (p-type, 18–22½-cm, <100>, boron concentration Å $10^{15}$ $cm^{-3}$) was used as a substrate for growth of $SiO_2$ thermal oxide (1 $\mu$m); photoresist (AZ-5214-E, Hoescht-Celanese) was applied and spun at 3000 rpm, 30 seconds. The resist was patterned (metal 1) and developed. Reactive ion etch (RIE, Plasma Therm, Inc.) was performed to 0.35 $\mu$m depth into the $SiO_2$ layer at the following conditions: $CHF_3$, 15 sccm (standard cubic centimeters per minute); $CF_4$, 15 sccm; 4 mTorr; DC bias voltage of 200V, 100 W, 20 minutes. The etch depth was measured by profilometer and 0.35 $\mu$m metallic aluminum was electron beam deposited. The resist and overlying metal was lifted off by development using Microposit 1112A remover in solution (Shipley Co.). The barrier layers consist of sequentially deposited 1 $\mu$m $SiO_x$, 0.25 $\mu$m $Si_xN_y$, and 1 $\mu$m $SiO_x$ using plasma-enhanced chemical vapor deposition (PECVD). RIE was used to etch contact holes to the metal layer using a second mask ($CHF_3$, 15 sccm; $CF_4$, 15 sccm; 4 mTorr; and DC bias voltage of 200V, 100 W, 120 minutes).

Figure 7C:
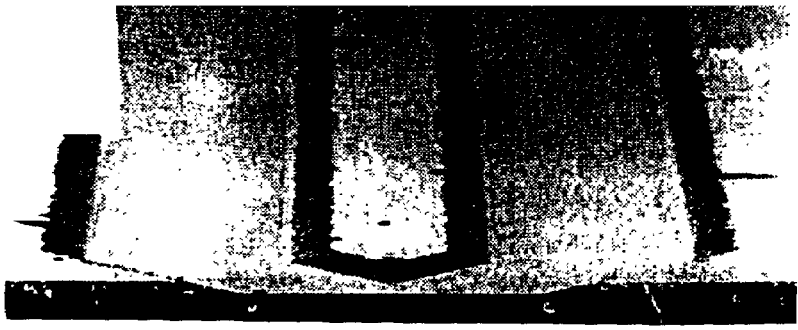
FIG. 7C is a SEM of a channel formed on glass using a wet-etch process, shown in cross section with the etched face of the wafer immediately adjacent to the intersection of two channels.

As shown in FIG. 7, the elements are arrayed as two parallel lanes, each 500 $\mu$m wide, merging into one lane. The individual heaters consist of paired aluminum wires (5 $\mu$m) winding across the 500 $\mu$m wide region. The broad metal areas on either side of the elements are bonding locations for connection to external circuitry. The width of the aluminum element is 5 $\mu$m. The channel in FIG. 7C has identical width and design configurations as the heating element lanes in FIG. 7A, and is uniformly etched 500 $\mu$m wide and approximately 20 $\mu$m deep.

The heating-element wafer was bonded to a glass wafer containing etched channels with the same "Y" format. An aqueous chemical etch of concentrated hydrofluoric acid was used to produce channels with defined side walls and uniform depth. The etched channels are defined by a chromium/gold mask and are 500 $\mu$m wide and approximately 20 $\mu$m deep. The complementary silicon heater and glass channel wafers were aligned and then bonded with adhesive to form the finished device.

Each heating element used as a temperature sensor is preferably first calibrated by measurement of electrical resistance at 22° C. and 65° C. under constant voltage; intermediate temperatures are estimated by linear interpolation.

II. Channel Treatment with Hydrophilic Enhancing Compounds

Prior to performing microdroplet motion and biological reactions, the channels are preferably treated by washing with base, acid, buffer, water and a hydrophilicity-enhancing compound, followed by a relatively high concentration solution of non-specific protein. In a preferred embodiment, the channels are washed with approximately 100 µl each of the following solutions in series: 0.1N NaOH; 0.1N HCl; 10 mM Tris-HCl (pH 8.0), deionized $H_2O$, Rain-X Anti-Fog (a hydrophilicity-enhancing compound commercially available from Unelko Corp., Scottsdale, Ariz.), and 500 µg/µl bovine serum albumin (non-specific protein commercially available in restriction enzyme grade from GIBCO-BRL). The wafer was placed on a stereoscope stage (Olympus SZ1145), and the contact pads for the heating elements were connected to a regulated power supply. Heating occurred by passing approximately 30 volts through the element in short pulses and observing the movement rate of the droplets. A detectable reduction in droplet volume from evaporation was noted in each experiment, usually of less than 30%. Droplet movement was recorded with a Hamamatsu video camera on videotape.

III. Channel Treatment for Hydrophobic Regions

Figure 8A:
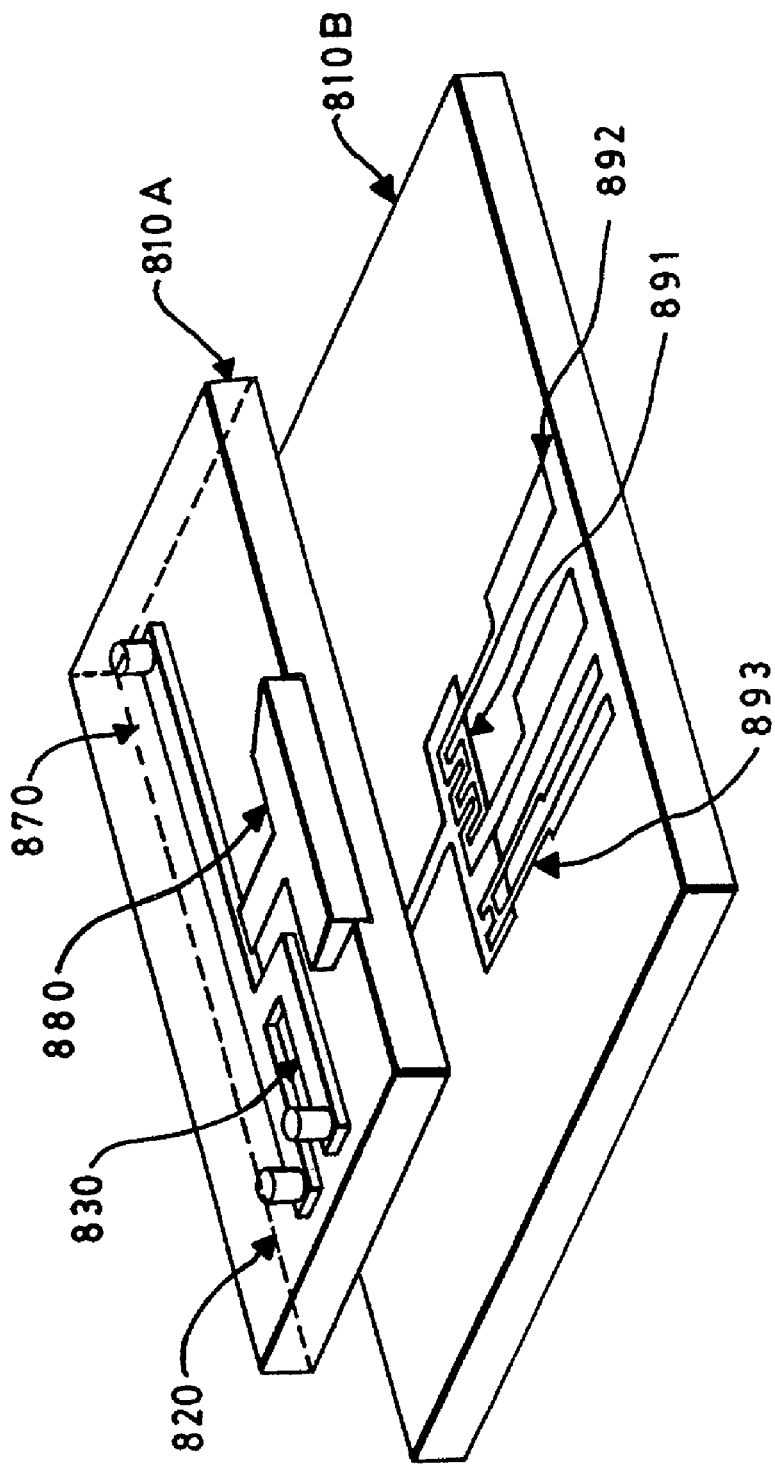
FIG. 8A is a schematic of one embodiment of the device of the present invention wherein the device comprises a glass top bonded to a silicon substrate.

In one embodiment of the device of the present invention (FIG. 8A), the device comprises a glass top (810A) bonded to a silicon substrate (810B) containing the heater (891), the contact pad (892) and the resisitive temperature detector (893). The glass side has channels and chambers etched into it. FIG. 8A shows the inlet (820) and overflow (830) ports, a gas vent (870) and a air chamber (880).

A. Heaters and Resisitive Temperature Detectors

Figure 8B:
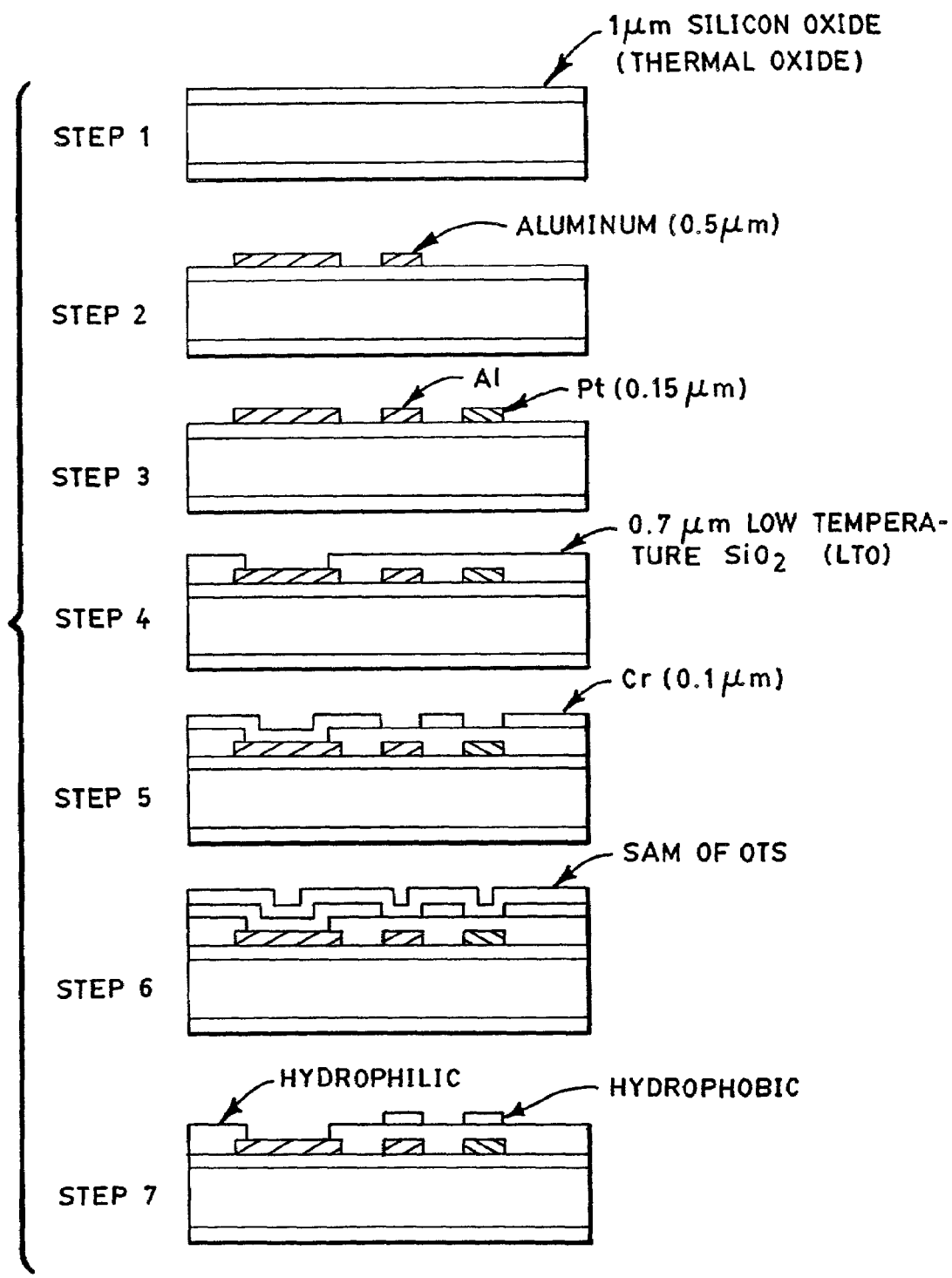
FIG. 8B is a schematic showing one embodiment of the fabrication steps for fabrication of components in silicon.

The fabrication process for the heater and temperature detector (FIG. 8B) begins by using Silicon wafer (p-type, 18–22 alun-cm, boron concentration ~$10^{15}$ $cm^3$) as a substrate for growth of $SiO_2$ thermal oxide (1 µm) (STEP 1). A 0.5 µm metallic Aluminum film is electron beam deposited. Photoresis PR 1827 is applied and spun at 4000 rpm for 30 seconds, patterned (metal 1) and developed. The exposed aluminum is etched in Aluminum etchant and the photoresist stripped to define the metal heater (STEP 2).

Photoresist is spun again and a second lithography is done (metal 2). A 0.15 µm layer of platimun ("Pt") is electron beam deposited. A 0.03 µm thick Titanium metal layer (electron beam deposited) is used as the adhesion layer. The resist and the overlying metal is lifted off by development using Microposit 1112A remover in solution (Shipley Co.). This Platinum metal will be used as the resistive thermal detector. Next, 0.7 µm of Low Temperature Oxide (LTO) of silicon is deposited to act as the barrier layer and the dydrophilic substrate (STEP 4). A third lithography is done and the LTO is etched in Buffered Hydrofluoric Acid to open contacts to the metal contact pads. The further processing steps are done to pattern hydrophobic regions onto the hydrophilic silicon oxide surface.

B. Hydrophobic Patterning of Silicon Oxide Substrate

A 0.1 µm layer of Chromium metal is electronbeam deposited on the processed wafer. Photoresist PR 1827 is applied and spun at 2000 rpm for 30 seconds. The resist is patterned (SAM mask) and developed. The exposed Chromium metal is etched in Chromium etchant to expose the silicon oxide and the photoresist is then stripped off (STEP 5). The samples are then cleaned in Acetone, Isopropyl Alcohol and DI water for 10 minutes each, air dried and oven dried at 100° C. for 5 minutes. The samples are then put in 1 wt % octadecyltrichlorosilane (OTS) solution in Toluene for 15–30 minutes. OTS deposits on the samples as a Self Assembled Monolayer (SAM) (STEP 6). The samples are then rinsed in Toluene, Isopropyl alcohol and DI water for 5 minutes each, and then oven dried (100° C., 5 minutes). Next, they are put in Chromium etchant to remove the Chromium layer below. The SAM on the Chromium metal gets lifted off as a result of this. The samples were then rinsed in DI water and air dried, resulting in regions of intact hydrophobic regions on a hydrophilic oxide substrate (STEP 7). Heater elements and RTDs have also been fabricated on a quartz substrate. The fabrication steps are similar to that of the silicon processing steps.

C. Glass Channel and Chamber Fabrication

Figure 8C:
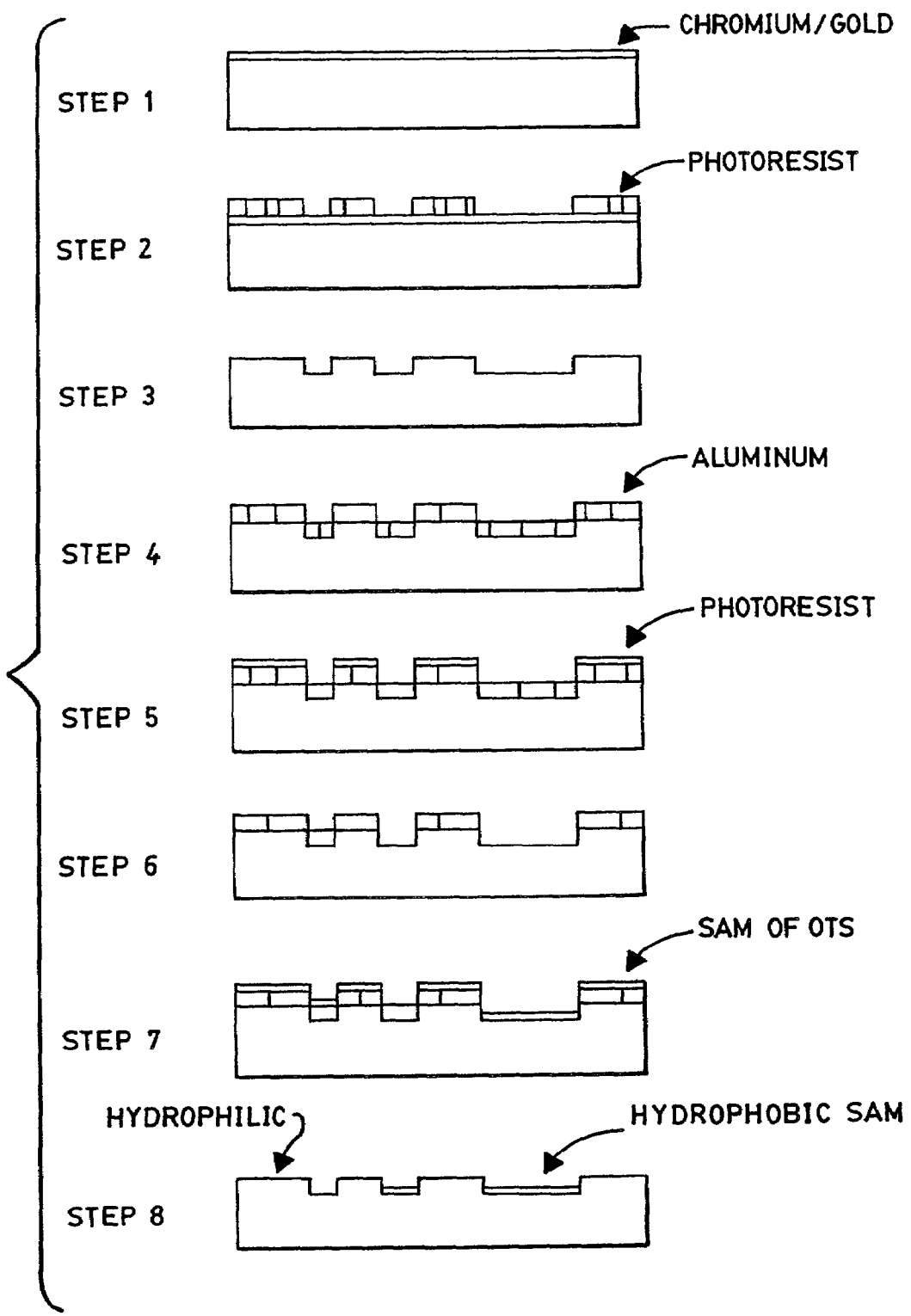
FIG. 8C is a schematic showing one embodiment of the fabrication steps for fabrication of components in glass.

The channel and the chamber fabrication (FIG. 8C) begins by depositing 0.4 µm metallic layer of Gold (Electron beam deposition) on the surface of 500 µm thick glass water (Dow Corning 7740) (STEP 1). A 0.06 µm layer of chromium is used as the adhesion layer. Photoresist is applied and patterned using glass mask 1 and developed (STEP 2). The metal layers are etched in gold etchant (Gold Etchant TFA, Transene Co.) and Chromium etchant (CR-14, Cyantec Inc.). The accessible glass is then etched in a solution of freshly prepared hydrofluoric and nitric acid (7:3, v/v). The etch rate is approximately 5 µm/min and the etch depth is conveniently measured using a surface profilometer. The metal layers are removed (STEP 3) and the wafer rinsed in DI water, air dried and oven dried at 100° C. for 20 minutes. The following processing steps are done for patterning hydrophobic regions onto the glass surface.

D. Hydrophobic Patterning of Glass Substrate

A 1.5 µm thick Aluminum layer was electron beam deposited, covering the etched channels and chamber (STEP 4). A thick photoresist (AZ 4620) is applied and spun at 750 rpm for 50 seconds (STEP 5). The resist is patterned (SAM Mask) and developed. The exposed Aluminum is etched in aluminum etchant. The photoresist is stripped off (STEP 6) in hot PRS 2000 (J. T. Baker). The samples are then cleaned in Acetone, Isopropyl alcohol and DI water for 5 minutes each and the water dried off in a 100° C. oven of 10–15 minutes. The samples are then dipped in a 1% OTS solution in Toluene for 10–15 minutes (STEP 7). The SAM deposition was carried out in a Chemical hood. The samples were then rinsed in Toluene, Isopropyl Alcohol and DI water for 5 minutes each. Next, they were put in Aluminum etchant until all metallic aluminum was removed (STEP 8). The samples were then rinsed in DI water and air dried. For the devices with the inlet from the top, holes were drilled by electrochemical discharge drilling.

The glass side was then aligned on top of the silicon side and then bonded together using optical adhesive (SK-9 Lens Bond, Sumers Laboratories, Fort Washington, Pa.). The bond was cured under an ultraviolet light source (365 nm) for 24 hours.

IV. Component Design

The present invention contemplates one or more gel electrophoresis modules as a component of the microscale device. Theoretical and empirical research has indicated that reducing the thickness of the electrophoresis channel leads to improved resolution. Thinner gels dissipate heat more readily and allow higher voltages to be used, with concomitant improvements in separation. The position and width of the electrophoresis detector are also critical to the ultimate resolution of the electrophoresis system. A micromachined electronic detector, such as a photodiode, placed in the underlying silicon substrate can be less than one micron from the gel matrix and can have a width of 5 microns or less. Since the gel length required for the resolution of two migrating bands is proportional to the resolution of the detector, the incorporation of micron-width electronic detectors can reduce the total gel length required for standard genotyping by at least an order of magnitude.

Figure 9:
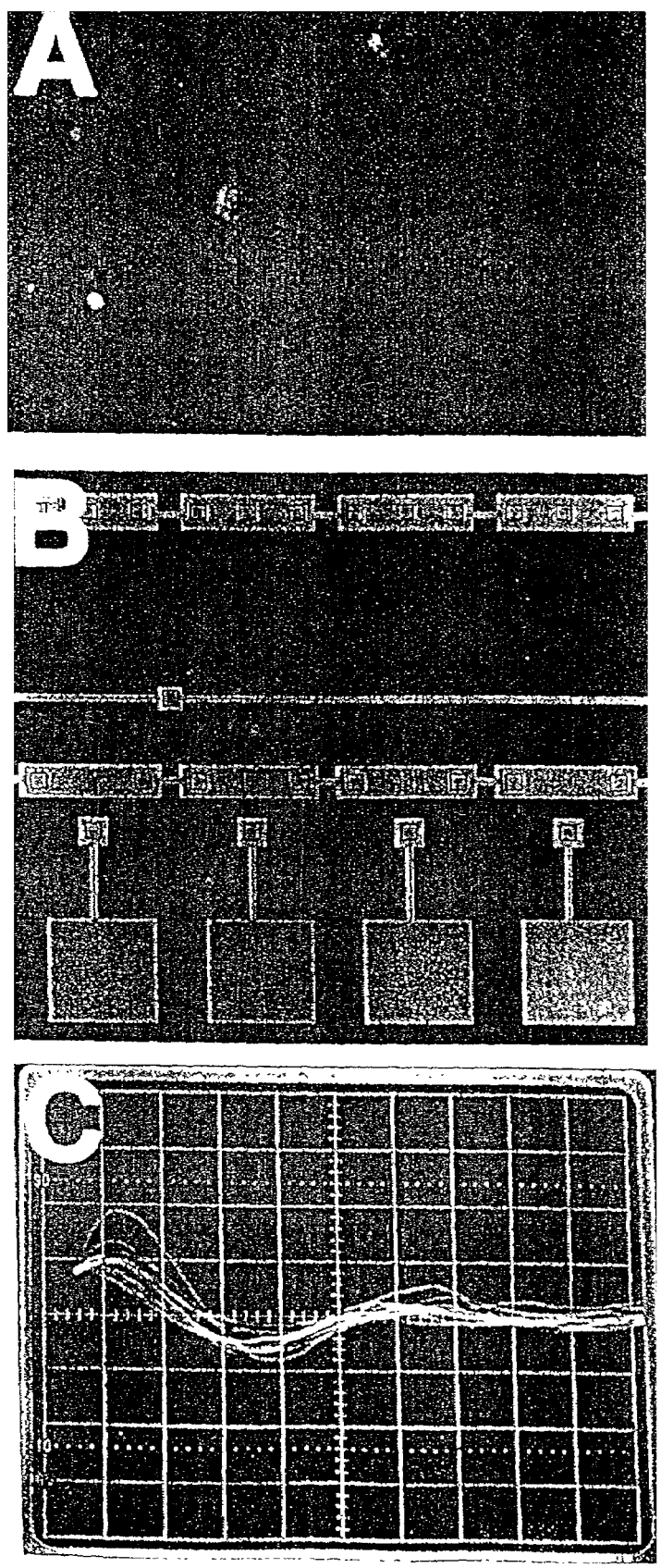
FIG. 9A is a photomicrograph of polyacrylamide gel electrophoresis in a wide etched-glass channel.
FIG. 9B is a photomicrograph of a set of four doped-diffusion diode radiation detector elements fabricated on a silicon wafer.
FIG. 9C is an oscilloscope trace of output from the radiation detector showing individual decay events from $^{32}$P-labeled DNA.

To demonstrate that standard gel electrophoresis can operate in micron-diameter channels, modules were fabricated using etched glass channels identical to FIG. 6B and fluorescent-labeled DNA (YOYO intercalating dye). Polyacrylamide gel electrophoresis of a complex DNA mixture is shown in FIG. 9A in a channel 500 $\mu$m wide and 20 $\mu$m deep. The electrophoresis was performed with the positive electrode to the right and the DNA sample applied at the left. The white vertical line is the gel-to-buffer interface. The DNA sample (BluescriptKS digested with MspI) is labeled with intercalating UV-fluorescent dye (YOYO-1) and is visualized under incandescent light. Separation of the component bands is clearly visible less than 300 $\mu$m from the buffer reservoir-to-gel interface. The high resolution of the detector (in this case, a microscope) allowed the use of an unusually short gel, resolving several closely eluting bands.

Figure 6D:
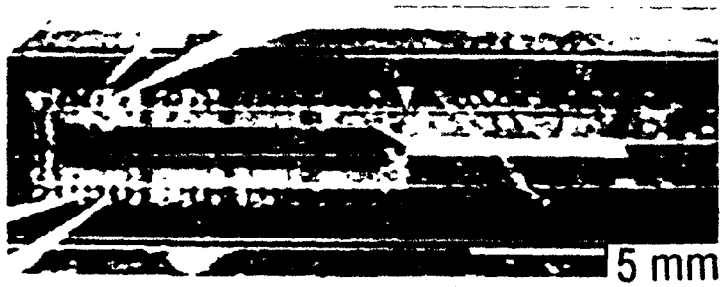
FIG. 6D shows the merging of the microdroplets to form the combined microdroplet. The open arrowheads in the figure indicate the rear meniscus and the filled arrowheads the leading meniscus for each microdroplet.

The present invention contemplates an electrophoresis unit that integrates a micromachined channel and an electronic DNA detector. The channel is constructed using a sacrificial etch process on a single silicon wafer rather than the bonded surface-etch method described earlier. In the sacrificial etch technique, the channel configuration is patterned by depositing on the wafer surface an etch-sensitive material (phosphosilicate glass, $SiO_2 \cdot P_x$) with a thickness equivalent to the desired channel height. A triple-layer overlay of plasma-enhanced chemical vapor deposited silicon nitride, undoped polycrystalline silicon, and silicon nitride ($Si_xN_y$/polySi/$Si_xN_y$) completely covers the sacrificial material with the exception of small access holes on the top or sides. A selective liquid etch removes the sacrificial layer material, but not the overlay or the underlying substrate. The sacrificial etch technique results in a complete channel being formed directly on the substrate containing the electronic components (FIGS. 6C and 6D). The 3 $\mu$m deep channel has two buffer reservoirs on either end with integral phosphorus-doped polycrystalline silicon electrodes. The channel height formed by this technique (~3 $\mu$m) is considerably smaller than the height of the bonded structures due to the limitations of the sacrificial layer deposition and the strength of the overlying layer. Note that, for these channel dimensions, liquid drops would have volumes on the order of picoliters.

FIG. 9B is photomicrograph of a set of four doped-diffusion diode radiation detector elements fabricated on a silicon wafer. For each element, the three parallel dark lines define the diffusion regions of the central the detector flanked by the guard ring shielding electrodes. The diffusion regions are approximately 300 $\mu$m long and 4 $\mu$m wide.

A radiation detector, consisting of a 10 $\mu$m wide "p-n"-type diode with a 5 $\mu$m wide guard ring around the outer edge, is fashioned directly into the silicon substrate underneath the channel. In this implementation, an integral radiation detector was chosen because of (i) high sensitivity (a single decay event), (ii) small aperture dimensions, and (iii) well-know fabrication and response characteristics. On this electrophoresis system, a 1 cm long, 3 $\mu$m thick gel is able to perform as separation on a 80 and a 300 base-pair fragment of DNA. It should be noted that this diode, although currently configured for high-energy beta particle detection, can also operate as a photon detector. With proper wavelength filters and light sources, detection of fluorescence emission may be accommodated with a similar device.

Radiation detectors were prepared as follows. A 200 ½-cm, <100>, float zone, boron-doped, p-type silicon wafer was used as a substrate. Diffused layers of phosphorus ($5 \times 10^{14}$ $cm^{-2}$) and boron ($1 \times 10^{15}$ $cm^{-2}$) were ion-implanted onto the sample in lithographically-defined regions; thermal silicon oxide was grown (0.2 $\mu$m at 900° C.) over the wafer; and contact holes were etched to the diffusion layer using buffered hydrofluoric acid solution (5:1). A 3.3 $\mu$m layer of Microposit 1400-37 photoresist was patterned to define the metal pads; 50 nm chromium followed by 400 nm gold was evaporated over the resist; and the metallization lifted off the regions retaining the resist. A layer of Microposit 1813 photoresist was applied across the wafer and baked for 110° C. for 30 minutes to form an aqueous solution barrier. Radioactive phosphorus ($^{32}P$) decay events could be detected using a sample of labeled DNA in PCR reaction buffer placed on the photoresist layer. The detector was connected to a charge-sensitive preamplifier (EV-Products 550A), followed by a linear shaping amplifier and a standard oscilloscope.

FIG. 9C shows an oscilloscope trace of output from the radiation detector showing individual decay events from $^{32}P$-labeled DNA. The aqueous DNA sample was placed directly on the detector and sampled for 30 seconds. The screen is displaying a vertical scale of 0.5V/division and horizontal scale of 20 $\mu$sec/division.

V. Channel Fabrication and Hydrophobic Patterning

A. Hydrophobic/Hydrophilic Patterning of Substrates

Figure 10:
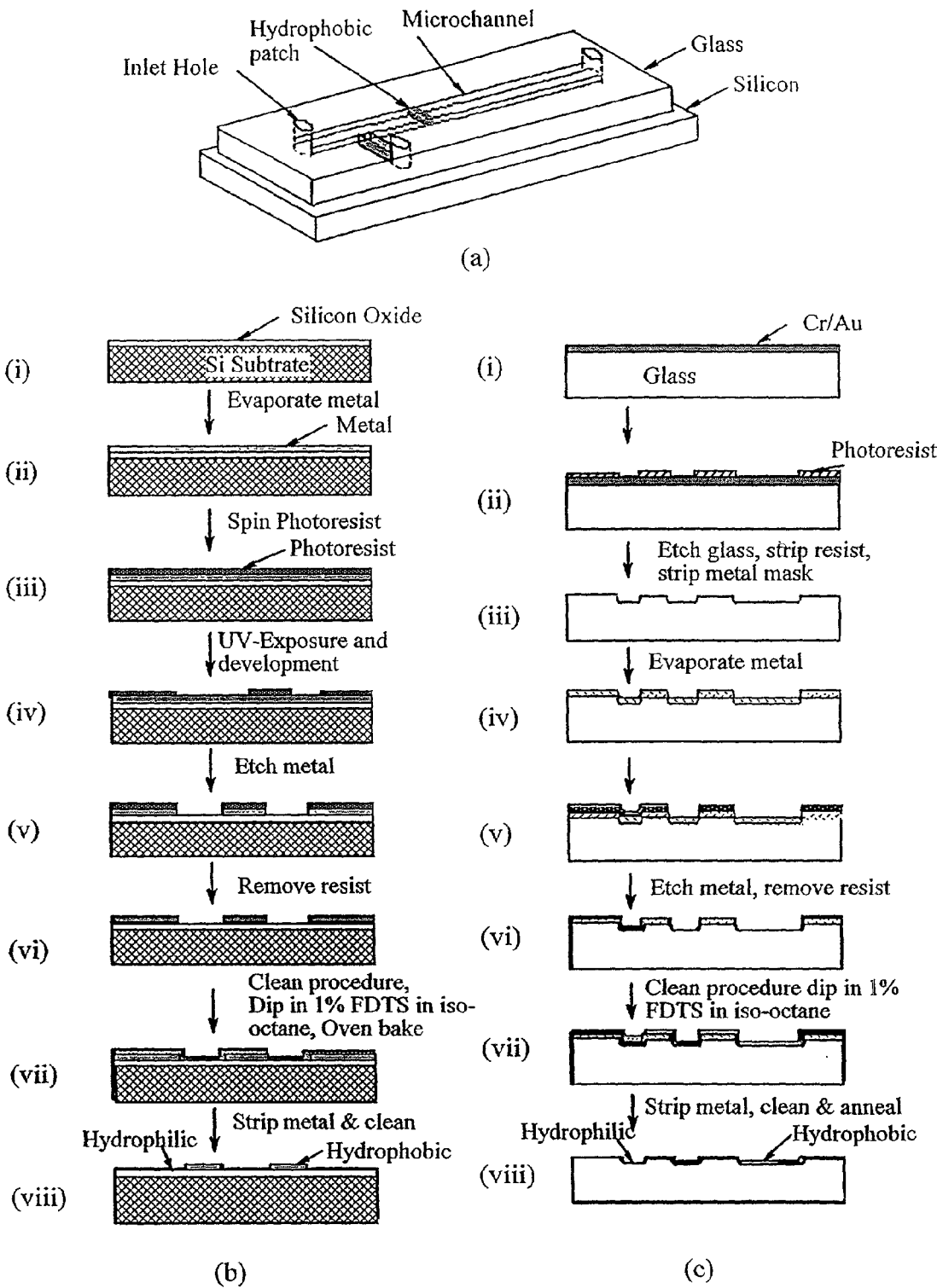
FIG. 10 presents schematics of a microchannel metering device.

As shown in FIG. 10, in one embodiment, the device consists of a glass substrate, which has the etched microchannel network, aligned and bonded to a silicon substrate. Specific regions of the microchannel are made hydrophobic. FIG. 10b presents fabrication steps detailing the patterning of hydrophobic patches on the silicon substrate. A thin film of silicon oxide is thermally grown on the silicon substrate (10b(i)). A thin film of metal (chromium/aluminum) is deposited (10b(ii)) and selectively etched (10b(iii)–(vi)) to expose specific regions of the substrate for silanization (10b(vii)). After the surface reaction, the metal mask is removed. (c) Microchannel fabrication steps. A metal mask is used for selective etching of the glass in an acid solution (mix of HF and $HNO_3$) (10c(i)–(iii)). The substrate is then selectively reacted with 1H,1H,2H,2H-per-fluorodecyl-trichlorosilane to create hydrophobic patches. A thin film (50–300 nm) of metal (chromium or aluminum) is deposited on glass wafers (Dow Corning 7740) or the silicon oxide surface of the silicon wafers by electron-beam evaporation (FIG. 10b(i)). Photoresist (PR 1827, Hoechst Celanese) is applied to the surface and spun at 4000 rpm for 30 seconds (FIG. 10b(iii)), resulting in a resist film thickness of 2.7 $\mu$m. Each wafer is then softbaked at 90(C for 30 minutes, exposed to light (480 nm, 5 mJ/cm$^2$) through a mask for 60 seconds, and developed in a standard developer solution (MF 319) for one minute (FIG. 10b(iv)). Next, the wafer is baked in an oven at 110° C. for 30 minutes and the exposed metal is removed by immersion in a metal etching solution until all the exposed metal is removed (FIG. 10b(v)). The photoresist is removed by immersing the wafer in a solution of PRS-2000 followed by a de-ionized water rinse and air-drying. The wafer is rinsed in acetone, isopropyl alcohol and de-ionized water for 5–10 minutes each and then, dried in an oven at 100° C. for 15 minutes. A solution of 1% v/v of 1H,1H,2H,2H-perfluorodecyltri-chlorosilane (FDTS) (Gelest) in iso-octane (Aldrich) is prepared under nitrogen. The wafer is dipped in the FDTS solution for 15 minutes. The treatment takes place in a nitrogen environment at room temperature (~25° C.). Next, the wafer is rinsed twice in fresh iso-octane solvent for 10 minutes each, transferred from iso-octane to ethanol, then to de-ionized water and then air-dried. The wafer is annealed in an oven at 100° C. for 15 minutes and dipped in the metal etching solution until the masking metal is completely stripped off (FIG. 10b(viii)). The wafer is then rinsed in de-ionized water and air-dried.

B. Channel Fabrication

The glass channel fabrication begins by depositing metal films of chromium (60 nm) and gold (400 nm) (electron beam deposition) on the surface of 500 µm thick glass wafer (Dow Corning 7740) (FIG. 10c(i)). A positive photoresist is applied, patterned, and developed. The metal layers are etched in gold etchant (Gold Etchant TFA, Transene Co.) and chromium etchant (CR-14, Cyantek Inc.). The accessible glass is then etched in a freshly prepared solution of hydrofluoric and nitric acid (7:3, v/v). The etching rate is approximately 6500 nm/min and the depth etched is measured using a surface profilometer. The metal layers are removed and the wafer is rinsed in de-ionized water, air-dried and oven dried at 100° C. for 20 minutes (FIG. 10c(iii)). The wafer is then processed to pattern hydrophobic regions (FIG. 10c(iv)–(viii)) according to the process described in section A. Holes (~0.15 mm radius) are drilled from the top of the glass surface to access the microchannels on the bottom surface of the glass wafer by electrochemical discharge drilling. Shoji, S.; Esashi, M. *Technical Digest of the $9^{th}$ Sensor Symposium* 1990, 27–30. The individual devices on the glass wafer are then diced and are ready to be bonded onto the silicon chip.

C. Device Bonding

The glass-channel die is placed on the silicon die and the hydrophobic patch on the glass die is aligned to that on the silicon die (FIG. 10a). The two substrates are then bonded together using an optical adhesive (SK-9 Lens Bond, Sumers Laboratories, Fort Washington, Pa.). The glue is applied sparingly to the edge of the device and allowed to wick into the gap. Care is taken not to allow excess glue to enter the channel. The bond is cured under an ultraviolet light source (365 nm) for 24 hours. A stainless-steel hypodermic tubing is glued to the air-line hole using a fast setting epoxy in the devices used for liquid metering. A small teflon tubing connects the stainless tubing to a air pressure source and a pressure regulator.

D. Patch Evaluation

Approximately 1 µl of water was placed at the inlet hole (diameter 300 µm) of a glass-silicon hybrid device (FIG. 11b) using a sequencing pipette (Sigma, least count 0.5 µl). The liquid was drawn into the hydrophilic channel by capillary action. The ability of the hydrophobic patch (200 µm wide) to stop liquid was observed under a microscope. Note that the hydrophobic patch was patterned at a specific distance (from 1 to 5 mm) away from the inlet hole onto four walls of the microchannel (depths ranging from 20–60 µm, widths from 50–500 µm).

E. Pressure Measurement

Liquid was introduced at the inlet hole of the liquid metering device (FIG. 12a) and was stopped at the hydrophobic interfaces (FIG. 12b). The inlet hole was blocked and the splitter channel was then pressurized to split off a discrete liquid drop and move it over the hydrophobic patch (FIG. 12c–e). The threshold pressure value was recorded for liquid metering experiments performed in different microchannel devices (channel widths ranging from 100–500 µm, widths of 20 and 40 µm).

F. Contact Angle Measurement

A water drop (~µl) is gently placed on the experimental surface and a photograph of the side profile of the liquid drop is taken using a CCD camera. The experimental surface as well as the camera is leveled horizontal to the ground using a level indicator. Furthermore, care is taken to ensure the base of the liquid drop is in the same horizontal plane as the camera. The contact angle is then determined using a image analysis software (NIH Image).

G. Volume Measurement

Photographs of drops metered in microchannel devices are taken through a microscope using a CCD Camera. An image of the metered volume is captured using an Image analysis software (NIH Image). The area of the metered drop is determined and then multiplied by the channel depth.

H. Selective Surface Treatment

The hydrophobicity of a glass or silicon wafer is selectively modified using a silanization treatment. The treatment involves cleaning the substrate and immersing it in a solution of iso-octane containing the organosilane FDTS ($CF_3(CF_2)_7CH_2CH_2SiCl_3$). The organosilane molecules adsorb onto the surface of the wafer and a Si—Cl group of each organosilane reacts with a surface OH group to form Si—O—Si bonds. The remaining Si—Cl bonds on each molecule react with neighboring organosilane molecules in the presence of trace pre-adsorbed water molecules to form a network of Si—O—Si bonds over the surface. See, Ulman, A. *An Introduction to Ultrathin Organic Films from Langmuir-Blodgett to Self-Assembly* 1991, $1^{st}$ ed., Academic Press, San Diego, 245–250. The presence of a long hydrocarbon chain and fluorine atoms in the organosilane compound causes the treated surface to repel water and make the surface hydrophobic. The static contact angle of water on the surface of a silicon wafer before and after the treatment is 30°±0.5° and 100°±0.5° respectively.

To pattern such a hydrophobic region on a silicon or glass wafer, selected regions of the substrate are masked with a thin aluminum, chromium or gold metal film. The choice of the metal and its thickness is based on a number of factors including the ability of the metal to cover step heights associated with non-planar surfaces, the effect of the organosilane solution and transfer solvent on the metal film, and the effect of the metal stripping solution on the treated surface. The 1% solution of FDTS in iso-octane has no visible effects on chromium and gold films, and film thickness as low as a few hundred angstroms can be used. Aluminum films, however, etch slowly in iso-octane and hence a thickness greater than 100 nm is required to create hydrophobic patterns.

I. Durability of Treatment

The durability of the hydrophobic surface treatment is important for its use in a microfluidic device. The treated surface may come in contact with different chemicals during its fabrication, assembly or operation. Experiments were performed in which the hydrophobic samples were immersed in different chemicals for 15 minutes, rinsed in de-ionized water and dried. A water drop (~1µl) was placed on the samples and the static contact angle was measured. By comparing the contact angles before and after immersion, the silanized surface was found to be resistant to most of the common acids and bases. These chemicals include concentrated sulphuric acid (96.2%), NaOH (50 wt %), Piranha clean solution ($H_2SO_4$:$H_2O_2$=1:1), HCl (37%), acetic acid (99.7%) and 10× TBE Buffer. The static contact angle of water on treated surfaces exposed to these chemicals, measured before and after the test, is 100°±0.5°. Buffered HF acid however affects the static contact angle by etching the surface layers of silicon oxide and hence removing the silane molecules along with it. After 15 minutes of immersion of a silanized surface in Buffered HF, the static contact angle was 20°±0.5°.

The stability of silanized films with respect to temperature is usually of concern. Devices may have to withstand high temperatures caused during device operation and/or packaging. Srinivasan et. al. have reported FDTS film of to be stable up to 400° C. in air for 5 minutes. Srinivasan, U.; Houston, M. R.; Howe, R. T.; Maboudian, R. *Transducers '97* 1997, 1399–1402. Maboudian, R. *Surface Science Reports* 1998, 30, 207–269. Long term stability assumes importance in case of large time lag between the manufacturing of the device and its actual use. Srinivasan et. al. have reported a minimal loss in hydrophobicity for storage for as long as 18 months in air at room temperature.

Experimental

The following examples serve to illustrate certain preferred embodiments and aspects of the present invention and are not to be construed as limiting the scope thereof.

In the experimental disclosure which follows, the following abbreviations apply: eq (equivalents); M (Molar); μM (micromolar); N (Normal); mol (moles); mmol (millimoles); μmol (micromoles); nmol (nanomoles); gm (grams); mg (milligrams); μg (micrograms); L (liters); ml (milliliters); μl (microliters); cm (centimeters); mm (millimeters); μm (micrometers); nm (nanometers); ° C. (degrees Centigrade); Ci (Curies); MW (molecular weight); OD (optical density); EDTA (ethylenediamine-tetracetic acid); PAGE (polyacrylamide gel electrophoresis); UV (ultraviolet); V (volts); W (watts); mA (milliamps); bp (base pair); CPM (counts per minute).

EXAMPLE 1

This example describes approaches to the problem of forming a moisture barrier over electrical elements of the microscale device. Initial prototypes employed 5000 angstroms of aluminum and covered it with PECVD $SiO_x$. Upon testing, it was determined that the liquids were penetrating this later and destroying the aluminum heating elements.

Without clear evidence what was causing this problem, it was hypothesized that the step height of the aluminum was causing cracks in the passivation layer (the oxide). In order to alleviate the cracking problem, a layer of $Si_xN_y$ was tried between two layers of $SiO_x$, with the thought that the additional thickness would overcome the cracking caused by the step height. It did not.

As a follow-up approach, a thinner layer (500 angstroms) of aluminum was tried. This gave 1/10th the step height of the original prototype devices. On top of this aluminum, a triple layer of $SiO_x$, $Si_xN_y$, and $SiO_x$ was employed. Moreover, the process for making the $Si_xN_y$ layer was changed to one which would give a more dense layer. This appeared to solve the problem. However, the thinner layer of aluminum created a higher resistance which was not acceptable. It was determined that one needed a way to generate thicker layers of aluminum for lower resistance, yet keep the surface relatively smooth (planar). An etch back process was used (now called "the inlay process") to accomplish the task. By etching back into a layer of $SiO_x$ depositing aluminum in the resulting cavity, then stripping the resist mask, a surface was obtained with a step height low enough to prevent cracking of the passivation layers.

It was also discovered that the metal bonding pads were not adhering well to the initial PECVD $SiO_x$ layer. To overcome the problem, the process was modified by using a wet thermal $SiO_2$ layer.

EXAMPLE 2

This example describes approaches to enhancing droplet motion by surface treatment. In this regard, the principle of using surface tension to cause droplets to move may be applied to either hydrophilic or hydrophobic surfaces. Glass, for instance, is naturally hydrophilic with a near zero contact angle with water. Because the oxide coating of the present invention is made principally of the same material as glass, it was expected that the devices would also exhibit near zero angles. It was discovered, however, that the actual construction materials had contact angles far from zero, thus enhancing the effects of contact angle hysteresis (discussed in greater detail in Example 3). For instance, water gave a contact angle (static) of ~42° on polyamide, ~41° on $SiO_2$ (major component of most glasses), ~62° on silicone spray. To enhance the surface effectiveness, several treatment processes for both hydrophilic and hydrophobic surfaces were tried, as described below.

To improve the hydrophilicity of a surface, several cleaning procedures were tried. It has been reported that surface contamination and/or roughness can reduce the hydrophilicity of surfaces. Therefore, a high concentration chromic acid cleaning, a high concentration sulfuric acid cleaning, a baking procedure (to 600° C. for 8 hrs. to burn off contaminates), and surface coatings were tried. The acid cleaning procedures were not as effective as the baking procedure; however, neither proved to be compatible with the devices since the concentrated acids would attack the aluminum pads and the high temperature could peal the aluminum (melting pt. ~660° C.) or break the adhesive bond between the heater chip and the channel.

Rain-X antifog (commercially available) as a treatment was observed to work. This is a surface treatment which makes surfaces hydrophilic. Although, the resulting surfaces may not be 0°, by using this coating the entire surface gets treated giving a uniform surface for the droplet. Experimentally, it was found that Rain-X antifog treatments greatly enhanced droplet motion experiments using heat. Another such treatment which was tested but which did not work was a material called SilWet. This material is used in the agriculture industry for enhancing the wetting of plants with agricultural sprays.

To obtain hydrophobic surfaces, the present inventors tried coating capillaries with Rain-X and silane treatments. Neither of these gave angles much greater than 90°, therefore, would not work with this mechanism. These treatments would have to have given angles ~180° to be useful for hydrophobic studies of motion. Eventually, it was discovered that one could apply a teflon coating that was sufficiently hydrophobic to possibly warrant future tests.

EXAMPLE 3

This example describes approaches to droplet motion by heat treatment. As noted previously (above), the contact angle on the advancing end of a liquid droplet in motion (known as the advancing contact angle) is greater that the that on the receding end (receding contact angle). In the case of a hydrophilic surface—such as water on glass—this tends to create a back pressure countering attempts at forward motion by heating the back side of a droplet. This is best shown by a simple model describing laminar flow through a channel.

Average Flow Through a Circular Channel:

$$<v>=-\Delta P*[R^2/(8\,\mu L)]$$

where: $\Delta$=value at back−value at front end of droplet $$\Delta P=(1/R)*(\Delta G)=\text{pressure difference between droplet ends}$$

$\Delta G$=change in surface tension between the ends of the droplet.
R=channel radius
L=droplet length
$\mu$=viscosity Also, for water, $\Delta G=-\text{constant}*\Delta T$, where temperature increases lower the surface tension of most liquids (constant=0.16 dyn/cm for water).

Therefore:

$$<v>=-(\Delta G)*(1/R)*[R^2/(8\,\mu L)]=[-0.16*\Delta T*R/(8\,\mu L)]$$

where: $\Delta T=T_{back}-T_{front}$ giving: $<v>=[0.16*R/(8\,\mu L)]*(T_{back}-T_{front})$.

This expression indicates that any heating on the back end of the droplet (if the front remains at a lower temperature) will cause the liquid droplet to move. This was not the case experimentally, however. By way of studies using glass capillaries, it was found that there was a minimum temperature difference required to move the droplet. This effect is believed to be the result of contact angle hysteresis (CAH). In CAH, the advancing contact angle is greater than the receding contact angle resulting in a sort of back pressure which must be overcome to achieve droplet movement. CAH occurs when the interface is placed in motion (dynamic angles). To account for this effect, it was included in a steady-state (1D) model for flow. For instance, if the advancing angle is 36° and the receding angle is 29° (with the front of the droplet being 25° C.), then the back of the droplet would need to be heated to ~60° C. for a 1 mm long droplet in a 20 µm high channel. This is just one example situation.

It was discovered experimentally, however, that the channel dimension and fluid parameters (other than surface tension) do not affect whether or not the droplet will move. They do determine the magnitude of motion (if it occurs). What does determine whether motion will occur or not is the following inequality:

$$G_{front}/G_{back}>(R_{front}/R_{back})*(\cos \beta_{back}/\cos \beta_{front})$$

where: $\beta$=contact angle.

The present calculations suggest that a ~35° C. difference between the front and back of a droplet should be sufficient to initiate droplet motion in a system with advancing angles of 36° and receding angles of 29° in a 20 µm high channel. Experimental testing of actual devices however, showed that the front of the droplet heats relatively quickly thus reducing the temperature difference needed for movement between the front and the back of the droplet. This effect required us to use higher voltages to obtain droplet motion. Voltages typically in the range of 30° Volts were found to be required to obtain motion. Further experiments showed that the resulting temperature difference was ~40° C. between the front and back of the droplet thus corroborating the initial determination of the requirements.

Discrete droplet motion in a micromachined channel structure using thermal gradients is demonstrated in the videorecorded images of FIG. 6. The device consists of a series of aluminum heaters inlaid on a planar silicon dioxide substrate (similar to the structure shown in FIG. 2) and bonded by glue to a wet-etched glass channel (20 µm depth, 500 µm width). Liquid samples were manually loaded into the two channels on the left using a micropipette. Heating the left interface of each droplet propels it toward the intersection of the channels. At the intersection, the droplets meet and join to form a single larger droplet. Note that, since the channel cross-section is 20 µm×500 µm, the volume of each of these droplets can be calculated from their lengths and is approximately 50 nanoliters.

The heaters along the entire surface of the channel shown in FIG. 6 allow it to be used as a thermal reaction chamber in addition to a droplet-motion device. The upper droplet in the figure contains a DNA sample, while the lower contains a restriction digest enzyme (TaqI) and digestion buffer. Following sample merging, the combined droplet was maintained at 65° C. for 30 minutes using the integral heaters and temperature sensors. The completed enzymatic reaction was confirmed by expressing the droplet from the right end of the channel and loading it onto a capillary gel electrophoresis system with a laser-induced fluorescence detector. The chromatogram produced by the silicon-device sample was similar to chromatograms generated from DNA digests runs in a standard polypropylene microreaction vessel (not shown).

EXAMPLE 4

This example describes various approaches for bonding channels to the substrate which contains circuitry for heating and temperature sensing of the device of the present invention (see discussion of two-part construction, above). First attempts involved Polyamide; regular polyamide was unsatisfactory in that it was found the two pieces would not stick together.

Follow-up attempts involved a photo-definable Polyamide. This produced a sticky surface, but would not give a perfect seal along the channel. It was discovered that the solvents released during the final baking process were causing pockets in the polyamide layer. An adhesion layer was needed which would seal by 'curing' and not release solvents.

Several different epoxies and glues were investigated, as listed below.

| Adhesive | Form | Dries | Texture | Comments |
|---|---|---|---|---|
| 1. Dymax UV Glue | Gel | Clear | Rubbery | Cures on UV exposure. |
| 2. Carter's Rubber Cement | Goo | Yellow/Clear | Rubbery | Dries quickly and stringy when thinned. |

-continued

| Adhesive | Form | Dries | Texture | Comments |
|---|---|---|---|---|
| 3. Borden's Krazy Glue | Liquid | Clear | Hard | Thin, dries on first contact. |
| 4. UHU Bond-All | Gel/Goo | Clear | Hard | Dries quickly and stringy when thin. |
| 5. Dennison Permanent Glue Stick | Paste | Clear | Hard | Will not flow on applying. |
| 6. Elmer's Glue-All (Borden) | Thick Liquid | White | Hard | Slow drying. |
| 7. Liquid Nails | Thin Paste | Wood-like | Hard | Thick, dries quickly when thinned. |
| 8. Devcon 5-Minute Epoxy | Gel | Yellow/Clear | Hard | Thick, cures on about 5 min. |
| 9. Scotch Double-Stick Tape | Tape | Clear | Rubbery | Tape. |
| 10. Dow Corning High Vacuum Grease | Thick Gel | Frosty | Soft | Seals but does not bond. |
| 11. Nujol Mineral Oil (Perkin Elmer) | Liquid | Clear | Runny | Neither seals (doesn't spread on glass) nor bonds. |
| 12. Household Goop | Gel/Goo | Clear | Rubbery | Contact cement which dries stringy. |
| 13. Permatex Weather Strip Cement | Gel/Goo | Yellow/Clear | Rubbery | Dries quickly and stringy when thinned. |
| 14. Thick Gel Super Glue | Gel | Clear | Hard | Does not cure on contact but does quickly. |
| 15. DAP Weldwood Contact Cement | Goo | Orange/Clear | Rubbery | Contact cement which gets stringy when thinned. |
| 16. Scotch (3M) Photo Mount Spray Adhesive | Thin Goo | Yellow/Clear | Rubbery | Spray. 'Gooey' but not stringy. |
| 17. Silicone Resin (spray) Lacquer (GC Electronics) | Liquid | Clear | Smooth | Spray. Dries to thin, clear, and sealed coating. |

A preferred glue was a UV cured glue, although the process of applying the UV glue is tedious and requires some practice to avoid putting the glue in places where it does not belong, e.g., in the channels.

Hydroxide bonding and screen printing of bonding substances was also attempted. Another option was glass tape, but the high temperatures required to melt the tape appeared to be too high for the present devices.

EXAMPLE 5

This example describes a nucleic acid amplification reaction on a silicon-based substrate. The established DNA biochemistry steps for PCR occur within physiological conditions of ionic strength, temperature, and pH. Thus, the reaction chamber components have design limitations in that there must be compatibility with the DNA, enzymes and other reagents in solution.

Figure 20:
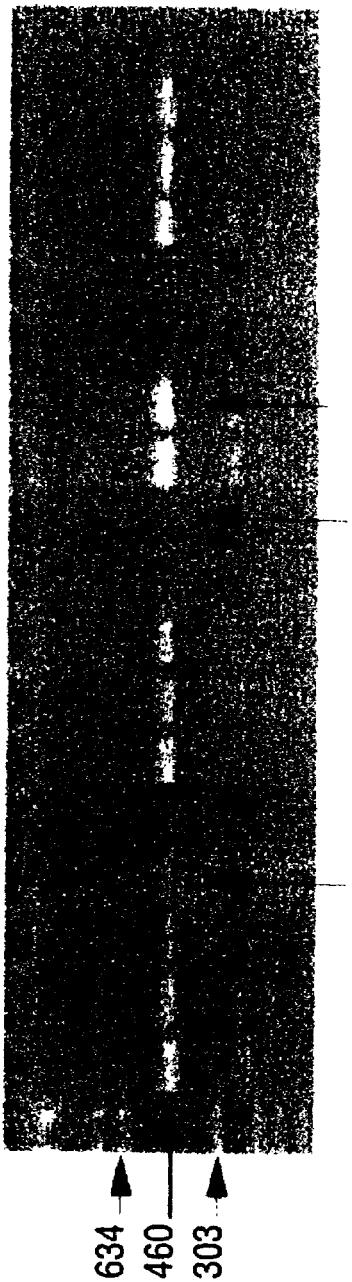
FIG. 20 is a photo of gel electrophoresis of PCR reactions wherein potentially inhibiting components were added directly to the PCR.

To assess biocompatability, components were added to a standard PCR reaction. The results (see FIG. 20) indicated that crystalline silicon may not be the ideal material for biological compatibility. Given these results, it may be desirable to modify the surface of the micromachined silicon substrate with adsorbed surface agents, covalently bonded polymers, or a deposited silicon oxide layer.

To form a biologically compatible heating element, the present inventors began by coating a standard silicon wafer with a 0.5 µm layer of silicon dioxide. Next, a 0.3 µm deep, 500 µm wide channel was etched into the silicon oxide and gold or aluminum was deposited (0.3 µm thick). This inlay process results in a relatively planar surface and provides a base for deposition of a water-impermeable layer. The impermeable layer is made by a sequence of three plasma enhanced vapor depositions: silicon oxide ($SiO_x$), silicon nitride ($Si_xN_y$), and silicon oxide ($SiO_x$). Since the materials are deposited from the vapor phase the precise stoichiometries are not known. A thin metal heater design was used for this device rather than the doped-silicon resistive heaters previously demonstrated for micromachined PCR reaction chambers, since the narrow metal inlay allows viewing of the liquid sample through a transparent underlying substrate, such as glass or quartz. Also, the use of several independent heating elements permits a small number to operate as highly accurate resistive temperature sensors, while the majority of elements are functioning as heaters.

A device fabricated with metal resistive heaters and oxide/nitride/oxide coating was tested for biological compatibility and temperature control by using PCR amplification of a known DNA template sample. The reaction was carried out on the planar device using twenty microliters of PCR reaction mix covered with mineral oil to prevent evaporation. The reaction mixture was cycled through a standard 35-cycle PCR temperature cycling regime using the integral temperature sensors linked to a programmable controller. Since the reaction volume was significantly larger than intended for the original heater design, a polypropylene ring was cemented to the heater surface to serve as a sample containment chamber. In all test cases, the presence of amplified reaction products indicated that the silicon dioxide surface and the heater design did not inhibit the reaction. Parallel amplification experiments performed on a commercial PCR thermocycler gave similar results. A series of PCR compatibility tests indicated that the reaction on the device is very sensitive to controller settings and to the final surface material in contact with the sample (not shown).

From the above it should be evident that the present invention can be adapted for high-volume projects, such as genotyping. The microdroplet transport avoids the current inefficiencies in liquid handling and mixing of reagents. Moreover, the devices are not limited by the nature of the reactions, including biological reactions.

EXAMPLE 6

In this example, a test structure is fabricated (FIG. 21). The test structure is very simple (FIG. 21). The main part is constructed from a two mask process with five layers of materials on top of the Si substrate. Proceeding from the lowest to the uppermost layer, the $SiO_2$ serves as an insulator between the Si substrate and the other metal layers, which function as solder pads and heating elements. The Ti layer (250 A) is for adhesion of Ni. The layers of Ni (1000 A) and Au (1000 A) act as a diffusion barrier for the solder. The Au layer also serves as a wettable pad. Finally, the layer of solder is for bonding two substrates together. The solder will melt by heating the metal layers. Another substrate that will be bonded has the same construction except for the solder.

A thermo-pneumatic microvalve is utilized in the test structure. The schematic and process flow of the microvalve is shown in FIG. 22. A corrugated diaphragm is chosen for its larger deflection and higher sensitivity. The diaphragm (side length=1000 um, thickness=3 um, boss size length=500 um boss thickness=10 um) has a deflection of 27 um at an applied pressure of 1 atm. This applied pressure is generated by a thermo-pneumatic mechanism, which provides a greater actuation force. A pressure of 1 atm is generated in the cavity between the diaphragm and glass by Freon-11 when it is heated 11° C. above room temperature. As set forth in FIG. 22, ten masks are anticipated to fabricate the microvalve.

FIG. 9a shows a portion of a silicon substrate 10, which is a p-type (100)-oriented Si wafer of normal thickness and moderate doping (>1 cm). The preferred wafer thickness, however, is ordinarily a function of the wafer diameter. The upper surface 12 of the silicon wafer containing substrate 10 is lapped, polished and cleaned in the normal and accepted manner. Isotropic etching using reactive ion etching (RIE) forms the diaphragm corrugations 14 with photoresist as the masking material.

Figure 22A:
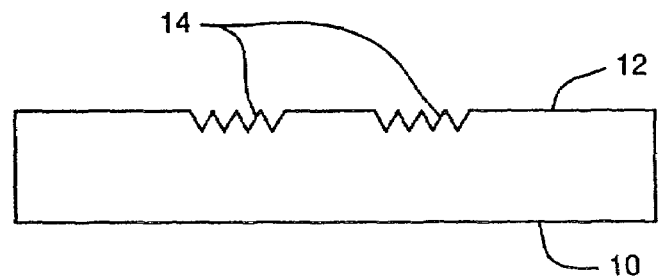
FIG. 22 is a schematic of one embodiment for manufacturing a sealable valve of the present invention.
Figure 22B:
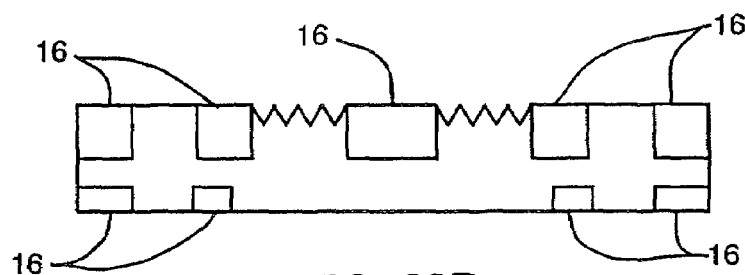
Figure 22C:
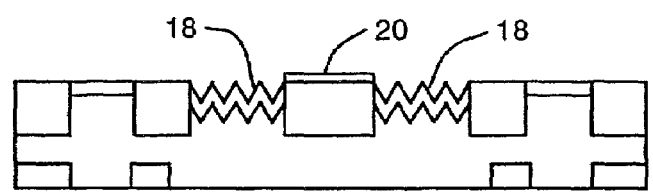

FIG. 22B shows the definition of deep boron diffusion areas 26 to form the rims, center bosses, inlet and outlet holes of the finished device. FIG. 22C shows the deposition of shallow boron diffusion areas 18 to form a diaphragm. The various metal layers, including solder 20, are then deposited. The deep and shallow boron diffusion processes define the shape of the diaphragm and the etch-stop for the dissolved wafer process.

Figure 22D:
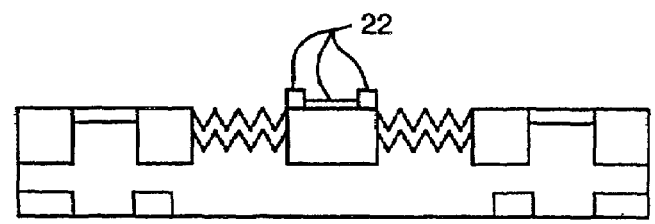
Figure 22E:
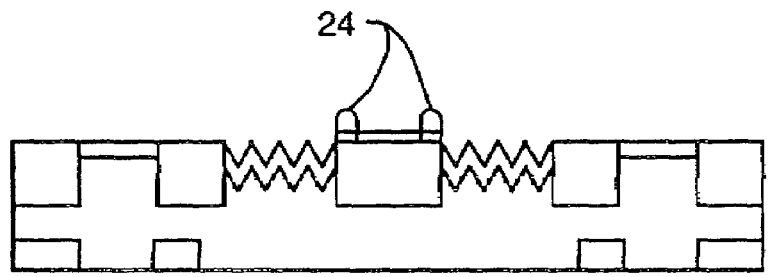
Figure 22F:
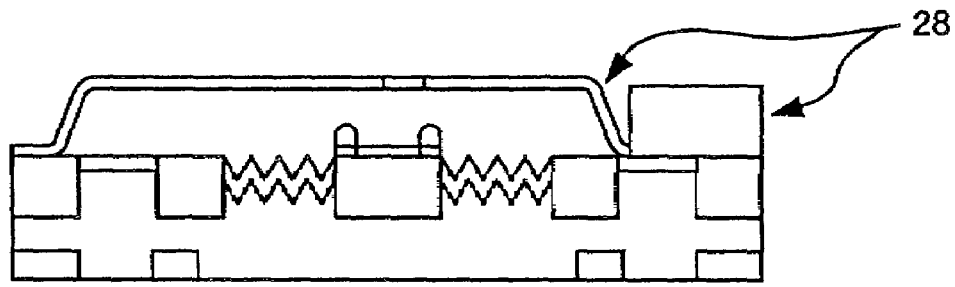
Figure 22G:
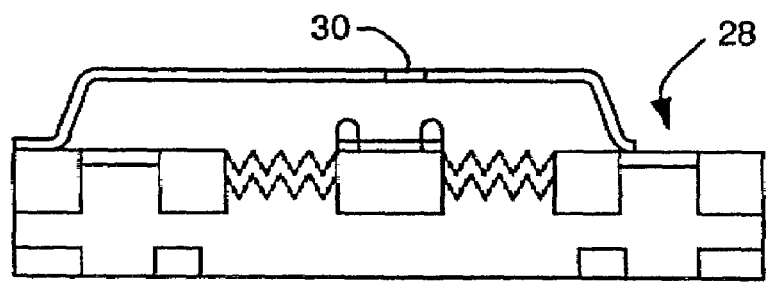

Following this, FIG. 22D shows the definition of oxide layer 22 to serve as insulator of the solder of the finished device. Ti adhesion/Ni/Au barrier and wettable pads 24 are then deposited as shown in FIG. 22E. The solder mold 26 of Ni and photoresist is then defined as shown in FIG. 22F) and the first Ni channel 28 is created by surface-micromachined using photoresist as sacrificial layers. The Ni channel hole is defined using EDP to remove the sacrificial layers, and define an channel hole 30 (FIG. 22G).

Figure 22H:
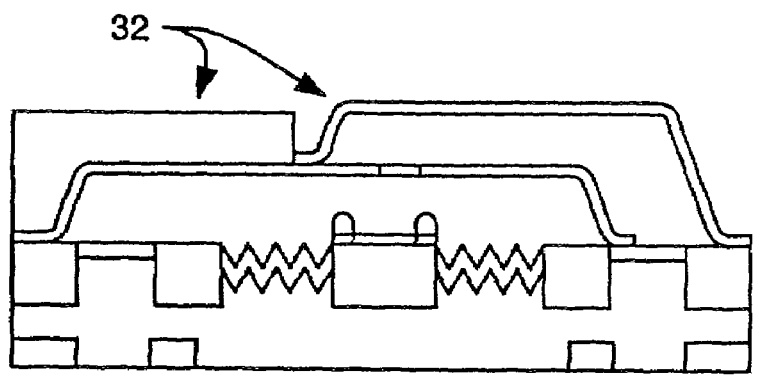
Figure 22I:
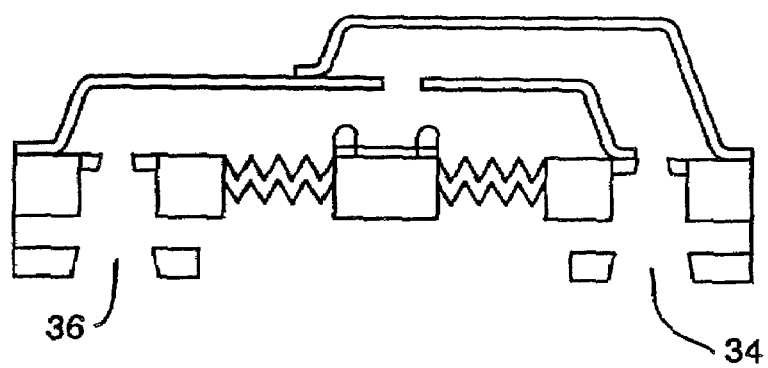

A second Ni channel 32 is defined by Ni and photoresist as set forth in FIG. 22H, and inlet 34 and outlet 36 holes are defined using EDP to remove the sacrificial layers (FIG. 22I).

Figure 22J:
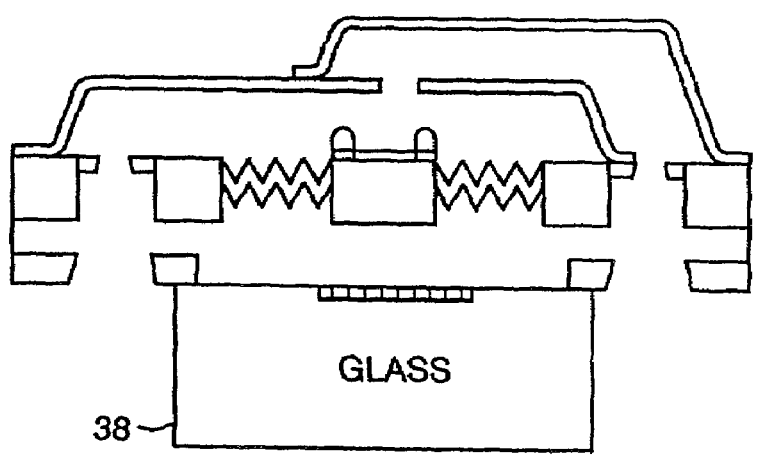

Lastly, a Ti/Pt heater in glass 38 is anodically bonded to the silicon substrate (FIG. 22J). Freon-11 fills the cavity through a hole (not shown) in the glass substrate. This hole is created from a diamond drill bit and sealed with epoxy.

EXAMPLE 7

In this example, a low melting point solder was intended to be utilized in the test structure. Because a universally useful solder-sealed microvalve will be used in a gas phase microanalytical system, it is not desirable to use a high melting point (m.p.) solder (>200° C.), which might affect the gas properties. In addition, a high m.p. solder may affect other components on the device, such as integrated circuits, and increase power consumption. As a result, low melting point solder is required. Bismuth-bearing solders have the lowest m.p.'s of 47–138° C. However, when a test structure was dipped into a pool of solder belonging to this group, all the metal layers dissolved into the solution of solder. Moreover, this solder was not selective in wetting the surface of the test structure.

EXAMPLE 8

In light of the results of the experiment set forth in Example 7, an attempt was made with commonly available 60:40 Sn:Pb solder (m.p. 183° C.). When the test structure was dipped into a solution of this solder, the metal layers remained intact. Furthermore, these layers demonstrated excellent wettability for the solder, i.e. the solder was confined only to the areas of metals.

EXAMPLE 9

Figure 23:
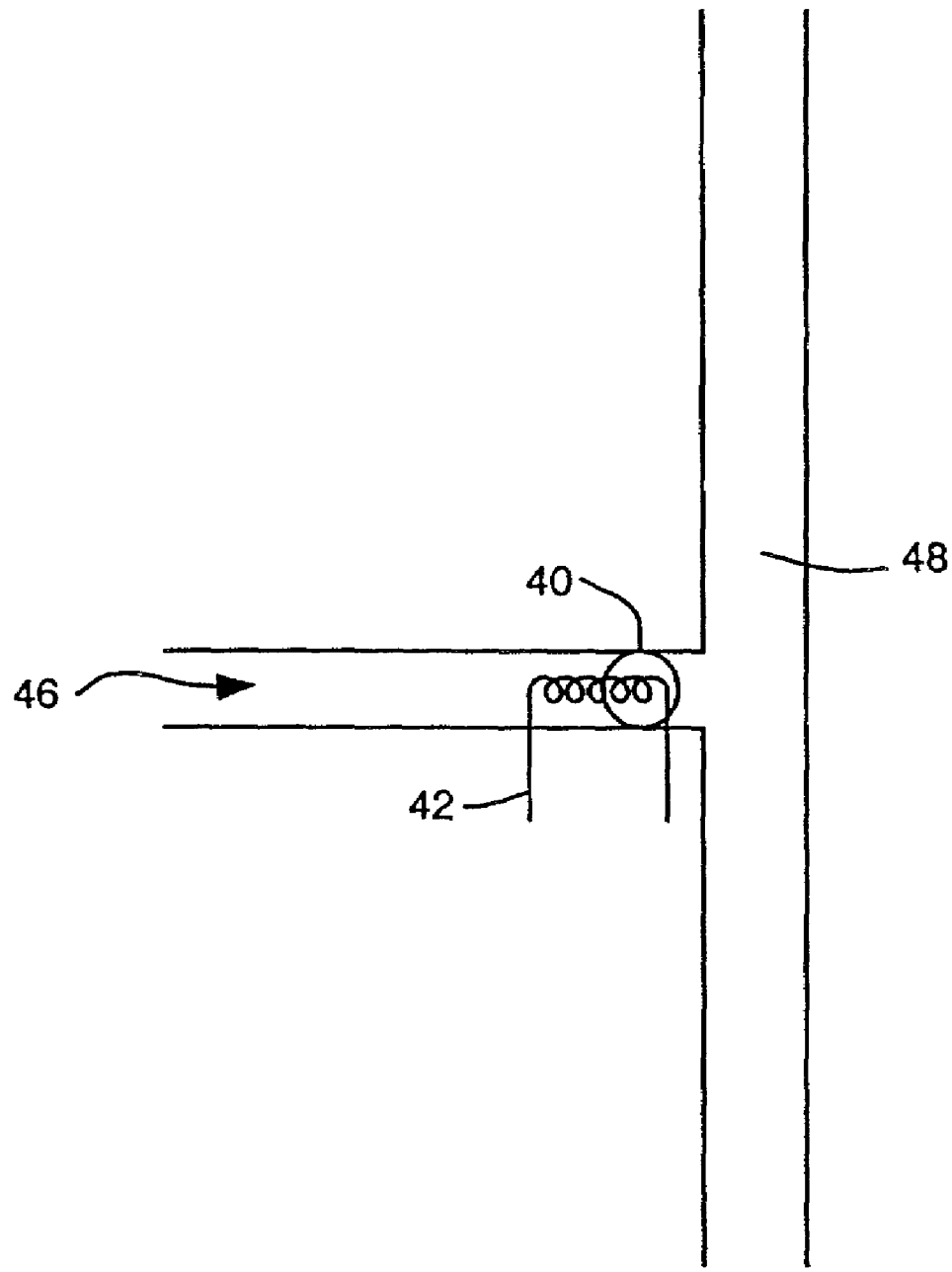
FIG. 23 is a schematic of one embodiment for the layout of the movable sealing means of the present invention.

In this example, a device and method for blocking fluid flow in a channel is described. FIG. 23 sets forth a test schematic for these embodiments. 60:40 Sn:Pb solder 40, associated with a heating element 42, is placed within a side channel 44. The heating element 42 at least partially liquifies the solder 40 and air flow 46 moves the liquified solder from the side channel into a main channel 48 and cooled, blocking the main channel.

EXAMPLE 10

In this example, a device, which was fabricated using lift-off method described above to pattern hydrophobic regions on glass and silicon substrates, was testing for the separation of water droplets. For the device, a patterned metallic thin film was used to expose regions that were chosen to be made hydrophobic on a hydrophilic substrate. Chromium, Gold or Aluminum was used as the metal layer; the choice of the metal being based on process compatibility with other processing steps and step height coverage of the etched channels.

Figure 24:
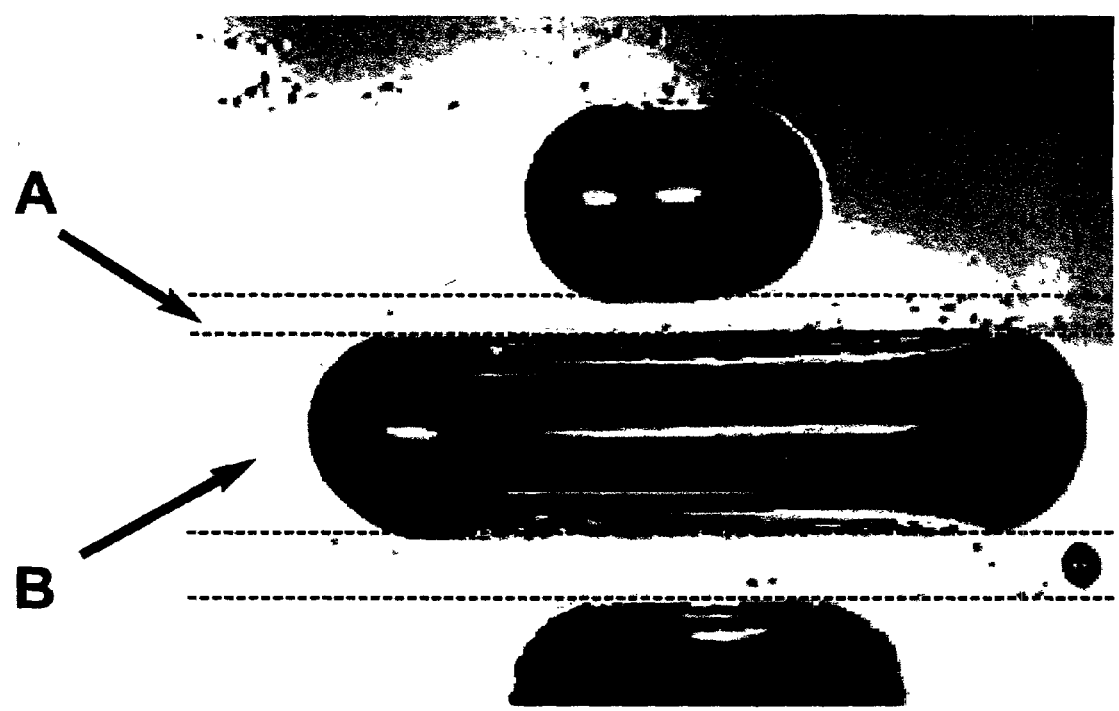

Line widths as narrow as 10 $\mu$m were patterned on silicon substrates using the methods of the present invention. FIG. 24 shows water drops separated by lines of hydrophobic (A) and hydrophilic regions (B) patterned by this new technique (the width of the hydrophilic line in the middle is 1 mm).

The contact angle of water on the OTS (SAM) coated silicon oxide surface was measured to be approximately 110°.

One can also define hydrophobic regions in etched channels in glass by performing the lithography using a thick resist. It was found emprically that cleaning of the substrates prior to immersion in the OTS (SAM) solution is important; improper cleaning results in films that partially covers the surface.

EXAMPLE 11

Figure 25A:
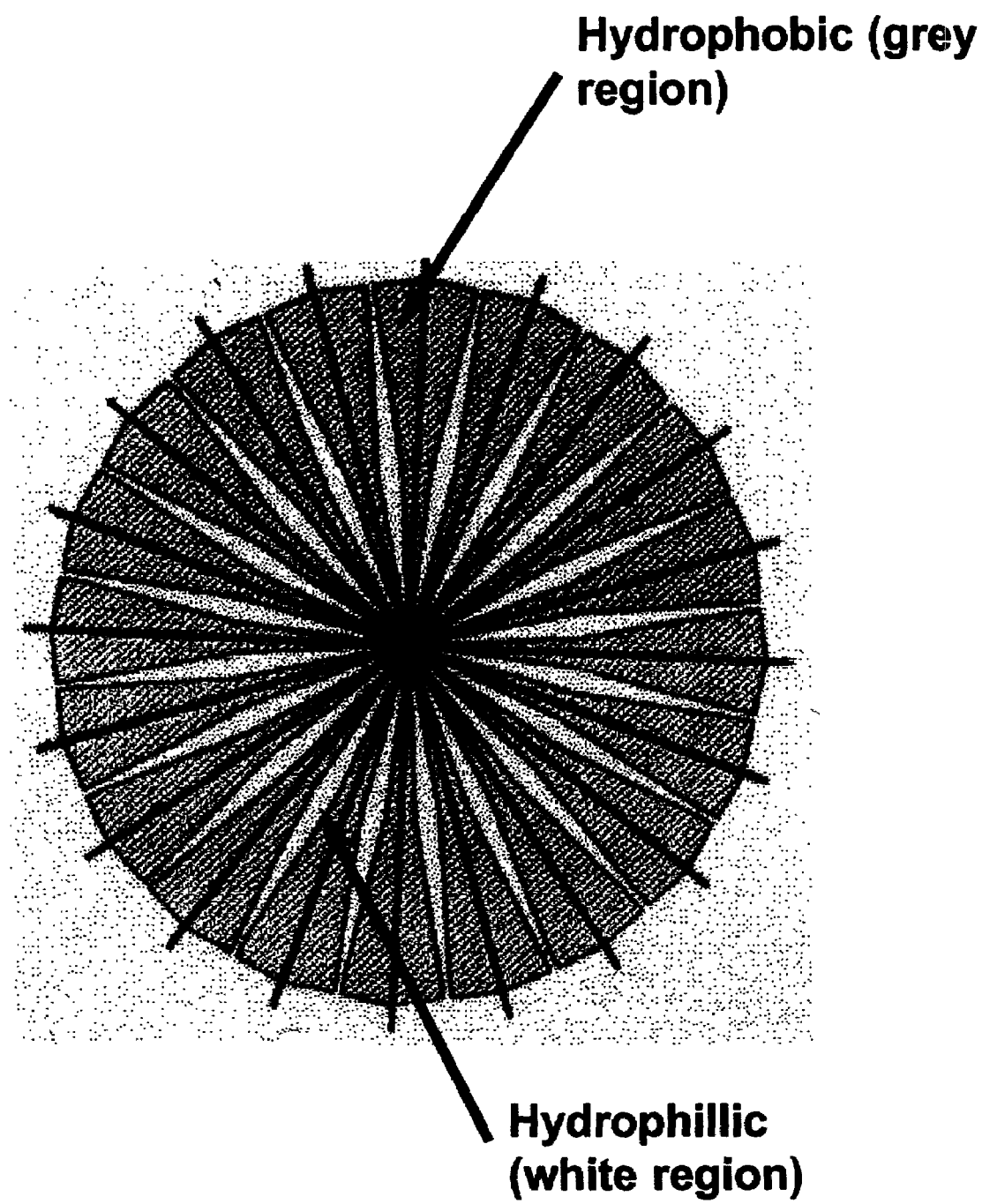
FIG. 25 is photograph showing simply paterning according to the methods of the present invention to create multiple droplets.
Figure 25B:
Figure 25C:
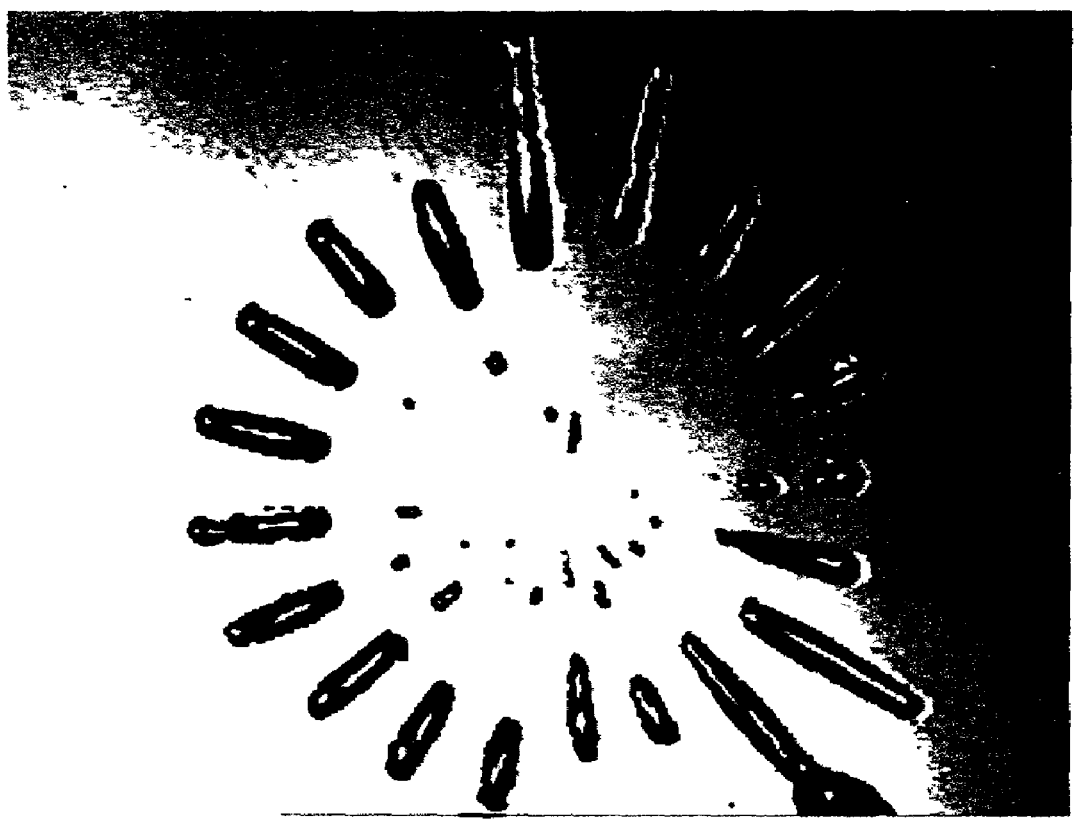

The results of Example 10, above, demonstrate that hydrophobic and hydrophilic patterns enable one to define and control the placement of aqueous liquids, and more specifically microdroplets of such liquids, on a substrate surface. FIG. 25 shows a simple use of this patterning technique to split a liquid droplet into multiple liquid droplets. A concentric pattern of alternating hydrophobic (dark) and hydrophilic (white) sectors was imparted to a silicon substrate (FIG. 25A; the diameter of the circle is 1 cm) using the methods of the present invention as described above. A water drop was placed on the pattern (FIG. 25B) and the excess water pulled away using a pipet, resulting in multiple drops separated from each other (FIG. 25C).

EXAMPLE 12

In this example, experiments are describe to position a water front inside a channel using straight channels (depth ranging from 20–40 $\mu$m and width between 100–500 $\mu$m) with a 500 $\mu$m wide hydrophobic region (or patch) patterned a few millimeters away from the side inlet. Water was placed at the inlet using a sequencing pipette (Sigma, least count 0.5 $\mu$l) and was drawn into the channel by surface forces. The water front stopped at the hydrophobic patch if a controlled amount of liquid was placed at the inlet. However, if the channels were overloaded, the liquid would tend to overrun the hydrophobic patch. This behavior was prominent in the channels with smaller cross-section.

To eliminate the over-running of the liquid over the patches, an overflow channel was introduced in the design to stop the water running over the hydrophobic patch (such as that shown FIG. 3). The dimensions of the channels varied in depth and width as before. Water placed at the inlet is drawn in and splits into two streams at the intersection point. The two fronts move with almost equal velocity until the front in the main channel reaches the hydrophobic patch. The front in the main channel stopped at the hydrophobic patch; however, the other front continued to move to accommodate the excess injected water. Using this overflow channel design, one can successfully stop aqueous liquids for the full range of variation in channel dimensions.

EXAMPLE 13

Figure 26A:
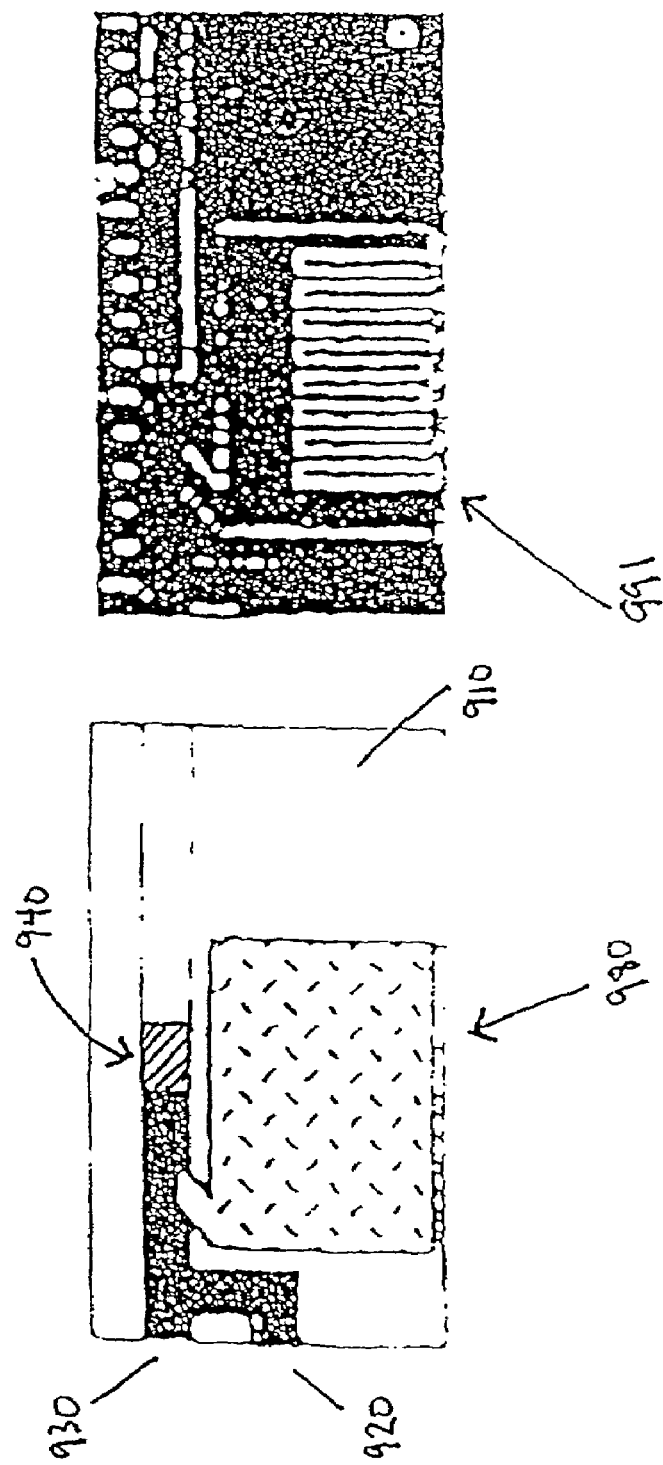
FIG. 26 are schematics and photographs of one embodiment of the device of the present invention utilizing a heater.
Figure 26B:
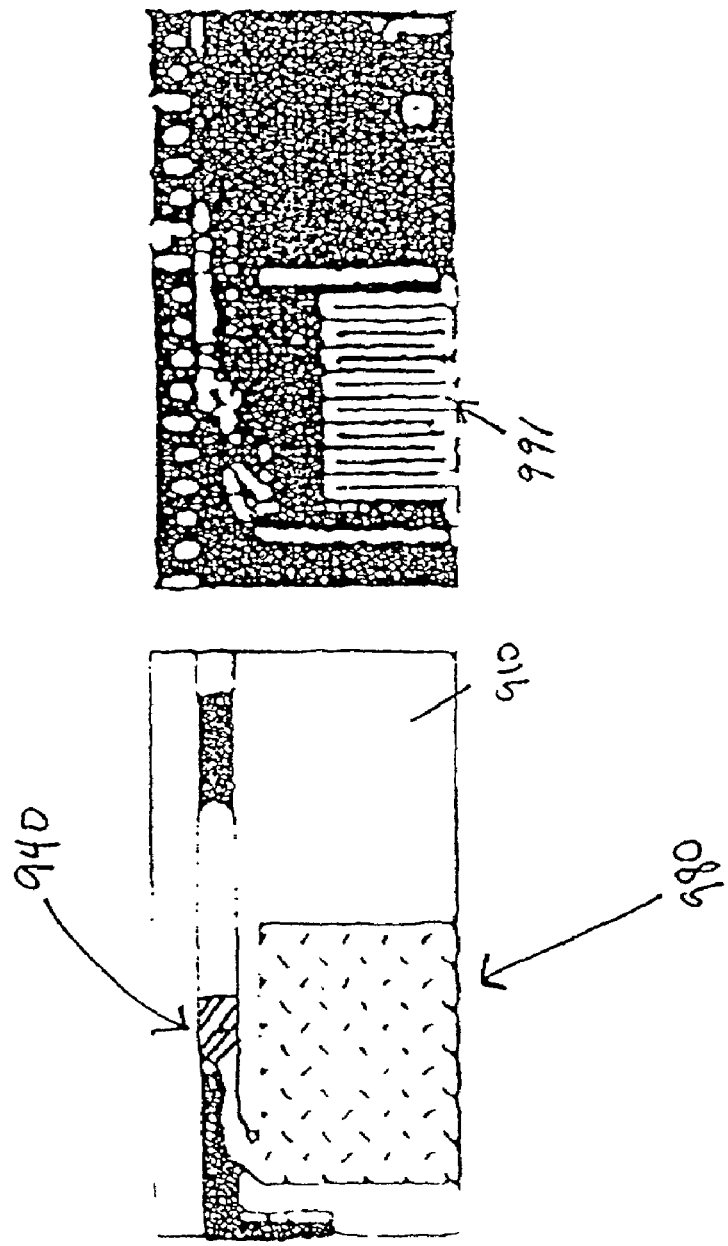

FIGS. 26A–E are schematics and photographs of one embodiment of the device (910) of the present invention (in operation) utilizing a heater. FIG. 26A shows that liquid placed at the inlet (920) stops at the hydrophobic interfaces, and more specifically, stops at the liquid-abutting hydrophobic region (940). The inlet (920) and overflow (930) ports were blocked or heavily loaded with excess liquid to ensure that the pressure generated acts only in the direction away from the inlet holes. The heater resistor (991) was actuated by an applied voltage. The flow of current caused resistive heating and subsequently increases the air temperature in the chamber (980) and, therefore, the pressure. After the pressure builds up to a particular value, a microdrop splits and moves beyond the hydrophobic patch (FIG. 26B). The drop keeps moving as long as the heater is kept on; the drop velocity decreases as it moves further away. While it is not intended that the present invention be limited by the mechanism by which this takes place, it is believed that the added volume (the volume by which the drop has moved) brings about a decrease in the pressure.

Figure 26C:
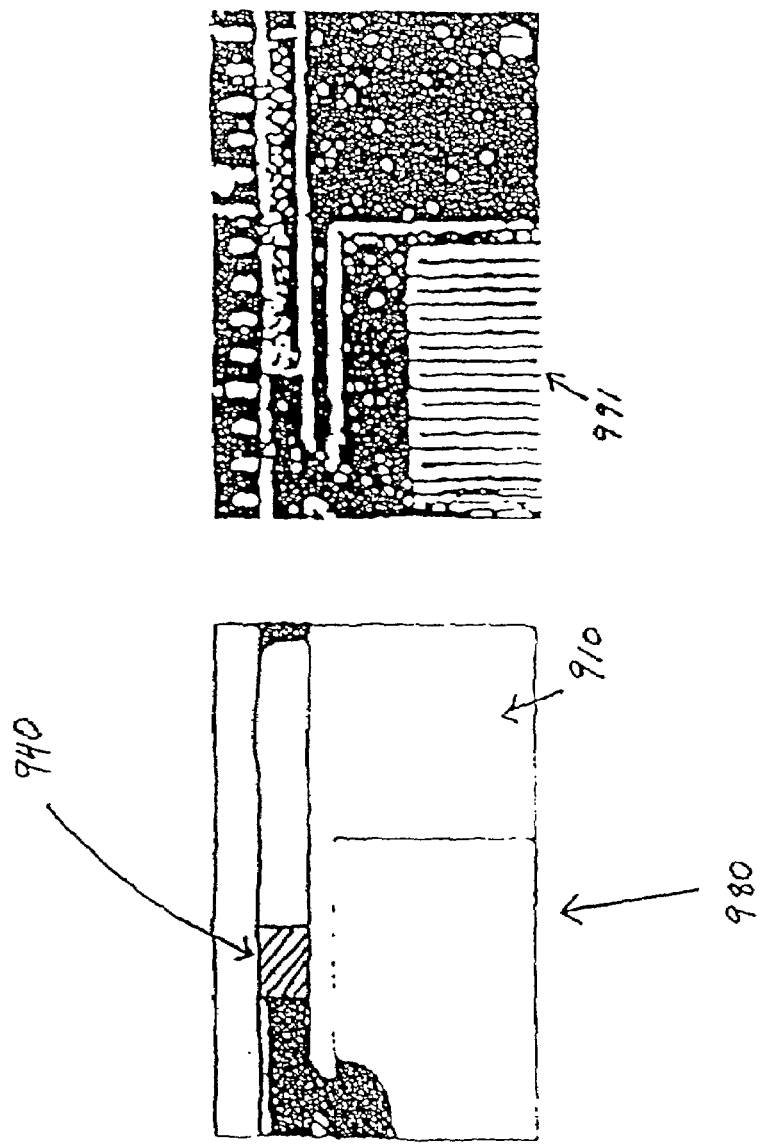

To stop or block the moving drop at a location, two strategies can be employed. In the first method, the inlet and overflow ports were opened to the atmosphere and the heater was slowly turned off. The temperature inside the chamber falls quickly to around room temperature, thereby reducing the pressure inside the chamber. The water from the inlet flows into the chamber to relieve the pressure (FIG. 26C). In the second method, a hydrophobic vent was placed away from the chamber to the right. As soon as the moving drop goes past the hydrophobic vent (FIG. 26D), the drop stops moving farther (FIG. 26E). Cooling the chamber to room temperature at this instant will cause air to flow back through the vent to relieve the low pressure in the chamber.

From the above, it should be clear that the compositions, devices and methods of the present invention permit on-chip actuation using etched chambers, channels and heaters. There is no requirement for mechanical moving parts and the patterns are readily fabricated. While the operations described above have been for simple designs, the present invention contemplates more complicated devices involving the introduction of multiple samples and the movement of multiple microdroplets (including simultaneous movement of separate and discrete droplets).

The invention claimed is:

1. A method, comprising the steps of:
   (a) providing a device comprising i) a microdroplet transport channel, said channel having one or more hydrophobic regions; and ii) a gas port in fluidic communication with said channel; and
   (b) introducing a first volume liquid into said channel so as to create a liquid-containing channel and under conditions such that said first volume of liquid is confined by at least one of said hydrophobic regions so as to create a first terminus; and
   (c) introducing a volume of gas through said gas port into said liquid-containing channel under conditions such that said gas divides the liquid in said channel so as to create a second terminus, said first and second termini defining a second volume of liquid.

2. The method of claim 1, further comprising the step d) moving said second volume of liquid.

3. The method of claim 2, wherein said second volume is moved into a reaction chamber.

4. The method of claim 1, wherein said second volume of liquid is in a range between approximately one picoliter and one milliliter.

5. A method, comprising the steps of:
   (a) providing a device comprising i) an etched microdroplet transport channel, said microdroplet transport channel having one or more hydrophobic regions; and ii) an etched gas transport channel in fluidic communication with said microdroplet transport channel, said gas transport channel intersecting said microdroplet channel so as to form a junction; and
   (b) introducing a first volume liquid into said microdroplet channel so as to create a liquid-containing channel and under conditions such that said first volume of liquid is confined by at least one of said hydrophobic regions so as to create a first terminus; and (c) introducing a volume of gas through said gas transport channel under conditions such that said gas enters said fluid-containing channel at said junction so as to divide the liquid in said channel and create a second terminus, said first and second termini defining a second volume of liquid.

6. The method of claim 5, wherein said second volume is less than said first volume.

7. The method of claim 5, wherein said second volume of liquid is in a range between approximately one picoliter and one milliliter.

8. The method of claim 5, further comprising the step d) moving said second volume of liquid.

9. The method of claim 8, wherein said second volume is moved into a reaction chamber.

10. A method, comprising the steps of:
  (a) providing a device comprising i) a microdroplet transport channel, said channel having one or more hydrophobic regions; and ii) a plurality of gas ports in fluidic communication with said channel; and
  (b) introducing a first volume liquid into said channel so as to create a liquid-containing channel and under conditions such that said first volume of liquid is confined by at least one of said hydrophobic regions so as to create a first terminus; and
  (c) introducing a volume of gas through one of said gas ports into said liquid-containing channel under conditions such that said gas divides the liquid in said channel so as to create a second terminus, said first and second termini defining a second volume of liquid.

11. The method of claim 10, further comprising the step d) moving said second volume of liquid.

12. The method of claim 10, wherein the distances within said microdroplet transport channel between a given hydrophobic region and said plurality of gas ports define a range of predetermined liquid volumes.

13. The method of claim 10, wherein the conditions under which said gas divides the liquid in said channel so as to create a second terminus comprises a metering pressure.

14. The method of claim 11, wherein said second volume is moved into a reaction chamber.

* * * * *